US008655782B2

(12) United States Patent
Poon et al.

(10) Patent No.: US 8,655,782 B2
(45) Date of Patent: Feb. 18, 2014

(54) SYSTEM AND METHOD FOR AUTHENTICATING TRANSACTIONS THROUGH A MOBILE DEVICE

(75) Inventors: Dennis Poon, Mississauga (CA); Simon Law, Mississauga (CA); Richard Burnison, Toronto (CA)

(73) Assignee: Xtreme Mobility Inc., Toronto (CA)

( * ) Notice: Subject to any disclaimer, the term of this patent is extended or adjusted under 35 U.S.C. 154(b) by 31 days.

(21) Appl. No.: 13/162,324

(22) Filed: Jun. 16, 2011

(65) Prior Publication Data

US 2012/0150742 A1  Jun. 14, 2012

(30) Foreign Application Priority Data

Dec. 14, 2010 (CA) .................................... 2724297
Jun. 14, 2011 (CA) .................................... 2743035

(51) Int. Cl.
*G06Q 40/00* (2012.01)
(52) U.S. Cl.
USPC .......................................................... 705/44
(58) Field of Classification Search
USPC ........................... 705/17, 40, 44, 78; 715/764
See application file for complete search history.

(56) References Cited

U.S. PATENT DOCUMENTS

| | | | |
|---|---|---|---|
| 5,237,627 A | 8/1993 | Johnson et al. | |
| 7,373,515 B2 | 5/2008 | Owen et al. | |
| 7,488,886 B2 | 2/2009 | Kemp | |
| 7,596,530 B1 | 9/2009 | Glasberg | |
| 2003/0191945 A1 | 10/2003 | Keech | |
| 2003/0200184 A1* | 10/2003 | Dominguez et al. | 705/78 |
| 2007/0288377 A1* | 12/2007 | Shaked | 705/44 |
| 2008/0237340 A1 | 10/2008 | Emmons et al. | |
| 2008/0288405 A1 | 11/2008 | John | |
| 2009/0119209 A1* | 5/2009 | Sorensen et al. | 705/40 |

(Continued)

FOREIGN PATENT DOCUMENTS

| | | |
|---|---|---|
| CA | 2682610 A1 | 10/2009 |
| CA | 2730175 A1 | 1/2010 |
| WO | 0225495 A1 | 3/2002 |
| WO | WO2008103882 A2 | 8/2008 |

OTHER PUBLICATIONS

Murdoch, S. et al.; "Verified by Visa and MasterCard SecureCode: or, How not to Design Authentication"; Financial Cryptography and Data Security '10; Jan. 25 to 28, 2010; Tenerife (pre-proceedings draft).

(Continued)

*Primary Examiner* — Samica L Norman
(74) *Attorney, Agent, or Firm* — Wilfred P. So; Blake, Cassels & Graydon LLP

(57) ABSTRACT

A user may claim to have not made or allowed a transaction and that the transaction was made in error. Where it appears the user has not authorized the transaction, the funds of the transaction are returned to the user, or are charged back. Systems and methods provide a way to confirm whether or not a transaction was actually authorized by the user, thereby settling a chargeback dispute for a previously executed transaction. The method comprises receiving the dispute regarding the transaction including associated transaction data, and retrieving a digital signature associated with the transaction data, the digital signature computed by signing the transaction data. The digital signature is then verified using a public key, wherein the public key corresponds to a private key stored on a mobile device. It is then determined whether or not the transaction is fraudulent based on a verification result of the digital signature.

21 Claims, 25 Drawing Sheets

(56) References Cited

U.S. PATENT DOCUMENTS

2009/0228816 A1* 9/2009 Vilmos ................... 715/764
2010/0114681 A1 5/2010 Mohsenzadeh
2011/0313898 A1 12/2011 Singhal et al.
2012/0116902 A1* 5/2012 Cardina et al. ................ 705/17

OTHER PUBLICATIONS

"Verified by Visa System Overview"; Verified by Visa; Visa International Service Association; External Version 1.0.2; Dec. 30, 2006; Copyright 2002-2006 External Version 70040-01.
Visa, "2-D Secure TM Mobile Authentication Scenarios", Version 1.0, Jun. 30, 2002. [Retrieved on Feb. 6, 2012]. Retrieved from the Internet at URL:http://citeseerx.ist.psu.edu/viewdoc/download-?doi=10.1.1.199.4148&rep=rep1&type=pdf.
Guerra, Jennifer; International Search Report from corresponding PCT Application No. PCT/CA2011/050771; search completed Mar. 19, 2012.
Kungpisdan, "Modelling, Design and Analysis of Secure Mobile Payment Systems"; Monash University, 2005.
Kungpisdan et al.; "A Secure Account-Based Mobile Payment Protocol", IEEE Proceedings of the International Conference on Information Technology, Apr. 2007.
Li et al.; "Undeniable Mobile Billing Schemes", Proceedings of the 4th European Conference on Public Key Infrastructure: Theory and Practice,Jun. 2007.
Asokan et al.; "The State of the Art in Electronic Payment Systems", IEEEComputer, vol. 30 No. 9, Sep. 1997.

* cited by examiner

SYSTEM AND METHOD FOR AUTHENTICATING TRANSACTIONS THROUGH A MOBILE DEVICE

CROSS-REFERENCE TO RELATED APPLICATIONS

This application claims priority from Canadian Patent Application No. 2,724,297 filed on Dec. 14, 2010 and Canadian Patent Application titled "SYSTEM AND METHOD FOR AUTHENTICATING TRANSACTIONS THROUGH A MOBILE DEVICE" filed on Jun. 14, 2011, the contents of which are hereby incorporated by reference in their entirety.

TECHNICAL FIELD

The following relates generally to authenticating and performing transactions through a mobile device.

DESCRIPTION OF THE RELATED ART

Unlike personal computers, which allow rapid completion of multi-stage website-based transactions through various human input devices, such as a computer mouse and a keyboard, mobile devices (e.g. mobile phones, personal digital assistants, laptops, tablet computers, and other wireless devices), which often have only one input device, offer a frustrating, slow experience when completing website-based transactions. Further, having to provide data to numerous vendors or service providers multiple times is inconvenient, prone to errors, and is ultimately less secure.

Some approaches have attempted to solve this issue by having the transaction completed in a single "click" by storing the relevant data on the server system. Though such an approach may alleviate users from having to provide data multiple times, a mobile device user may accidentally indicate an intention to complete a transaction. Such accidents may be highly inconvenient and costly, as the transaction may be irreversible or otherwise unable to be cancelled. At the very least, it is frustrating and time consuming to attempt to reverse the accidental transaction.

Other approaches, such as "form wizards" and password stores, attempt to solve the issue by storing relevant data by saving previously entered values in a persistent store. Unfortunately, some password stores and form wizards are insecure, perhaps storing passwords in plain-text or using weak encryption, being poorly programmed and exposing various vulnerabilities, or not requiring a password. Such insecure characteristics may allow unauthorized users of the device to have unrestricted access to the stored values. Additionally, this mechanism may not work across multiple vendors or service providers, as each vendor or service provider may require different representations or forms of data.

Often, website-based transactions are authenticated using only one factor of authentication, such as a username and a password. Further, some website-based transactions masquerade single-factor authentication as multi-factor authentication by requesting multiple items of information of the same authentication factor, such as asking for both a credit card number and a password. In such a scenario, providing a credit card number is not sufficient proof of having possession of a specific credit card; rather, the credit card number is simply known. A shared token, such as a credit card number, which is provided to any number of parties, does not have reasonably controlled access; hence, a credit card number is not a reasonable factor of authentication.

It is also recognized that the traditional design and implementation of m-commerce and e-commerce systems are often comprised of separate servers and parties, and such separation lacks mechanisms to indicate and propagate an alert that an attack has occurred, potentially putting all parties at risk.

There are also unsafe client systems and mobile devices, such as those with security flaws in client browsers or related system libraries or those infected with viruses, Trojans, key loggers, or similar malware, which may allow an adversary to intercept, or otherwise obtain, sensitive or personally identifiable information, such as credit card numbers, health card numbers, driver's license numbers, etc. Such stolen information may result in financial or reputation loss, be used to commit other crimes, or be used in conjunction with any number of unauthorized, potentially illegal, activities. Such information may also be stolen by physically stealing a mobile device.

Similarly, unsafe server systems, such as those with inadequate physical access controls, poorly configured servers, applications, and/or firewalls, unsafe data storage, unnecessary prolonged retention periods, and/or weak or non-existent encryption, etc., put card holder data at risk of compromise. In attempt to eliminate such unsafe practices, some acquirers and acquiring processors require, prior to granting a merchant a credit card processing license, merchants to be PCI-DSS (Payment Card Industry Data Security Standards) certified. Though both merchants and card holders reap the benefits of PCI-DSS certification, some merchants may not be able or willing to pay the associated funds involved in the PCI-DSS certification process (such as costs for penetration testing, purchasing or renewing SSL certificates, implementing adequate physical access controls, changing existing systems to comply, etc.).

From a user's perspective, when subscribing to, or doing business with, many different websites, a user will quickly collect numerous accounts, usually consisting of an identity (often referred as a "username") and a password. Although this could favorably result in strong compartmentalization (given each account could have a strong, unique password), some users become overwhelmed with the number of passwords they need to remember. In effect, some users choose passwords simple to guess or reuse the same password for multiple accounts. Unfortunately, this may result in the user's account being compromised, which may result in identity theft, monetary loss, or other similar unfavourable consequences.

From another perspective, merchants, too, when accepting credit cards, may be victim to fraudulent activity, which may result in financial loss, reputation loss, or a revocation of their processing license. Typically, merchants that choose to accept credit card transactions from their website are ultimately financially liable for accepting fraudulent transactions. To thwart such fraudulent transactions, merchants have the option to use a method called 3D Secure (some well known implementations are available under the trade-marks VISA's Verified By Visa, MasterCard's MasterCard SecureCode, and JCB International's J/Secure), which effectively shifts the financial liability to the credit card holder's issuer, and possibly to the credit card holder. Though this reduces the financial risks assumed by merchants, some merchants may have chosen not to make use of 3D Secure due one widely criticized component of some 3D Secure implementations.

One largely criticized component of 3D Secure has been seeming relaxed implementation restrictions, further worsened by the issuer implementation decisions. The 3D Secure protocol allows each merchant to decide how to present the credit card holder's issuer authentication webpage (notably, by using inline frames ("iframes"), pop-up windows, or browser redirects). As a consequence, "phishing," or the unscrupulous harvesting or collecting of sensitive data from unsuspecting users, becomes a risk for the credit card holder.

From the above it can be understood that methods and systems for increasing security during e-commerce and m-commerce transactions are highly desirable.

BRIEF DESCRIPTION OF THE DRAWINGS

Embodiments of the invention or inventions will now be described by way of example only with reference to the appended drawings wherein:

FIG. 2 is a schematic diagram of an example embodiment of the system in FIG. 1 showing which data components are stored on the mobile device, payment gateway, supplemental server, and payment server, and the movement of data there between.

DETAILED DESCRIPTION

Figure 1:
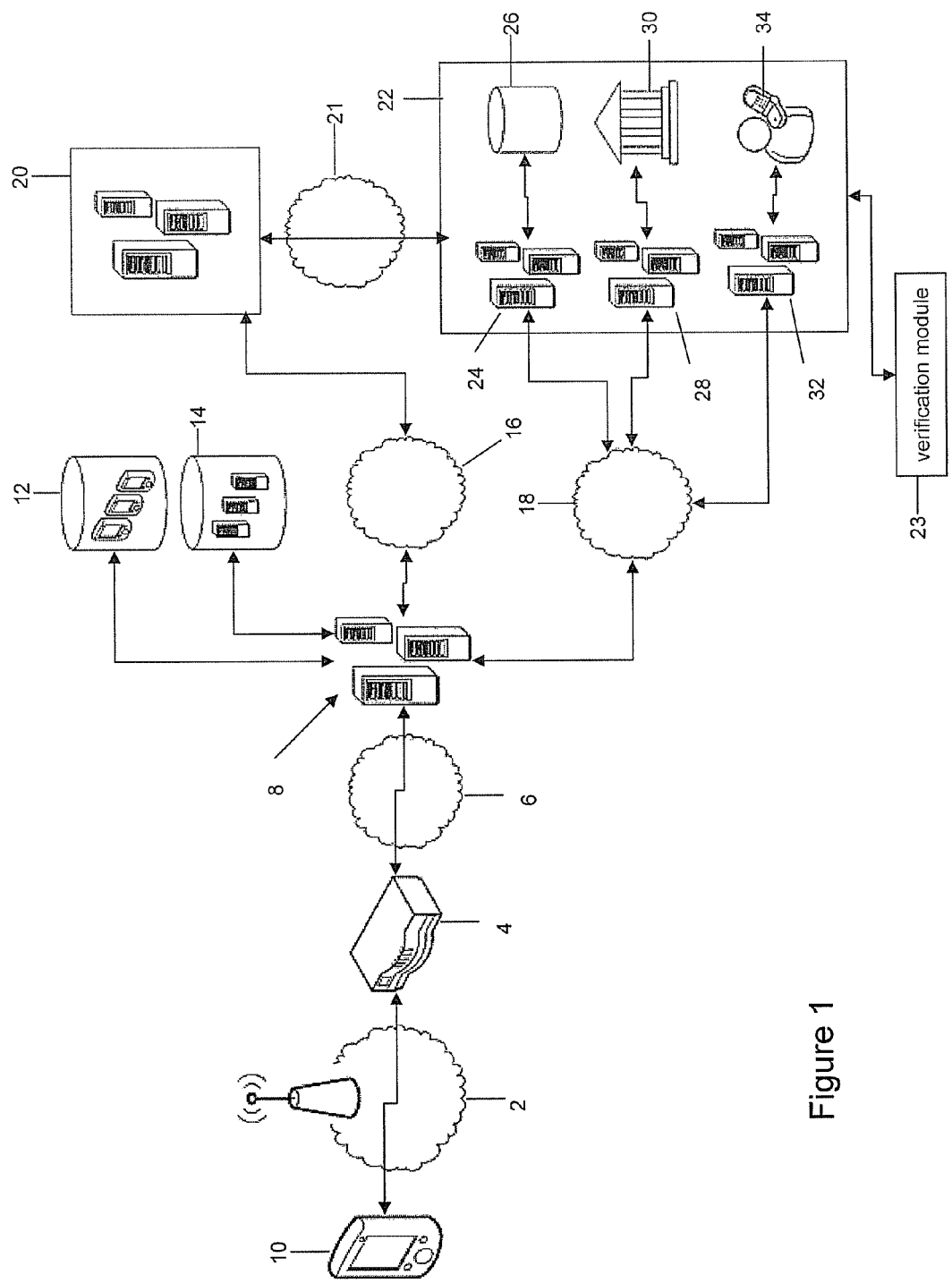
FIG. 1 is a schematic diagram of an example embodiment of a system for authenticating a transaction initiated by a mobile device.

It will be appreciated that for simplicity and clarity of illustration, where considered appropriate, reference numerals may be repeated among the figures to indicate corresponding, or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The proposed systems and methods authenticate an m-commerce or e-commerce transaction originating from a mobile device. M-commerce or mobile commerce herein refers to any transaction, involving the transfer of ownership or rights to use goods and services, which is initiated or completed, or both, by using mobile access to computer-mediated networks with the help of an electronic device. E-commerce, or electronic commerce, herein refers to the buying and selling of products or services over electronic systems such as the Internet and other computer networks.

Generally, a transaction, as described herein, includes an authentication process and a settlement process. The authentication process is used to authenticate payment information. Upon authenticating the payment information, in the settlement process, an amount of value (e.g. money, points, credit, etc.) is moved from one value account to another. There are multiple settlement methods and systems, which can be used in combination with the principles described herein. The proposed systems and methods relate to authenticating the payment information as part of the transaction.

In the proposed systems and methods, the mobile device undergoes a registration process and a transaction process. The registration process involves an identification uniquely associated with the mobile device being registered and stored in a server system and stored, either actively or inherently, in the mobile device itself. The mobile device's identification is referred herein as a mobile device ID. The mobile device ID may or may not be generated based on characteristics of the mobile device. The registration process also involves verifying the payment information and associating the mobile device ID with the payment information. Payment information includes, for example, a credit card number, an expiry date, a bank card number, a banking number, a debit card number, a gift card ID, a prepaid card ID, points account number, etc. In general, any such information used by the seller to identify a payment account can be referred to herein as a payment ID. The payment information, or payment ID, is verified using supplemental information. Non-limiting examples of such supplemental information include a Card Security Value (CSV), a Card Security Code (CSC), a Card Verification Value (CVV or CVV2), a Card Verification Value Code (CVVC), a Card Verification Code (CVC or CVC2), a Verification Code (V-Code or V Code), or a Card Code Verification (CCV). Other non-limiting examples of supplemental information for further verifying a payment ID also include pins or passwords associated with the 3D Secure protocols. The supplemental information may also be a debit card PIN, an EMV PIN, an online banking password, or the like. The supplemental information may also be derived from, or be a form of, biometric data (e.g. voice data, finger prints, eye scan, etc.). Other supplemental information for verifying the payment ID can be applied to the principles described herein, and such supplemental information is herein referred to as supplemental ID.

In an example embodiment, the supplemental ID and payment ID are not stored in a permanent manner on the mobile device, given the sensitivity and high security value of such data. The server system, however, stores at least the payment ID and mobile device ID in association with one another.

In another example embodiment, the supplemental ID or payment ID may be stored on the mobile device. There can be, for example, conditions that determine how the supplemental ID and payment ID are stored.

It can be appreciated that the mobile device ID need not be actively stored on the mobile device, if the mobile device ID is generated from inherent features of the mobile device. Therefore, the mobile device ID can be retrieved from the mobile device by merely identifying the values of the mobile device's inherent features.

Upon completing the registration process, (e.g. registering the mobile device ID and verifying the payment ID and supplemental ID), a transaction can be initiated using the mobile device. Upon the mobile device receiving supplemental ID from a user, the mobile device sends the mobile device ID (stored in the mobile device) and supplemental ID to the server system. In other words, only the supplemental ID is required as user input data to initiate and verify a transaction. The server system, based on the mobile device ID, retrieves the associated payment ID, and then, using the combination of the payment ID and supplemental ID, is able to initiate verification of the payment ID. If the payment ID is successfully verified, the transaction is executed (e.g. the transaction is settled). Further details regarding the registration and transaction processes are described below.

It can be appreciated that an initial transaction can be combined with the registration process, whereby the information supplied in the registration is used to execute the initial transaction as well. However, further transactions subsequent to the combined registration and initial transaction can use the proposed methods and systems described herein (e.g. a user only supplying a supplemental ID).

Although the following examples are presented in the context of mobile communication devices, the principles may equally be applied to other devices such as applications running on personal computers and the like where appropriate.

For clarity in the discussion below, communication devices will be commonly referred to as "mobile devices". Examples of applicable mobile devices include pagers, cellular phones, cellular smart-phones, wireless organizers, personal digital assistants, computers, laptops, tablet computers, handheld wireless communication devices, wirelessly enabled notebook computers and the like.

In a typical embodiment, the mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Further, the use of the terms "server", "server system", and the like, refer to computing devices that can comprise one or more servers that are networked together. Additionally, the functions of various servers as described herein may be combined into a single server or server system. It is appreciated that the servers and mobile devices have memory for storing data and computer executable instructions and processors for executing the same.

Turning to FIG. 1, an example embodiment of transaction system is provided. A mobile device 10 is shown in communication with a server system 8, for example, through a network connection 2 and a wireless gateway 4. Non-limiting examples of a wireless gateway 4 include an 802.11 wireless router, GGSN (Gateway GPRS Support Node), PDSN (Packet Data Serving Node), or another similar component which serves as an access point to another network. The wireless gateway 4 allows the mobile device 10 to interact, whether directly or indirectly, with the server system 8. The wireless gateway 4 interacts with the server system 8 through the network connection 6. The server system 8 is hereon referred to as a payment gateway or merchant server, as it operates in a chain between a consumer interface (e.g. the mobile device 10) and a payment entity, represented by the payment server 20. In an example embodiment, the payment gateway 8 facilitates the authorization of payments, facilitates access to merchants, and calls functions of a payment server 20. It can be appreciated that the terms "payment gateway" and "merchant server" are herein used interchangeably. As will be discussed in more detail below, the payment gateway or merchant server 8 has databases 12 and 14 for storing information about mobile devices and payment accounts, respectively. However, the organization and number of databases can vary. An example embodiment of such a payment gateway or merchant server 8 is provided by Xtreme Mobility Inc. or Admeris Payment Systems Inc.

Continuing with FIG. 1, the payment gateway 8 is in communication with a payment server 20 through a network connection 16. The payment server 20 is associated with a payment entity (not shown) that serves to process a payment or transaction using m-commerce and e-commerce methods. In one aspect, the payment server 20 transfers an amount of value (e.g. money, points, credit, etc.) from a user's value account (as identified by a payment ID) to another entity (e.g. in exchange for goods, products, services, etc.). Non-limiting examples of payment entities include credit card services (e.g. Visa, MasterCard, American Express, etc.), banking organizations, and third party banking services (e.g. Moneris, First Data). In another embodiment, the payment server 20 is the acquiring bank itself, which receives the payment of value from the user's value account. More generally, a payment server 20 charges the user's value account in exchange for a service or good. The payment server 20 is therefore interchangeably referred to as the acquirer.

The payment gateway 8 is also in communication with a supplemental server 22 through a network connection 18. The supplemental server 22 hosts a verification module 23, which verifies the supplemental ID and payment ID. Example embodiments of such verification systems include a CVV or CSV server 24, which holds a database 26 for storing CVV and CSV values (e.g. supplemental IDs) and associated credit card account numbers (e.g. payment IDs). Alternatively, or additionally in combination, the server 24 may be a 3D Secure server and the database 26 may hold 3D Secure passwords (e.g. supplemental IDs) and associated credit card account numbers (e.g. payment IDs). In another example embodiment, a banking server 28 holds a database 30 that stores banking account information (e.g. payment IDs) and a password (e.g. supplemental IDs). In another example embodiment, a verification server 32 obtains data (e.g. supplemental IDs) from a user through the mobile device 10 through retrieval process 34, whereby the data is stored in association with payment IDs. Examples of such data can include voice data, biometric data (e.g. finger prints, eye scanner, etc.), GPS data, etc. For example, in the retrieval process 34, the server 32 contacts the user through the mobile device 10 and asks the user for their favourite color. Such data or supplemental ID is stored in association with the payment information on the supplemental server 22.

The supplemental server 22 is also considered the issuer, which issues an amount of value from the user's value account. In other words, the user's value account is stored or controlled by supplemental server 22, also referred to interchangeably as the issuer. An example of such an issuer could be credit card entity (e.g. Visa, MasterCard), a bank, or any other entity holding an amount of value under a user's value account.

In another example embodiment, the supplemental server 22 (e.g. the issuer) can be in communication with the payment server 20 (e.g. the acquirer), and need not communicate through the payment gateway 8. The supplemental server 22 and the payment server 20 can communicate with each other through the network 21. For example, if the supplemental server 22 is a Visa credit account (e.g. the issuer) and the payment server 20 is a retailer's bank (e.g. the acquirer), then network 21 is VisaNet.

In another example embodiment, the operations and functions of the supplemental server 22 and payment server 20 may be combined into a unified server system. In another example embodiment, the functions and operations of the payment gateway 8 and the payment server 20 may be combined into a unified server system. In another example embodiment, the functions and operations of the payment gateway 8 and the supplemental server 22 may be combined into a unified server system. In yet another example embodiment, the functions and operations of all servers 8, 20 and 22 may be combined into a unified server system. It is also appreciated that the connections 6, 16 and 18 may be wireless or non-wireless (e.g. wired), or both.

In particular, regarding the example embodiment where the functions and operations of the payment gateway 8 and the payment server 20 are combined into a unified server system, the payment gateway 8 (e.g. now the acquirer) requests an amount of value from the supplemental server 22 (e.g. the issuer).

It can be appreciated that there are various types of settlement methods, where money can transfer or move between various entities to settle accounts.

Figure 2:
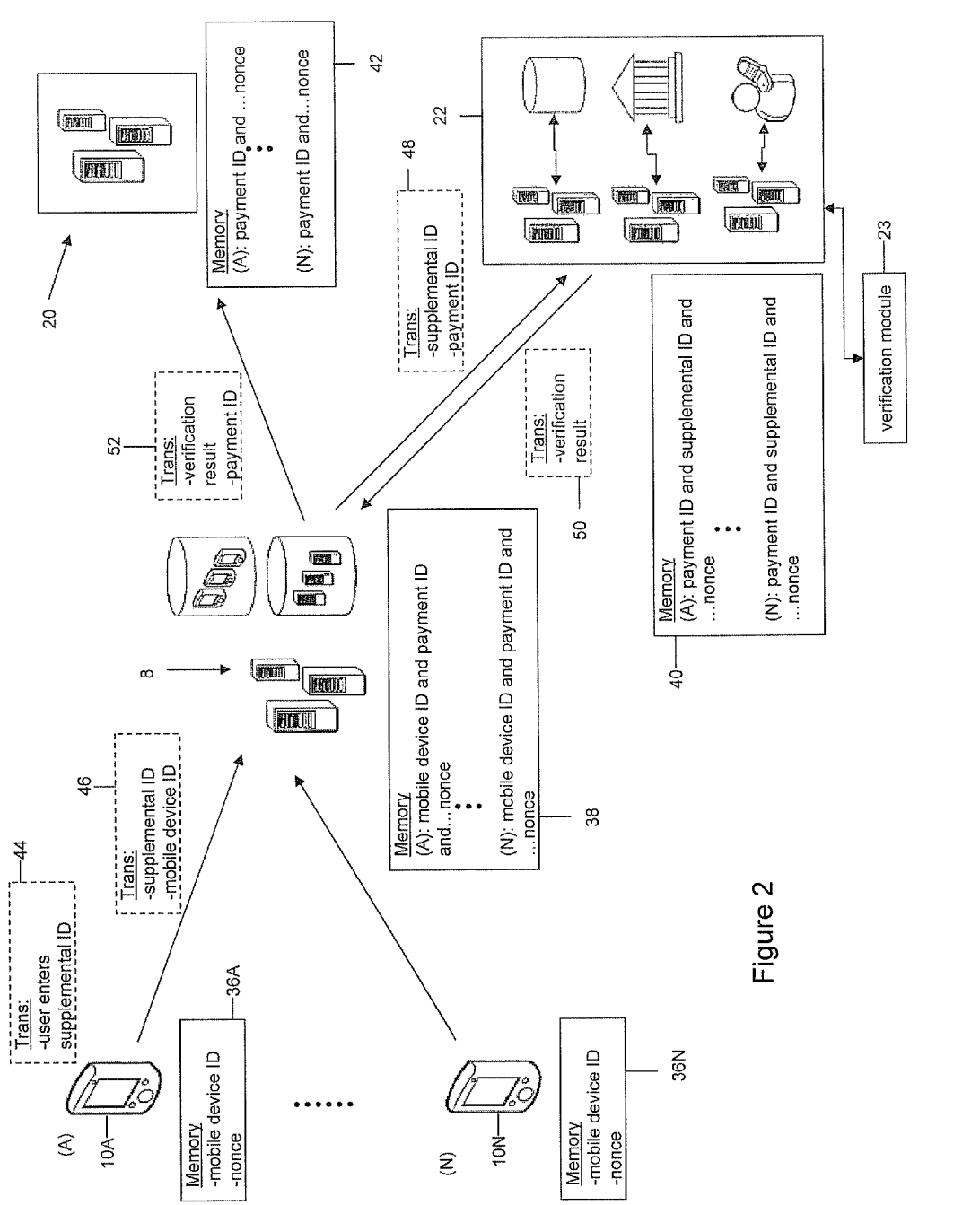

Turning to FIG. 2, another example embodiment of the authentication and transaction system is shown, including where information is stored during registration and how information is moved from one device to another during a transaction. The information that is stored as a result of the registration process is shown as part of the memory stores, illustrated in solid lines. The information that is transmitted during a transaction is illustrated in dotted or broken lines. One or more mobile devices 10A and 10N (e.g. each belonging to a user) may communicate with the payment gateway 8. Upon the completion of registration, each mobile device 10A, 10N stores in its memory 36A, 36N, respectively, at least a mobile device ID. Other information stored in the mobile device memory 36A, 36N may be a nonce and personal information (e.g. name, birth date, address, etc.). In an example embodiment, a mobile device 10 does not store the supplemental ID nor the payment ID. Also, the memory stores of the payment gateway 8 contain, for each mobile device, at least the corresponding mobile device ID and payment ID. Other information can include a nonce. In an example embodiment, the payment gateway 8 does not store the supplemental ID. In another example embodiment, upon successful registration, it is also confirmed that the payment ID and supplemental ID are stored on supplemental server 22 or verification module 23, in memory 40. Likewise, the memory 40 of the supplemental server 22 can also store a nonce. The payment server 20 stores at least the payment IDs for each of the users. It is appreciated that typically, the supplemental ID and payment ID are stored on the supplemental server 22 prior to the registration process, and the payment ID is stored on the payment server 20 prior to the registration process.

In a transaction, after registration is complete and the required information has been stored in the mobile device 10 and the servers, the user may initiate a payment from a payment account, as identified by the registered payment ID. In an example embodiment, the user only enters the supplemental ID into the mobile device 10 (block 44) in order to complete the transaction and authentication. The mobile device ID, automatically retrieved from the mobile device's memory 36A, and the supplemental ID are transferred from the mobile device 10 to the payment gateway 8 (block 46). The payment gateway 8 then retrieves the payment ID, corresponding to the received mobile device ID, and sends both the supplemental ID and payment ID to the verification module 23 in supplemental server 22 (block 50). Upon the supplemental server 22 (or verification module 23 therein) verifying the received payment ID and supplemental ID are authentic or correct as compared with the IDs stored in memory 40, then supplemental server 22 sends a verification result 50 back to the payment gateway 8. If the verification result confirms the supplemental ID provided by the mobile device 10 is correct or authentic, then the payment gateway 8 sends the verification result and payment ID to the payment server 20 (block 52), thereby allowing the payment server 20 to complete the payment from the payment account.

FIG. 3, FIG. 4, FIG. 5 and FIG. 6 show various other example embodiments for authenticating a mobile device during a transaction process. For brevity and as to not obscure the description of the various transaction processes, the transaction processes are described onwards from the stage after the user has entered their supplemental ID into the mobile device 10 and the mobile device 10 has sent the mobile device ID and supplemental ID to the payment gateway 8.

Figure 3:
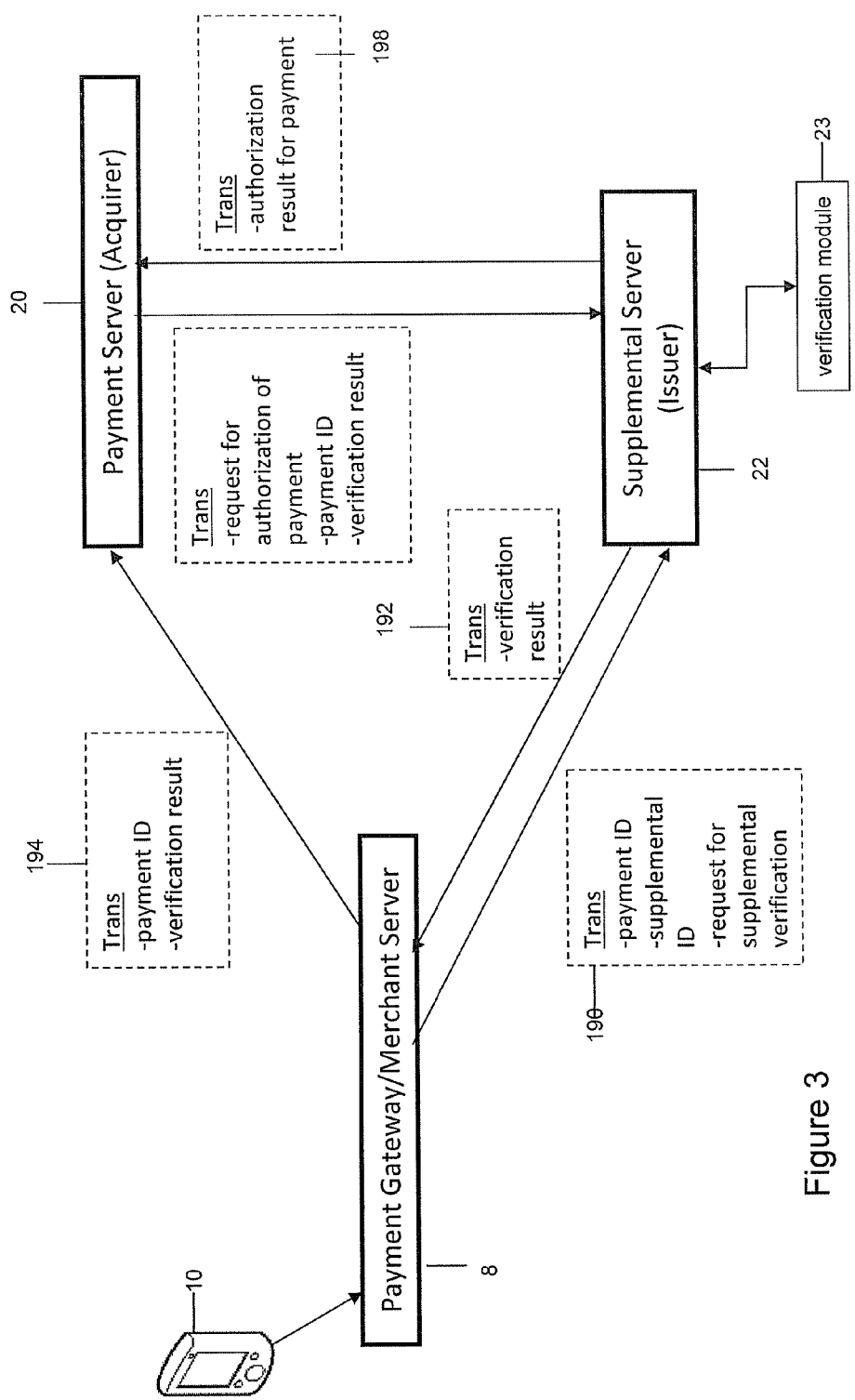
FIG. 3 is a schematic diagram of an example embodiment showing the transfer of information between the payment gateway, supplemental server and payment server, to authenticate a transaction.

In FIG. 3, during the transaction process, at block 190, the payment gateway 8 sends the payment ID and supplemental ID to the supplemental server 22 (e.g. the issuer). Block 190 also includes a request for supplemental verification. The supplemental server 22, upon receiving the request for supplemental verification and verifying the IDs, sends a verification result to the payment gateway 8 (block 192). The payment gateway 8 then sends the payment ID and verification result (block 194) to the payment server 20 (e.g. the acquirer). The payment server 20 then sends a request for authorization for payment, payment ID and verification result to the supplemental server 22. The supplemental server 22, based on the verification result and payment ID, then issues or sends an authorization result for payment to the payment server 20 (block 198). This embodiment is suitable for use, for example, where the supplemental ID is a 3D Secure password and the supplemental server 22 is a Visa account having Verified by Visa systems and methods.

Figure 4:
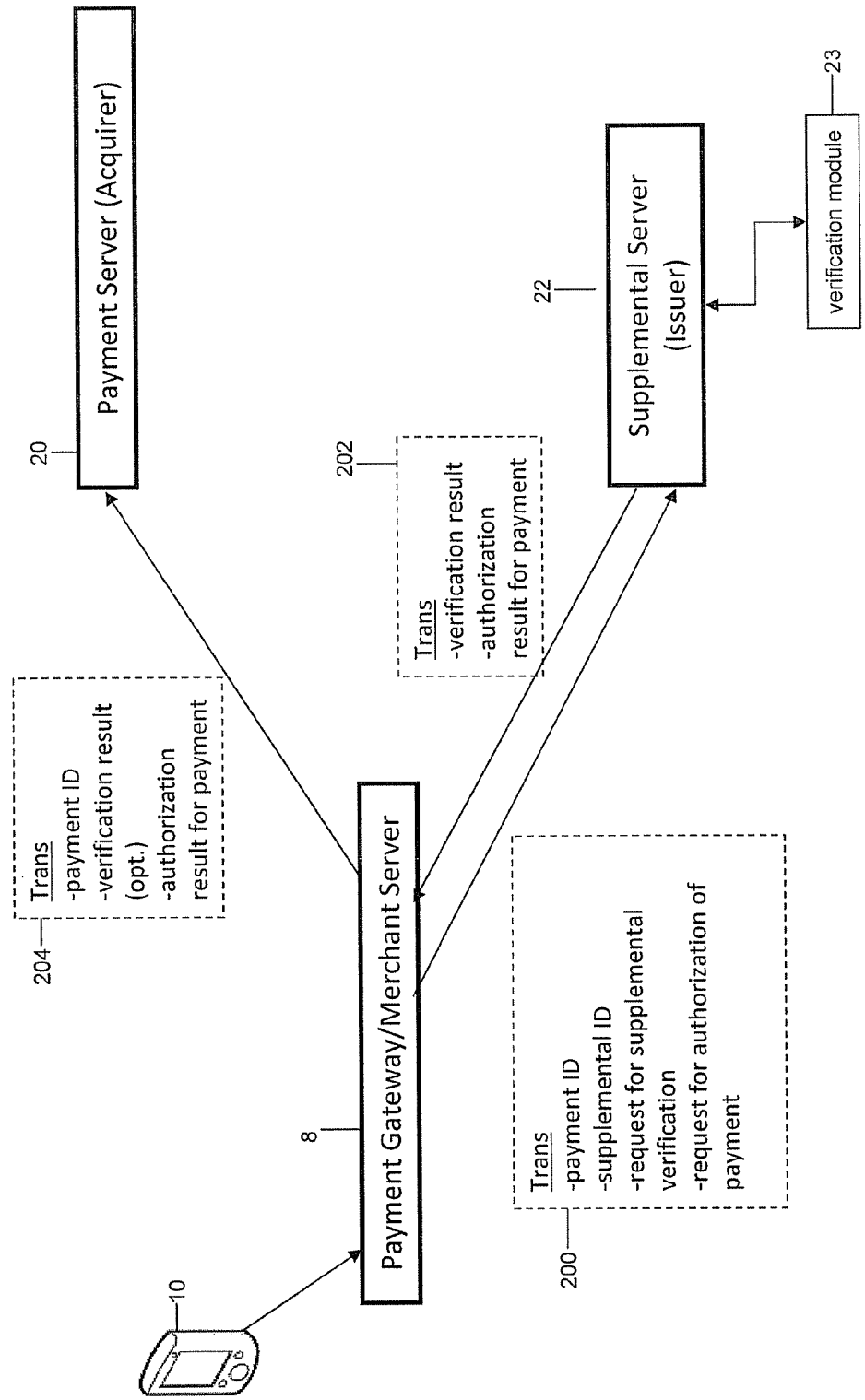
FIG. 4 is a schematic diagram of another example embodiment showing the transfer of information between the payment gateway, supplemental server and payment server, to authenticate a transaction.

FIG. 4 shows another example embodiment where the payment gateway 8 sends the payment ID, supplemental ID, request for supplemental verification, and request for authorization of payment to the supplemental server 22 (block 200). In return, the supplemental server 22 sends a verification result and an authorization result for payment back to the payment gateway 8 (block 202). The payment gateway 8 then transfers the payment ID and authorization result for payment, and optionally the verification result, to the payment server 20 (block 204).

Figure 5:
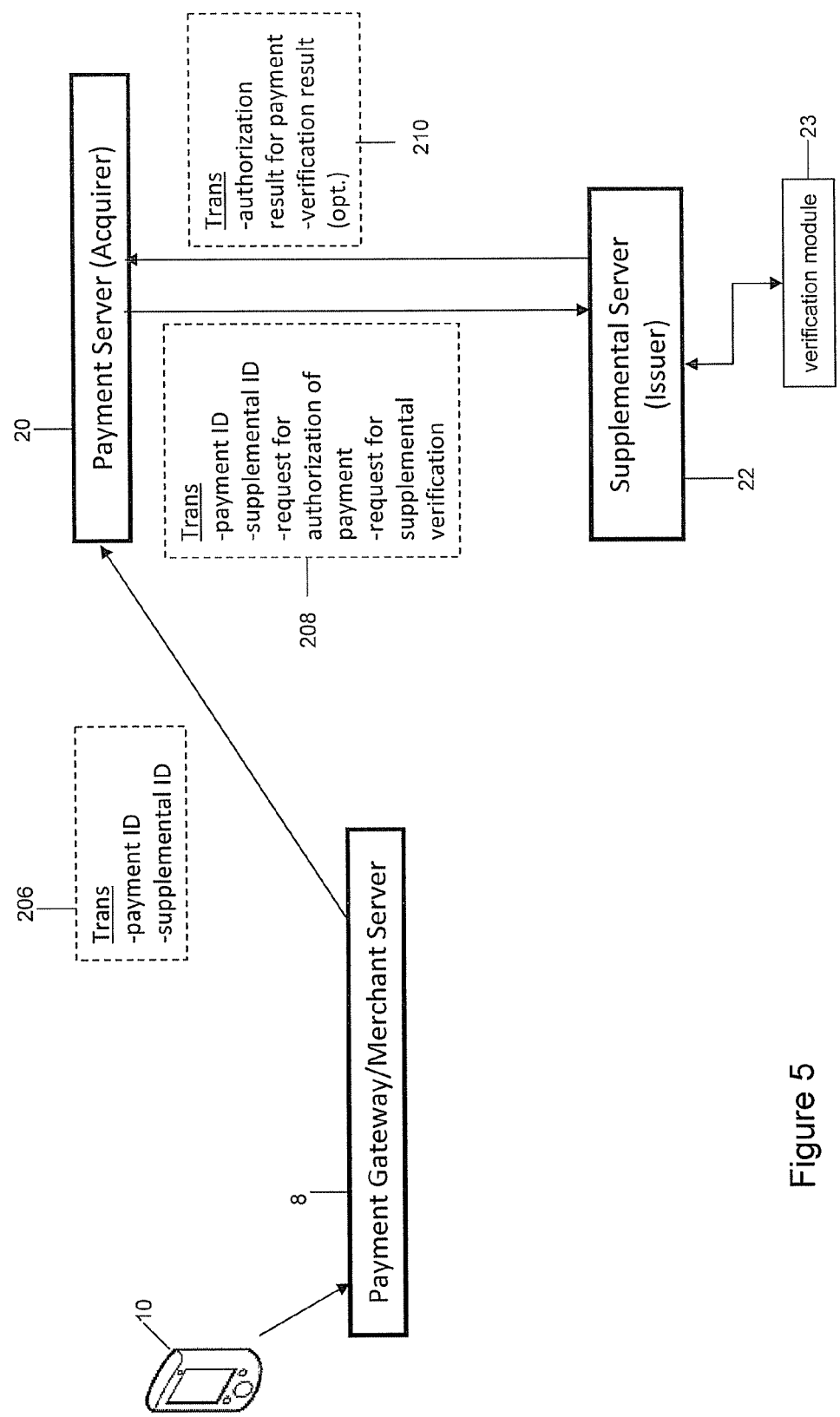
FIG. 5 is a schematic diagram of another example embodiment showing the transfer of information between the payment gateway, supplemental server and payment server, to authenticate a transaction.

FIG. 5 shows another example embodiment where the payment gateway 8 sends the payment ID and supplemental ID to the payment server 20 (block 206). The payment server 20 then sends a request for supplemental verification, a request for authorization of payment, the supplemental ID and the payment ID to the supplemental server 22 (block 208). The supplemental server 22, upon verifying the IDs, generates an authorization result for payment and a verification result. The supplemental server 22 then sends at least the authorization result for payment, and optionally the verification result, back to the payment server 20 (block 210). This example embodiment is suited, for example, to a supplemental ID being a CVV (or the like).

Figure 6:
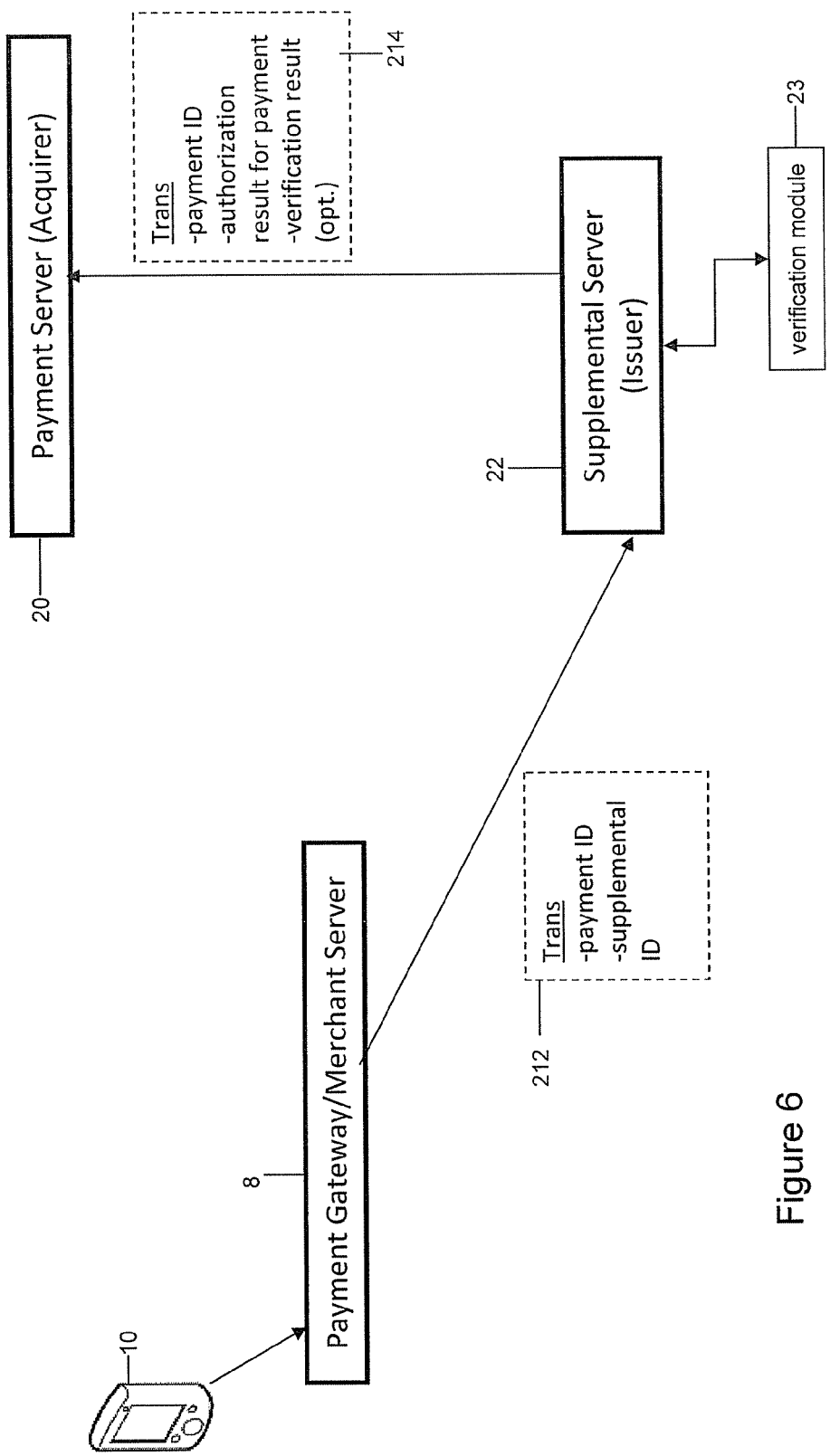
FIG. 6 is a schematic diagram of another example embodiment showing the transfer of information between the payment gateway, supplemental server and payment server, to authenticate a transaction.

FIG. 6 shows another example embodiment of a transaction process, where the payment gateway 8 sends the payment ID and supplemental ID to the supplemental server 22 (block 212). Upon the supplemental server 22 verifying the IDs, the supplemental server 22 issues an authorization result for payment and verification result. At least the authorization result for payment and payment ID are sent to the payment server 20, and optionally the verification result as well (block 214).

From the above, it can therefore be appreciated that the IDs may be transferred between various entities in order for the supplemental server to verify the supplemental ID and payment ID, and to transfer the funds to the payment server 20.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, payment gateway r 8, payment server 20, supplemental server 22, or combinations thereof, or accessible or connectable thereto. Any application or module herein described may be implemented using computer readable/executable instructions or operations that may be stored or otherwise held by such computer readable media.

Details regarding the different embodiments of the registration and transaction processes will now be discussed.

Figure 7:
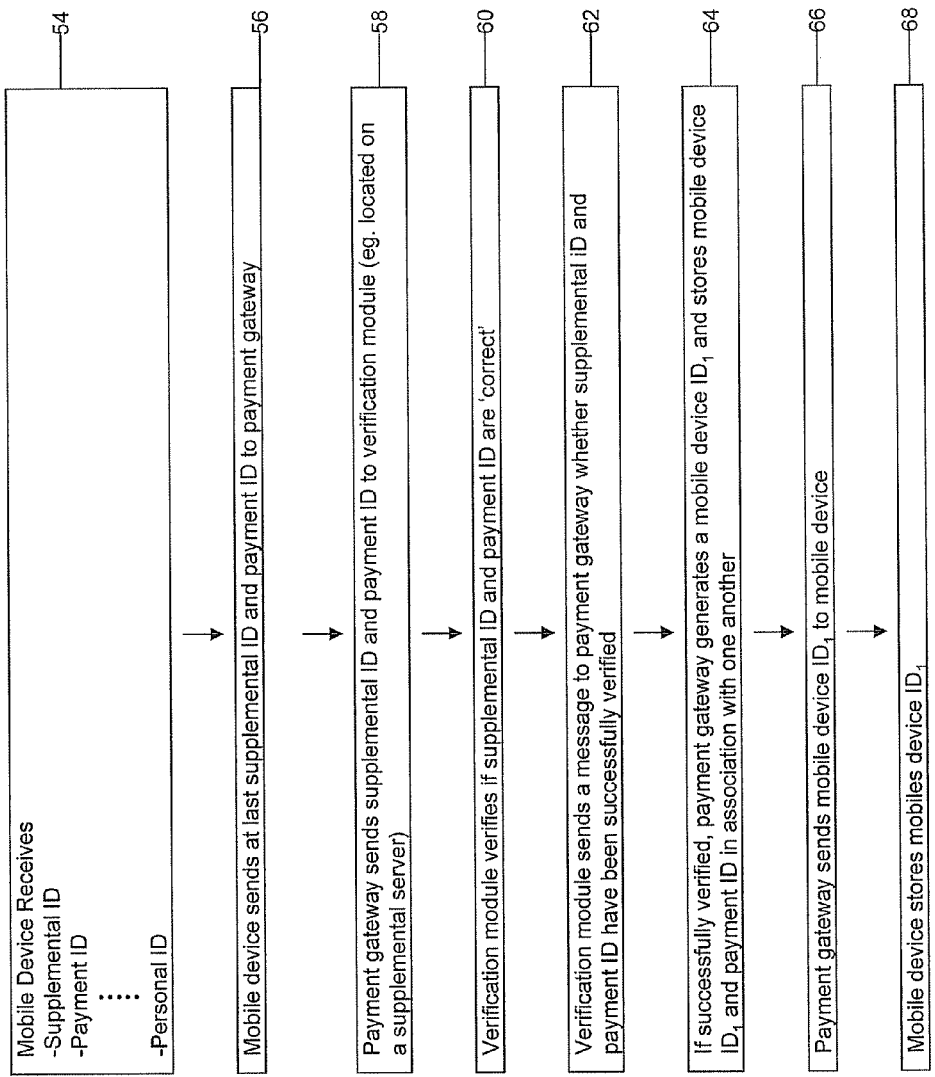
FIG. 7 is a flow diagram illustrating example computer executable instructions for registering a mobile device in association with a payment ID.
Figure 8:
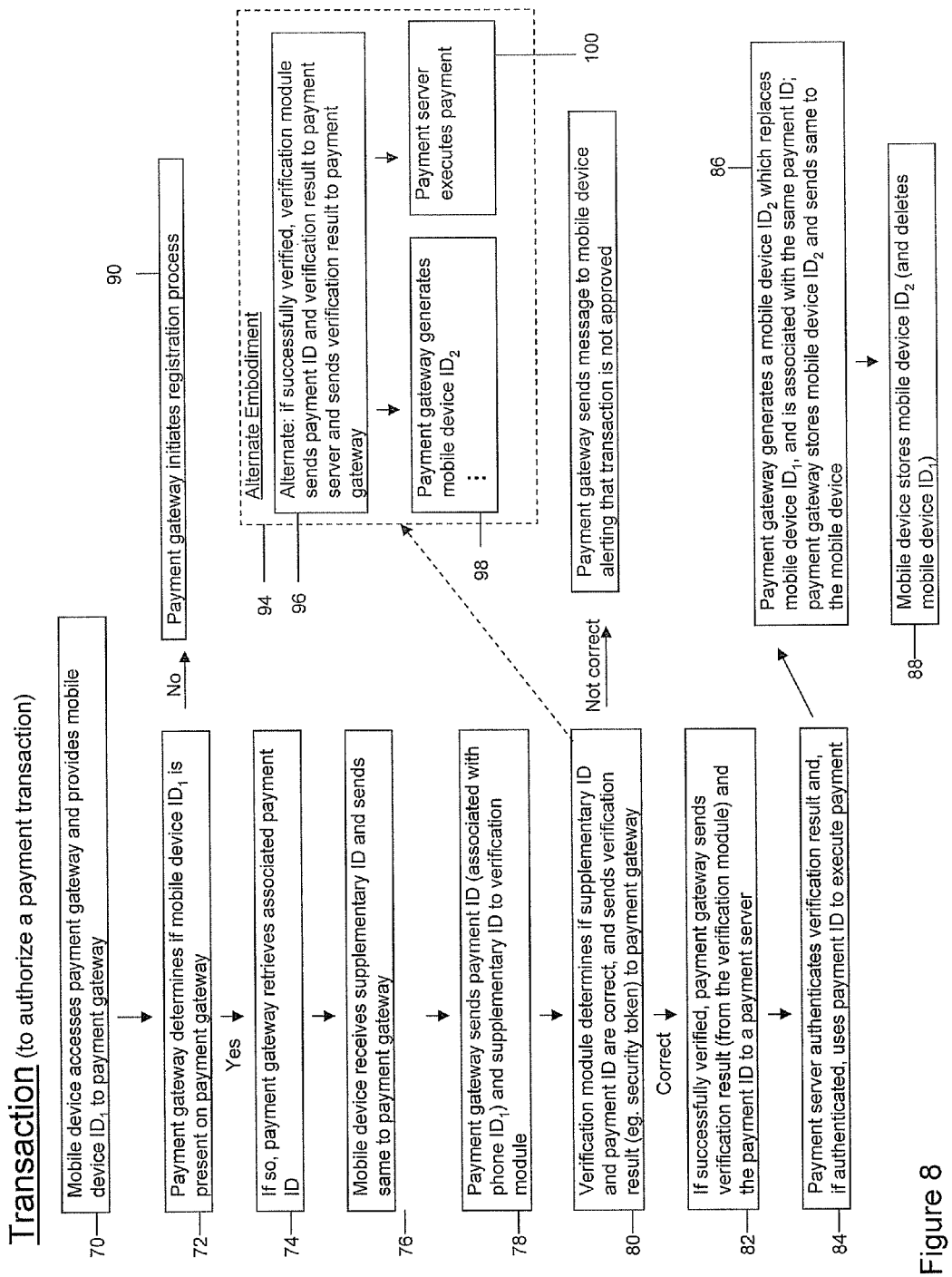
FIG. 8 is a flow diagram illustrating example computer executable instructions for authenticating a transaction after the registration shown in FIG. 7.

FIG. 7 and FIG. 8 provide example computer executable instructions for an example embodiment of a registration process and a transaction process, respectively. Turning to FIG. 7, the registration begins by the mobile device 10 receiving at least the supplemental ID and payment ID, for example, from the user. The mobile device 10 may also receive personal information or ID, such as name, date of birth, address, etc. At block 56, the mobile device 10 sends at least the supplemental ID and payment ID to the payment gateway 8.

In an example embodiment, the mobile device 10 does not store the supplemental ID and payment ID. In this way, the security of the payment ID and supplemental ID are not at risk, even if the security of the mobile device 10 is compromised (e.g. stolen or accessed by an adversary). It can be appreciated that information (e.g. the payment ID and supplemental ID) can pass through the mobile device 10, but not be stored on the mobile device 10, since such information is considered non-persisted information. In the same way, the supplemental ID can be treated as non-persisted information on the payment gateway 8, so that the payment gateway 8 does not store the supplemental ID. The non-persisted information would be held in volatile memory on both the payment gateway 8 and mobile device 10. In some cases, this may imply swap or various shared-memory strategies.

At block 58, the payment gateway 8 sends or forwards the supplemental ID and payment ID to the verification module 23 (e.g. located on supplemental server 22). In an example embodiment, the payment gateway 8 does not store the supplemental ID. In this way, the security of the supplemental ID is not at risk, even if the security of the payment gateway 8 is compromised. Moreover, the liability for security risk is reduced for the payment gateway 8. At block 60, the verification module 23 verifies if the received supplemental ID and payment ID are correct, for example, by comparing the received values with the previously stored values of supplemental IDs and payment IDs. At block 62, the verification module 23 sends a message to the payment gateway 8, indicating if the supplemental ID and payment ID received by the mobile device 10 have been successfully verified. At block 64, if data has been successfully verified, then the payment gateway 8 generates a first mobile device ID (mobile device IN and stores the first mobile device ID and the payment ID in association with one another, for example in memory 38. The first mobile device ID is, for example, randomly generated and may include some value related to the mobile device 10 itself. In another example, the first mobile device ID may be derived from or include an inherent feature or characteristic of the mobile device 10. The payment gateway 8 then sends the first mobile device ID (mobile device $ID_1$) to the mobile device 10 (block 66), so that the mobile device 10 can store the first mobile device ID (block 68).

In another example embodiment, the mobile device ID is generated before the supplemental ID and payment ID have been successfully verified. In another example embodiment, the mobile device ID can be generated from any one or more of the mobile device 10, the payment gateway 8, the payment server 20, or the supplemental server 22.

Turning to FIG. 8, the transaction involves the user, through the mobile device 10, checking out an item or service for purchase from a e-commerce or m-commerce retailer. For example, the retailer's site (e.g. website or network site) automatically directs the mobile device 10 to the payment gateway 8. Therefore, the retailer is not required to host the payment and transaction authentication processes on their servers or website. In an example embodiment, the transition from the website of the e-commerce or m-commerce retailer appears to be seamless, so that a user may not be aware the website or server host has changed to the payment gateway 8.

It can also be appreciated that the systems and methods described herein can, for example, operate on a web-browser interface and does not require an additional application to be installed on the mobile device.

It can be appreciated that the retailer's account and payment amount is already known, as provided by the retailer's e-commerce or m-commerce website, and such information can also be passed through to the payment gateway 8 and to the payment server 20, so that the payment server 20 can make a payment from the user's payment account to the retailer's account for the payment amount specified. However, the transaction system as specified herein does not require the user to enter in the payment amount, the retailer information, or the user's own payment information. The only required information to be entered into the mobile device from the user is the supplemental ID.

In particular, at block 70, the mobile device 10 accesses the payment gateway 8 and provides mobile device $ID_1$ to the payment gateway 8. At block 72, the payment gateway 8 determines if mobile device $ID_1$ is present on the payment gateway. If so, at block 74, the payment gateway 8 retrieves the payment ID associated with mobile device If not, at block 90, the payment gateway 8 initiates the registration process. Continuing from block 74, at block 76, the mobile device 10 receives the supplemental ID (from user input) and sends the supplemental ID and mobile device $ID_1$ (as retrieved from the mobile device's memory) to the payment gateway 8. The mobile device 10 does not store the supplemental ID. At block 78, the payment gateway 8 retrieves the payment ID associated with mobile device and sends the payment ID and supplemental ID to the verification module 23. At block 80, the verification module determines if the received supplemental ID and payment ID are correct, for example, by comparing the received supplemental ID and payment ID with the supplemental ID and payment ID stored in the supplemental server 22. The verification module 23 sends the verification results, for example a security token, to the payment gateway 8. If the verification result indicates that the supplemental ID is not verified or not correct, then at block 92, the payment gateway sends a message to the mobile device alerting that the transaction is not approved. If, however, the supplemental IDs are successfully verified, then at block 82, the payment gateway 8 sends the verification result (sent by the verification module 23) and payment ID to the payment server 20. At block 84, the payment server 8 authenticates or determines if the verification result is successful and, if authenticated, uses the payment ID to execute the payment. At block 86, the payment gateway 8 generates a new mobile device ID, mobile device $ID_2$, which replaces mobile device $ID_1$, and is associated with the same payment ID. The payment gateway 8 stores mobile device $ID_2$ and sends the same to the mobile device 10. At block 88, the mobile device 10 stores mobile device $ID_2$, and can delete mobile device $ID_1$. In this example embodiment, it is appreciated that a new mobile device ID is generated during each transaction to replace the previous mobile device ID in order to prevent replay attacks. The new mobile device ID (e.g. mobile device $ID_2$) will be used in the next transaction as a security check conducted by the payment gateway 8.

In an alternative embodiment (block 94) for the transaction process of FIG. 8, at block 80, upon the verification module 23 successfully verifying the supplemental ID and payment ID are authentic, in addition to sending the verification result to the payment gateway 8, the verification module 23 also sends the payment ID and verification result to the payment server 20 (block 96). At block 100, the payment server 20 executes the payment. At block 98, the payment gateway 8 generates mobile device $ID_2$ and sends the same to the mobile device 10 for storage.

Figure 9:
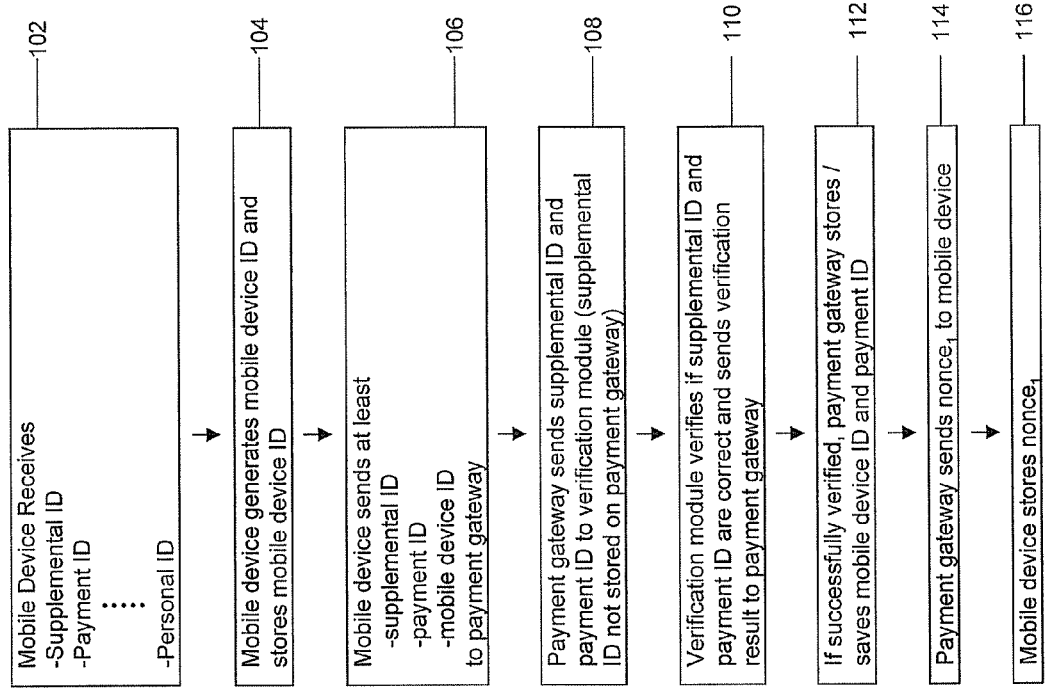
FIG. 9 is a flow diagram illustrating example computer executable instructions for registering a mobile device in association with a payment ID using a nonce value.
Figure 10:
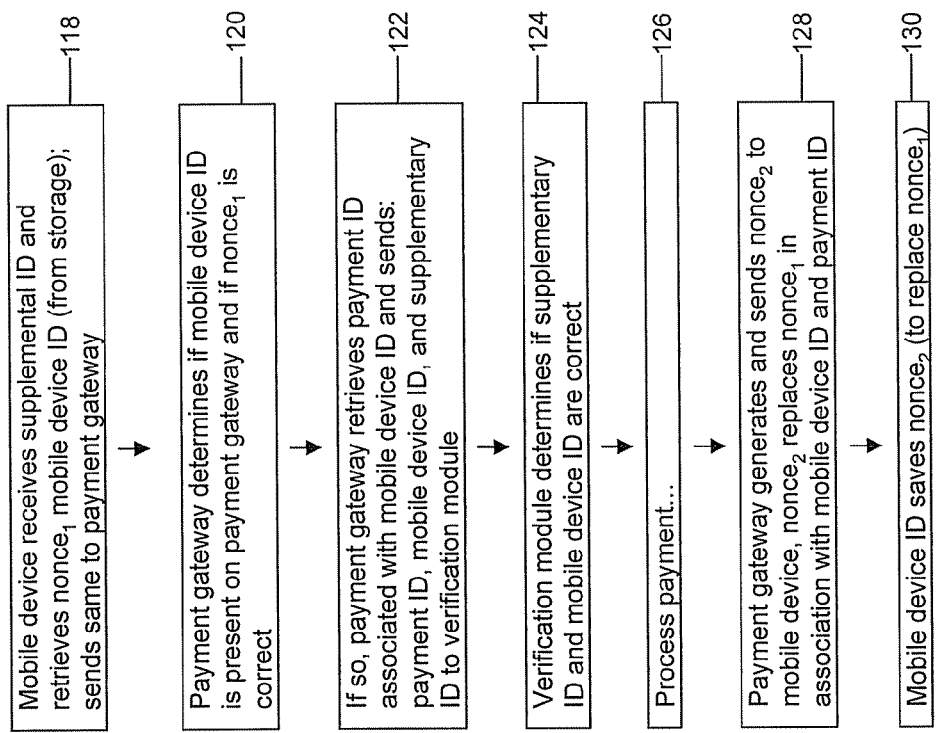
FIG. 10 is a flow diagram illustrating example computer executable instructions for authenticating a transaction after the registration shown in FIG. 9.

In another example embodiment, FIG. 9 provides computer executable instructions for a registration process and FIG. 10 provides computer executable instructions for a transaction process. Turning to FIG. 9, at block 102, the mobile device 10 receives, for example through user inputs, at least the supplemental ID. The mobile devices 10 retrieves the payment ID. Block 102 is similar to block 54, described earlier. At block 104, the mobile device 10 generates and stores the mobile device ID. At block 106, the mobile device 10 sends the supplemental ID, the payment ID, and the mobile device ID to the payment gateway 8. The supplemental ID and payment ID are not stored on the mobile device 10. At block 108, the payment gateway 8 sends the supplemental ID and payment ID to the verification module 23 (e.g. located in the supplemental server 22). At block 110, the verification module 23 verifies if the supplemental ID and the payment ID are correct and sends the verification results to the payment gateway 8. If successfully verified, the payment gateway stores or saves the mobile device ID and payment ID in association with one another (block 112). The payment gateway 8 then generates a nonce value (e.g. $nonce_1$) that is sent to the mobile device 10 (block 114) for storage therein (block 116).

In another example embodiment, the payment gateway 8 may store the mobile device ID and payment ID earlier, before the verification module 23 verifies that supplemental ID and the payment ID.

At FIG. 10, upon initiating a transaction, the mobile device 10 receives the supplemental ID from the user, retrieves $nonce_1$ and the mobile device ID from memory, and sends these values to the payment gateway 8 (block 118). At block 120, the payment gateway 8 determines if the mobile device ID is present on the payment gateway 8, and if $nonce_1$ is correct. If so, at block 122, the payment gateway 8 retrieves the payment ID associated with the mobile device ID and sends the payment ID, mobile device ID, and supplemental ID to the verification module 23 (e.g. located on the supplemental server 22). At block 124, the verification module 23 determines the if the supplemental ID and mobile device ID are correct. If so, the payment is processed by the payment server 20 (block 126), for example, by propagating the verification result. At block 128, the payment gateway 8 generates and sends a new nonce value (e.g. nonce$_2$) to the mobile device 10, which replaces the previous nonce value (e.g. nonce$_1$). The new nonce value is associated with the mobile device ID and the payment ID. At block 130, the new nonce value is saved and is used for a subsequent transaction. The updating of nonce values is used to mitigate risk of replay attacks.

In the example embodiment of FIG. 9 and FIG. 10, it can be appreciated that the mobile device ID remains static and does not change from transaction to transaction. Moreover, the use of nonce values, although preferred, is not required.

Further example embodiments and details of the above systems and methods are described below.

In an example embodiment, the mobile device 10 will persistently retain, in a browser storage mechanism (such as cookies, web-storage, local shared objects, etc.), its mobile device ID for further retrieval. The payment gateway 8 persistently maps or otherwise associates in a data storage mechanism 38 the mobile device ID with external or internal data items (such as system identifiers, or mobile device data or user data, such as the public component of a key pair) or entities (such as other services, service providers, or other externalities), which, directly or indirectly, partially or fully, identify the specific mobile device 10.

In another example embodiment, when the mobile device 10 indicates an intent to complete a transaction, the mobile device 10 provides (such as through the HTTP or HTTPS request) or makes available (such as through client-side scripting) its mobile device ID, along with any data applicable to the transaction, to the payment gateway 8. The payment gateway 8 will use the mobile device ID to resolve mapped or associated data items or entities to authenticate the mobile device 10 (whether by data matching, external system calls, or any similar mediums).

In another example embodiment, the mobile device 10 is capable of interacting with the payment gateway 8 through protocols similar to HTTP (encrypted or otherwise). The mobile device 10 may access the payment gateway 8 with an application such as a web browser, or an application similar in function, whether partially or fully, to a web browser. The mobile device 10 participates in transactions, or similar units of work, which accomplish some goal, such as an e-commerce or m-commerce transaction, publishing or retrieving content, identifying a user, confirming another transaction, and other similar goals.

In another example embodiment, the payment gateway 8 may determine if the mobile device 10 sent a mobile device ID with the transaction request. If so, the payment gateway 8 may determine if the mobile device ID is valid. If so, the payment gateway 8 may verify the transaction with any or all associated available supplemental servers 24, 28, 32. If the payment gateway 8 deems the transaction risk within an acceptable threshold, for example, all or most supplemental servers 24, 28, 32 reported a positive result, the payment gateway 8 then performs the transaction, submitting, as necessary, all data to any or all payment servers 20 or similar supporting mechanisms.

In another example embodiment, if the mobile device 10 provides no mobile device ID or an invalid mobile device ID to the payment gateway 8, the mobile device 10 is provided the option to initiate a registration process with payment gateway 8.

In another example embodiment, if a transaction is unsuccessful for any reason, the mobile device 10 is notified. The payment gateway 8 may even retry the failed transaction a number of times, prior to notifying the mobile device 10 of the unsuccessfully verification.

Details regarding the mobile device ID are described below. The mobile device ID uniquely identifies each mobile device. A mobile device ID is a value or collection or set of values, which, together, are able to identify one mobile device 10 from all other mobile devices 10. The proposed systems and methods do not depend on, or require, the mobile device ID to be in any specific format or presentation, nor does the mobile device ID need to be derived by or with any specific method or data. Further, the mobile device ID need not be derived in a consistent means or represented in a specific way. For example, the method of generating the mobile device ID can change from one transaction to another.

In one example embodiment, the mobile device ID is a composite value which is derived or created based on a combination of data provided by, or on behalf of, the mobile device 10. For example, the mobile device ID is based on one or more of the following values: subscriber identity information stored on a SIM (Subscriber Identity Module) card, a NFC chip (Near Field Communication), IMEI (International Mobile Equipment Identity) of a mobile device 10, network-provided (via proxy injection, perhaps) information, a list of web browser plug-ins/add-ons, and, cookies, user agent, and other headers provided by a browser on the mobile device 10.

The composite type mobile device ID can be derived in multiple stages. For example, the payment gateway 8 may collect a web browser's user agent and retain it, temporarily, until any or all additionally required data, such as that which may be collected only through execution of a scripting language on the mobile device's browser, can be retrieved and used to derive a mobile device ID.

In another example embodiment, the payment gateway 8 uses data sent on behalf of the mobile device 10. For example, if the mobile device 10 is accessing the payment gateway 8 through an Internet proxy (e.g. a WAP proxy, carrier proxy, corporate proxy. BES, etc.), any additionally provided data, such as phone numbers, carrier identification, or proxy providers, may be collected and used to generate the mobile device ID. Further yet, even network-layer information, such as IPs, ports, DNS names, etc. may be used in the mobile device ID derivation process.

In an example embodiment, derived, consequential, or point-in-time data, or combination thereof, may be part of the mobile device ID. Such data is referred to as temporal or ephemeral data. One example embodiment may use specific datums of the mobile device 10, such as the GPS (Global Positioning System) coordinates, battery temperature, accelerometer readings, light levels (brightness of a room, for example), SSID (Service Set ID) or ESSID (Extended Service Set ID) of a wireless access point, LAN (Local Area Network) IP (Internet Protocol) address of a mobile device 10, etc. as potential components of a mobile device ID. The current ISP (Internet Service Provider), thus country, city, and possibly neighbourhood and location of residence of a mobile device 10 can also be used to form the mobile device ID. In such a case, even more detailed data, such as economic status, employment status, education level, behavioural characteristics, etc. provided by external systems, can be used as components of a mobile device ID. In general, various measurable characteristics of mobile device's environment may be used as components in the derivation of the mobile device ID.

It can be appreciated that when mobile device IDs are derived from the above ephemeral data or characteristics, the mobile device ID does not require an actual storage mechanism on the wireless device 10. In other words, the derived ephemeral data may be recomposed into a mobile device ID "on the fly", or when required during transaction and registration processes. It is recognized that the mobile device ID may change over time using such methods. To accommodate these resultant differences between the derived (or re-derived) mobile device IDs over time, an example embodiment may use Levenshtein distances, phonetic indexing algorithms, varying methods of record linkage, or other similar techniques. In this way, it can be determined if the difference in a mobile device ID at one point in time is acceptably similar or associated with a mobile device ID at another point in time. In other words, the mobile device IDs do not necessarily need to be equal. Such an example embodiment accommodates differences between derived or re-derived mobile device IDs, or both.

It can therefore be appreciated that the mobile device ID can be replaced by a new mobile device ID and is associated with the payment ID for each subsequent execution of the transaction process. Further, during the transaction process, the payment gateway compares the mobile device ID received from the mobile device to the mobile device ID previously stored during the registration process to determine if they are similar, and if so, authenticates the transaction for execution (e.g. through the payment server 20).

In an example embodiment, the payment gateway 8 stores the mobile device ID using a relational database, object database, or "NoSQL" data store. In another example embodiment, the mobile device IDs may be stored in flat file storage. XML, or JSON. Preferably, although not necessarily, the mobile device IDs are protected by adequate access controls and may even be stored in a strongly encrypted form.

Another example embodiment of a mobile device ID is of the surrogate type. A surrogate type mobile device ID refers to a surrogate value (e.g. a value with no meaning outside the responsibility of being an identifier) that is unique within the payment gateway 8. Such an embodiment does not require or depend on a surrogate identifier to be derived by any specific means, nor should such an embodiment require or depend on a surrogate identifier to be in any specific format. However, preferred candidates for a surrogate type mobile device ID have the below example characteristics:
- can be displayed as a series of human-readable characters;
- can be generated, calculated, or otherwise created relatively quickly;
- can be created with a random component using a secure RNG (random number generator); and,
- should not contain sensitive information.

A Version 4 UUID (Universally Unique Identifier) meets all of these characteristics and is an embodiment using a surrogate type mobile device ID.

Although the mobile device ID is associated with sensitive information on the payment gateway 8, the mobile device ID itself, being a surrogate, in one example embodiment, is not considered (nor does it contain) sensitive information. Even though the mobile device ID alone is not sufficient to complete a transaction, the mobile device ID is preferably reasonably protected on both the mobile device 10 and payment gateway 8 and should be transmitted over a secure, authenticated channel, like HTTPS.

A mobile device 10 may store its mobile device ID in one (or more) of many storage mechanisms exposed to the mobile device 10. As most websites use HTTP cookies to securely store a session identifier, or similar sensitive (often transitive) data, one embodiment uses cookies as a reasonably secure storage mechanism for the mobile device ID. Another embodiment may use DOM storage (or web storage) as the storage mechanism.

In another example embodiment, for example employed by a SaaS (Software As A Service) provider, may use a hybrid approach, using each of the surrogate type and composite type mobile device ID data. Different types of mobile device IDs may be used for each client, mobile device, transaction, etc. Further, another embodiment may even use more than one strategy, such as using a composite type mobile device ID with a fall-back surrogate type mobile device ID.

Normally, if the mobile device 10 is, a User-Agent or IP address, and the IP address changes, the mobile device 10 would need to be re-associated or registered. In other words, a new mobile device ID would need to generated to replace the previously mobile device ID. However, the embodiment may also use a 'fall-back' unique identifier, which is a surrogate string stored in a browser cookie. This 'fall-back' identifier may be used to automatically re-associate the mobile device 10 with the previous mobile device ID, or may be used in place of the pervious mobile device ID.

Details and embodiments regarding supplemental servers 20 or supplemental verification services are described below. Supplemental systems normally are used to supplement authentication of a transaction with the payment server 20. An example embodiment of a supplemental server 20 may be of a BASE I system, with which the payment gateway 8 authenticates a transaction using a credit card number (e.g. payment ID) and CVV2 number (e.g. supplemental ID). If the supplemental server 20 indicates the CVV2 number matches, or is correct, the payment gateway 8, along with the payment server 20, performs the transaction, possibly through a service provider offering a BASE II. It is appreciated that BASE (Bank of America System Engineering) are processing networks, where BASE I authorizes transactions, and the BASE II clears and settles the transactions.

In an example embodiment where the supplemental server 22 is part of the payment gateway 8 or payment server 20, or both, the combined transaction and authentication system can authenticate a transaction and execute the transaction in one step. Such an embodiment uses a single system as both a supplemental service provider and a payment service provider. A credit card processor that conditionally performs a transaction based on the outcome of a CVV2 verification is an example of such a supplemental system. Though not required by this invention, an example embodiment of this invention may consume the supplemental system last in a series of supplemental systems (22), sometimes known as "last participant". This can be a from of the supplemental systems 24, 28, 32 having different result weighting schemes. For example, if two supplemental systems positively authenticate a payment ID and supplemental ID, and another supplemental system does not authenticate the IDs, then the other two supplemental systems' authentication results are rolled back.

In another example embodiment, multiple supplemental systems are used. For example, in addition to verifying CVV2, the transaction is authenticated by using an external embodiment of Address Verification System (AVS), or using an embodiment of 3D Secure, or both. Such embodiments further exhibit decision strategies, which dynamically determine the perceived risk of a transaction based on the verification responses from any or all supplemental systems. For example, an AVS failure may be acceptable if both CVV2 and 3D Secure are successful. In another example embodiment, different groups of supplemental systems are invoked in accordance to the derived, perceived, or provided economic or social status of a credit card holder in combination with a risk profile of a merchant.

Supplemental systems (e.g. server 32, operation 34) may be biological (e.g. user's eye color, retina scan, finger print, voice analysis, etc.). Other verifiable facts include, for example, a user's favourite color. When the supplemental server 32 attempts to verify the provided response, the supplemental server 32 may contact, via an Interactive Voice Response (IVR) system or similar mechanism, a user's relative or partner to verify the user's favourite color.

Details and embodiments regarding the registration process are provided below. A re-association process can be used as a secondary step to the registration process, in which the initially or previously derived mobile device ID is replaced with another mobile device ID. In the re-association process, the former association between the previous mobile device ID and payment ID is received and used to associate a new mobile device ID with the same payment ID. This re-association is preferably used when using a surrogate-type mobile device ID and a temporal delta or difference in the mobile device ID may introduce an additional audit trail. This may be beneficial to determine how the mobile device ID has changed, as well as when the mobile device ID has changed.

In a case where the mobile device ID is purged or deleted from the mobile device 10 (such as when a mobile device's browser cookies are deleted), re-association may add additional business intelligence. Business intelligence can refer to reporting metrics to track the identity of people and their action (e.g. what and when). This can be used for quality assurance and auditing, among other things. However, it is appreciated that there may be risks, such as information and data leakage, associated with re-association. Data leakage can occur when an adversary manages to "hijack" or re-associate the mobile device 10 with data not formerly associated with the adversary. For example, the adversary may attempt to associate their own mobile device with a user's mobile device ID, thereby stealing the user's mobile device ID. The impact of such attacks may be mitigated, for example, by making the payment gateway 8 explicitly write-only. In other words, the adversary may not be able to read the associated data. Since authentication of a transaction still depends upon an additional item (e.g. the supplemental ID), the adversary would not be able to complete a transaction even with a hijacked association.

Further, another embodiment adds additional processes when re-associating a mobile device 10. For example, the user of a mobile device 10 may be prompted to mail or fax a photocopy of his or her drivers license, credit card statement, social insurance number, or other tangible evidence of the user's identity. It can therefore be understood, that the registration process may take on may embodiments, alone or in combination with one another.

Other example embodiments are provided to further mitigate security risk. For example, MACs (Message Authentication Codes) of a mobile device ID may be computed to help reduce the likelihood of successful brute force attacks. Another example embodiment limits retry velocity to mitigate fraudulent transactions and to enable triggering of an early-warning system. Although the number and type of risk controls vary, the proposed systems and methods do not depend on nor require any specific risk control mechanism.

In one example embodiment of security risk control, MACs are used in combination with a mobile device ID to increase the certainty of authenticity of a transaction. The MAC may be computed using HMAC (Hash-based MAC), whereas another embodiment may use CMACs (Cipher-based MAC). Other MAC protocols may be used. The selected MAC protocol should reasonably verify the authenticity of a message. Accordingly, the payment gateway 8 preferrably retains sufficient data to verify any issued MAC, such as the secret key used to produce the MAC.

During the mobile device ID derivation process, a MAC may be calculated using a secret key known only by the payment gateway 8. The MAC may then be stored on the payment gateway 8, possibly using the same storage mechanism used to store the mobile device ID. The MAC is then transferred for storage on the mobile device 10. The mobile device 10 stores the MAC in a fashion similar to that used for storage of its mobile device ID.

During a transaction, the mobile device 10 sends, along with all applicable transaction data and the mobile device ID, the MAC provided by the payment gateway 8. The payment gateway 8 uses the provided transaction data, likely in combination with the mobile device ID, to verify the MAC provided by the mobile device 10. Should the MAC not be verifiable, the payment gateway 8, for example, revokes the specific mobile device ID, denies the transaction, notifies the system administrators, or other similar actions. However, if, for example, the supplemental ID provided by the mobile device 10 is correct, as verified by the supplemental server 20, then the payment gateway 8 may still elect to approve the transaction.

Although MACs may be useful for checking the authenticity of the request from a mobile device 10, MACs may not provide the desired amount of auditing performance. Some embodiments that employ MAC checking do not inherently benefit from the ability to determine where the MAC was actually created. Embodiments with such audit requirements may benefit, instead, from digital signatures.

In another example embodiment, the security risk controls include guaranteeing the source of origin using digital signatures. Such an embodiment may employ digital signatures to accomplish this requirement. Although one embodiment could perceivably accomplish this with MACs, a payment gateway 8 that is either logically or physically distributed may have several signing keys, and each node in the payment gateway 8 may only have accesses to a subset of the signing keys. In such a scenario, verifying the actual message against the actual signer and, possibly, trust authority, may be more reliable and informative.

When the payment gateway 8 signs the mobile device ID, the signature may be sent to the mobile device 10. Upon receiving the mobile device ID and the signature, the mobile device 10 stores the data in a storage mechanism (cookies, DOM Storage, local shared objects, etc.). When the mobile device 10 indicates an attempt to complete a transaction, the stored digital signature, along with the mobile device ID, may be sent to the payment gateway 8. Upon receiving the digital signature, the payment gateway 8 verifies that the digital signature was created within the payment gateway 8 and can verify the mobile device ID against the signature. This process is in addition to transmitting and verifying the supplemental ID, as discussed earlier.

Another example embodiment uses non-repudiation approaches. In particular, digital signatures are combined with a mobile device ID in order to benefit from the non-repudiation of origin. The introduction of non-repudiation of origin may assist in determining the liability of a party involved in a transaction, such as a transactor (e.g. the person or user who is the card holder initiating the transaction) disputing a credit card purchase. It is appreciated that non-repudiation normally is enabled when the mobile device 10 generates its own private key and adequately safeguards the private key with strong encryption.

In an example implementation of non-repudiation, the mobile device 10 generates a key pair and send its public key to the payment gateway 8 during registration. The payment gateway 8 registers the mobile device 10 as per the above described processes, but additionally retains the public key of the mobile device 10. When a mobile device 10 makes a subsequent transaction, the mobile device 10 may digitally sign either a portion or complete set of data associated with the transaction. An embodiment of this includes signing the mobile device ID. Alternatively, the transaction qualifications (price, quantity, date, etc.) are signed by the mobile device 10. These signing operations can be performed in addition to implementing controls to prevent replay attacks. When the payment gateway 8 receives the data associated with the transaction request, payment gateway 8 verifies the signed data, either continuing as normal or denying the transaction request in accordance to the verification result.

The above described key pairs and digital signatures can be created using plug-ins on the web browser of the mobile device 10. The same operations may be also accomplished with client-sided scripting languages or external applications. For example, JavaScript can be used to generate a key pair and create digital signatures. In another example, a key pair is created from an external application and digital signatures are created using a browser plug-in.

In another example embodiment, revocation approaches can be used as a security risk control mechanism. Depending on how the mobile device ID is generated, it is possible that some embodiments of a mobile device ID have only a reasonable amount of access control and might become known, either by accident or intentionally. For example, it is possible that an adversary can extract the mobile device ID from a stolen mobile device 10, although this alone would be insufficient to authenticate a transaction. Further, packet capturing tools, third-party server logs, and other similar repositories of information and tools, may perceivably be used to intercept, derive, or recover a mobile device ID. Though some embodiments may attempt to mitigate this risk by implementing sequences, other embodiments may, in addition to or in place of, include a mechanism that will revoke, expire, unassociate, invalidate, or otherwise nullify a mobile device ID. Revoking the mobile device ID is preferably, although not necessarily, implemented in combination with other control mechanisms. Revocation can be combined, for example, with limiting retry attempts to reduce the probability of a brute force attack being successful. This is simply because a recovered, intercepted, or derived mobile device ID can only be used a small number of times before the mobile device ID is nullified.

Another security risk control mechanism involves "retry limiting", which limits the rate (and associated risk) of accepting, and subsequently processing, fraudulent transactions. For example, if a mobile device ID is used to unsuccessfully complete a transaction numerous times in a short period of time, then the mobile device ID is revoked. The revoked mobile device ID can consequently discard originating transactions that used the revoked mobile device ID.

In another retry limiting example, a rolling expiration policy used. In such an example embodiment, a mobile device ID is revoked if the user of a mobile device 10 fails to successfully complete a transaction after making a predetermined number of attempts (e.g. five attempts) within a rolling time period (e.g. two minute window). In another variation, a fixed time window can be used in the alternative. A rolling time window herein refers to a time window that is reset after some time (e.g. minutes) after the most recent transaction; the time window is relative to the most transaction. A fixed time window herein refers to a time window that is reset after some time after the first transaction; the time window is absolute as determined from the first transaction.

In another retry limiting example, there are multiple layers of rate limiting. In particular, one layer is targeted at preventing the success of acute brute force attacks and a secondary layer is targeted at preventing the success of slow brute force attacks, which may, otherwise, escape immediate detection. For example, a rolling time window is used on the first layer, and a fixed time window is used on the second layer.

In another example embodiment of security risk control, sequences are used, for example, to facilitate detection of tampering or preventing replays (whether accidental or intentional). Importantly, the systems and methods described herein are not dependent or limited to the source or format of sequences. Randomly generated sequence numbers, or lexical sequences, or both can be used. The sequences are preferably unpredictable to prevent hijacking and large enough to prevent brute force attacks.

An example implementation of sequences in the context the proposed systems and methods includes, during the registration, the payment gateway 8 generating, or be provided, a sequence value, which is stored on the payment gateway 8 and transmitted to the mobile device 10 for storage thereon. When performing a transaction, the mobile device 10 submits the currently stored sequence value, in addition to the transaction data, mobile device ID and supplemental ID. The payment gateway 8 checks the sequence value from the mobile device 10 to ensure it is the same as the sequence value stored in the payment gateway 8. If both sequences match, the payment gateway 8 proceeds, as usual, with the transaction. Anew sequence value is further generated and stored upon completion of each transaction. If, however, the sequences do not match, the payment gateway 8 can take any one or more of the following actions: re-synchronize the sequence values; weigh the cost of a fraudulent transaction and conditionally proceed; and, revoke the mobile device ID completely.

In another example embodiment, the mobile device ID can be generated to include a sequence value, such that the mobile device ID is simply reissued for each transaction. Various data warehousing techniques, such as slowly changing dimensions (type 2, 4, or 6, for example), can be used to keep track of the sequenced mobile device IDs.

The following provide some example embodiments. However, these examples are not exhaustive and may be adapted to similar situations.

EXAMPLE 1

Authenticating E-Commerce/M-Commerce Transactions

The proposed systems and methods are used in an m-commerce or e-commerce transaction to reduce the risk of a fraudulent transaction, by ensuring a user can reasonably prove he or she knows a supplemental ID, such as a CVV2 number or 3D Secure password, and can also reasonably prove he or she has physical access to a trusted mobile device 10. After a user has finished selecting products or services from a merchant's website, the user will click on an HTML submit button (or similar mechanism), indicating his or her intent to complete a transaction. The merchant's server system will direct the mobile device's web browser to a "checkout" webpage, summarizing the transaction details.

In an embodiment using a CVV2 number, when the known mobile device 10 (e.g. a mobile device 10 that has successfully been registered) arrives at the "checkout" webpage, the payment gateway 8 will use the mobile device ID to retrieve the associated credit card number (e.g. payment ID) from memory 38. The payment gateway 8 then prepares a credit card transaction and prompts the user for his or her or CVV2 number (e.g. supplemental ID). Through the mobile device 10, the user provides his or her CVV2 number and submits the data back to the payment gateway 8. The payment gateway 8 uses a supplemental server 22 to verify the CVV2 number. If the CVV2 number is successfully verified, for example as indicated by a confirmation code from the supplemental server 22, the payment gateway 8 submits the complete transaction, such as by submitting the credit card number and CVV2 number to a payment server 20.

If, however, the CVV2 number is not successfully verified, the payment gateway 8 retries or denies the transaction. In an embodiment wherein the payment gateway 8 attempts to retry a transaction, the payment gateway 8 requests from the user, a second, third, or $n^{th}$ time, either a correction to the information provided by the user or supplemental information. The payment gateway 8 then retries the verification process with the corrected supplemental information. Should the payment gateway 8 not successfully verify the transaction after a third attempt (or some other number reasonable to the circumstances), the payment gateway 8 revokes the mobile device ID or denies the transaction, or both.

Should, however, the mobile device 10 arrive at the "checkout" webpage and not supply a known or valid unique identifier, or submit no unique identifier to the payment gateway 8, the payment gateway 8 invokes the registration process or re-association, by redirecting the mobile device 10 to a webpage outlining the steps required to register or re-associate the mobile device 10. Alternatively, the payment gateway 8 denies the entire transaction. Such a decision could be made by external logic systems, human intervention, or similar decision mechanisms and/or processes.

EXAMPLE 2

Authenticating E-Commerce/M-Commerce Transactions

Another example embodiment is used in an m-commerce or e-commerce transaction to reduce the risk of a fraudulent transaction, by ensuring a user can reasonably prove he or she knows a PIN, or similar credential, such as a CVV2 number, and can also reasonably prove he or she has physical access to the mobile device 10.

After a user has finished selecting products or services from a merchant's website, the user will click on an HTML submit button (or similar mechanism), indicating his or her intent to complete a transaction. The merchant's server system will direct the mobile device's browser to a "checkout" webpage, summarizing the transaction details.

When a known mobile device 10 (e.g. a mobile 10 that has successfully been used to complete the registration or reassociation process) arrives at the "checkout" webpage, the payment gateway 8 will use the mobile device ID to retrieve the associated credit card number from memory 38. The payment gateway 8 will then prepare a credit card transaction and prompt the user for his or her or CVV2 number. The user will enter his or her CVV2 number into the mobile device 10 (e.g. in the mobile device's web browser) and submit the data back to the payment gateway 8. The payment gateway 8 relays the transaction information (e.g. credit card number, CVV2, amount, currency, etc.) to a supplemental server 22 also serving as the account issuer. The supplementary system will verify the CVV2 number. If the CVV2 number is successfully verified, the supplemental server 22 submits the complete transaction, such as by submitting the credit card number and CVV2 number to a payment server 20 (e.g. the acquirer). Conceivably, the supplemental server 22 and acquirer 20 may be the same entity, thereby hiding the contextual boundaries.

If, however, the CVV2 number is not successfully verified, the supplemental server 22 can deny the transaction.

Another example embodiment includes the payment gateway 8 attempting to retry a transaction denied by the supplemental server 22. In such an embodiment, the payment gateway 8 requests from the user, a second, third, or nth time, either a correction to the information provided by the user or supplemental information. The payment gateway 8 then retries the verification process with the corrected information or supplemental information. Should the payment gateway 8 not successfully verify the transaction after a three (or some other number reasonable to the circumstances) attempts, the payment gateway 8 revokes mobile device ID, denies the transaction, or performs some similar action.

It is appreciated that the order of accessing entities may further be changed. For example, the payment gateway 8 may send all applicable transaction data to the payment server 20, which would then perform verification with the supplemental server 22. Further, even the payment gateway 8 or verification module 23 may be the initial recipient of transaction data; in such an embodiment, these systems may delegate responsibilities accordingly.

EXAMPLE 3

Enhancing Existing Protocols

Another example embodiment involves the use of existing verification protocols, such as 3D Secure (e.g. implementation provided under the trade-marks Verified By Visa, MasterCard SecureCode, or J/Secure) to ensure that a user is able to prove he or she knows a password. The proposed systems and methods use such verification protocols to have a user also reasonably prove he or she is making the transaction from a specific trusted mobile device 10. After a user has finished selecting products or services from a merchant's website using the mobile device 10, the user will click on an HTML submit button (or similar mechanism), indicating his or her intent to complete a transaction. The merchant's server system may direct the mobile device's browser to a "checkout" webpage, summarizing the transaction details. The user then enters the requested 3D Secure password (e.g. supplemental ID) into the merchant's webpage. Upon submitting the password, the merchant's server system will direct the mobile device's browser, along with the necessary transaction details (for example, in the current specification of 3D Secure, this would include such things as credit card number, credit card expiry date, transaction amount, transaction currency, merchant information, registration data, like a message or transaction ID, nonce, etc.), to a single, unified, consistent, easily-verifiable implementation of 3D Secure, which is an embodiment of the proposed systems and methods.

When a known mobile device 10 (e.g. a mobile device 10 that has been successfully registered) is directed to such a unified 3D Secure webpage, the mobile device 10 submits, either along with the original request (possibly as an HTTPS (or, less likely. HTTP) cookie) or in a subsequent request, its mobile device ID. The payment gateway 8 uses the mobile device ID to retrieve a profile of information associated with the mobile device ID, and, specifically, a collection of registered credit card numbers (e.g. payment ID).

Using the card holder's 3D Secure password, the payment gateway 8 then determines the appropriate issuer ACS (Access Control Server) (e.g. supplemental server 22) and sends to the ACS the applicable 3D Secure data and password for comparing with that stored in the card holder's Issuer's data store. The authentication result from the ACS is sent back to the payment gateway 8. The payment gateway 8 transmits the authentication result to the merchant's payment service provider (e.g. the payment server 20), possibly by an HTTP redirect by the mobile device's browser.

If any one of the following conditions are applicable—e.g. the credit card number being used in the merchant's transaction is not known by the payment gateway 8; the credit card is not enrolled in the 3D Secure program; the mobile device ID is unknown or otherwise invalid; and the mobile device 10 sends no mobile device ID—then the payment gateway 8 redirects the mobile device 10, or strategically changes the HTML response, to a webpage delineating the applicable re-association (or registration) instructions. In one embodiment, this could entail an off-channel phone call to the credit card holder's issuing bank, or, could require the completion of a challenge-response mechanism.

Perceivably, instead of the mobile device ID transmitting its mobile device ID along with an HTTP request (such as how it would be sent when using cookies), in a different example embodiment, the mobile device 10 sends its mobile device ID to the payment gateway 8 in a second (or nth) request. This is orchestrated by a client-side script (such as ECMAScript, JavaScript, VBScript, ActiveX, etc.) or an embedded application or plug-in (such as Adobe Flash, Microsoft Silverlight, Oracle Java Applets, etc.) running on the mobile device 10 to the payment gateway 8. Though the order of operations may change, the result of transmitting the IDs to the payment gateway 8 is achieved in the various embodiments.

The above embodiments are compatible with existing implementations of 3D Secure. Merchant systems currently using 3D Secure may not notice any difference, as the proposed systems and methods replace existing issuer authentication pages (e.g. returned by the directory server), serving as a proxy to an underlying issuer authentication page.

EXAMPLE 4

Controlling Access

Similar to Example 3, other embodiments are used to control access to sensitive, classified, or protected data by ensuring a user can reasonably prove he or she knows a certain verifiable fact about himself or herself and can also reasonably prove he or she has physical access to a trusted mobile device 10. Such embodiments control access to, for example, privileged medical information, community forums, corporate portals, and other similarly protected data.

The registration process requests personally identifiable information (e.g. supplemental ID), such as a social insurance number or drivers license, which can be verified by a supplemental server 22, operated by or on behalf of a credit bureau, bank, or other authority. If association is successful, the mobile device 10 is given the derived mobile device ID for storage, and the payment gateway 8 will persist the mobile device ID.

When a known mobile device 10 (e.g. a mobile device 10 that has successfully been used to complete the registration or re-association process) requests to access such protected data, the mobile device 10 submits, from a "log-in" page, along with the original request containing a username and password, as an HTTPS (or, less likely, HTTP) cookie, its mobile device ID to the payment gateway 8. The user only needs to provide the personally identifiable information during the transaction process, and this is also transmitted to the payment gateway 8. The payment gateway 8 uses the mobile device ID to retrieve profile of information associated with the mobile device ID. In particular, an URL of an authentication supplemental system is associated with the mobile device ID, and the URL is used to direct the transmission of the personally identifiable information to the supplemental system (e.g. supplemental server 22), which is used to verify the provided personally identifiable information.

Figure 11:
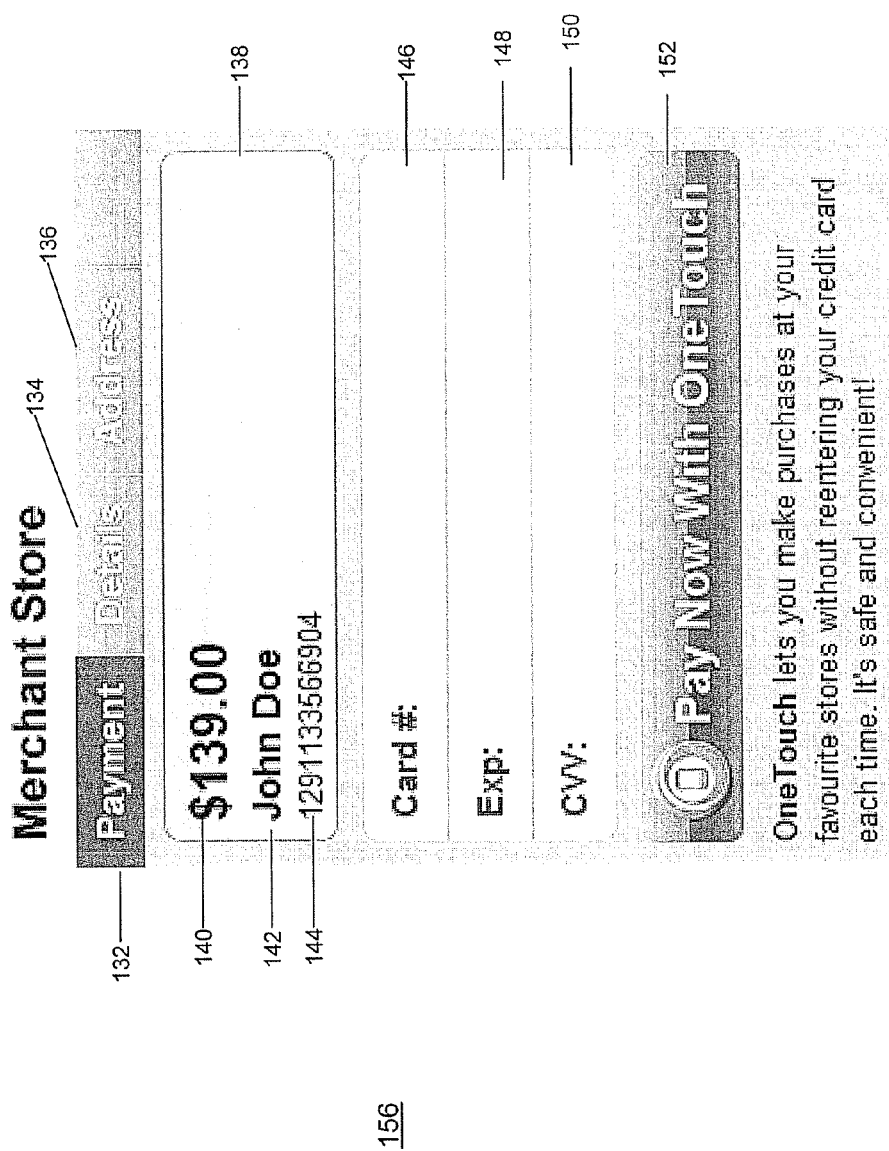
FIG. 11 is a screenshot of an example GUI for a mobile device to receive registration information from a user.
Figure 12:
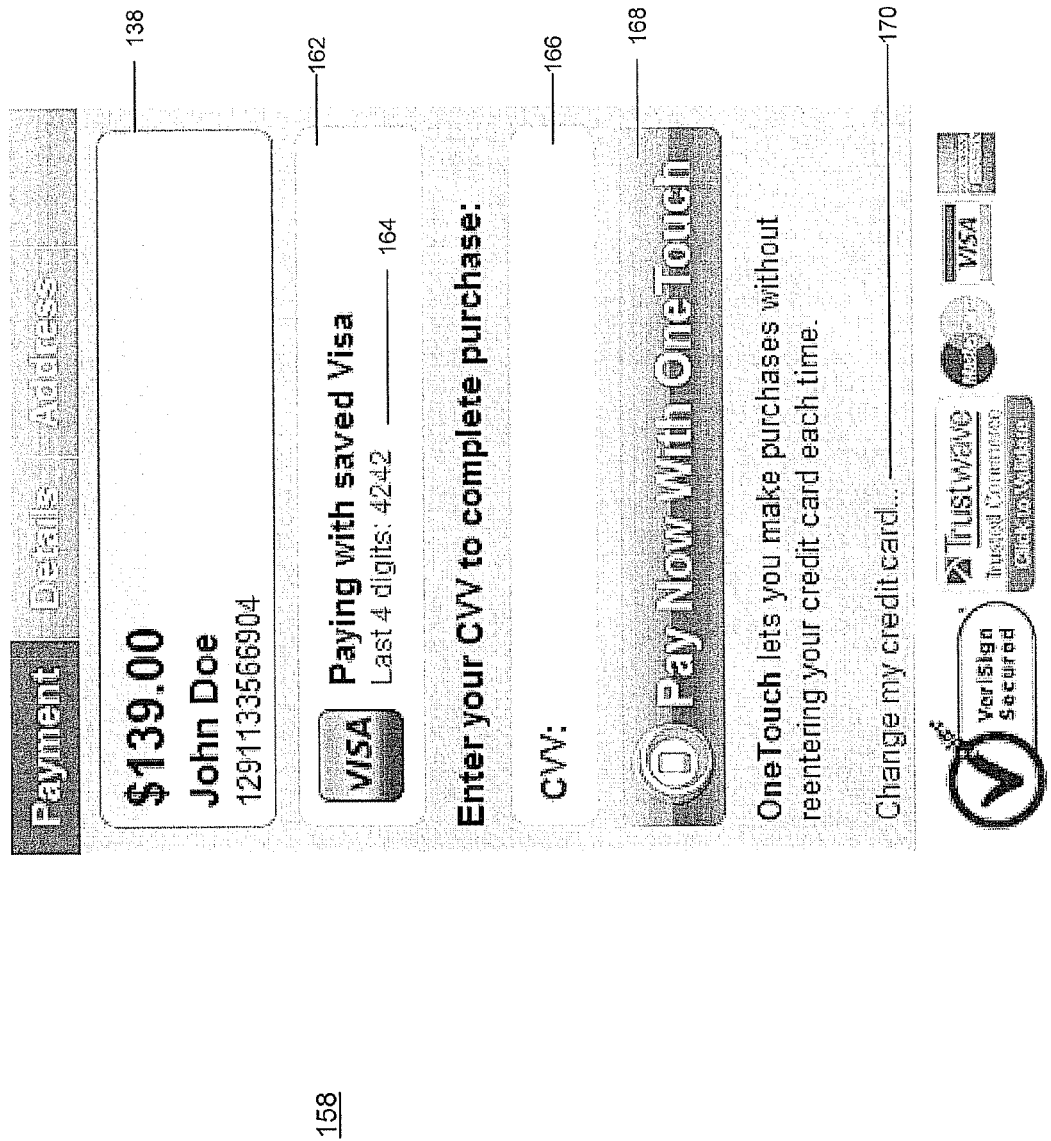
FIG. 12 is a screenshot of an example GUI for a mobile device to receive a supplemental ID comprising a CVV during a transaction process.
Figure 13:
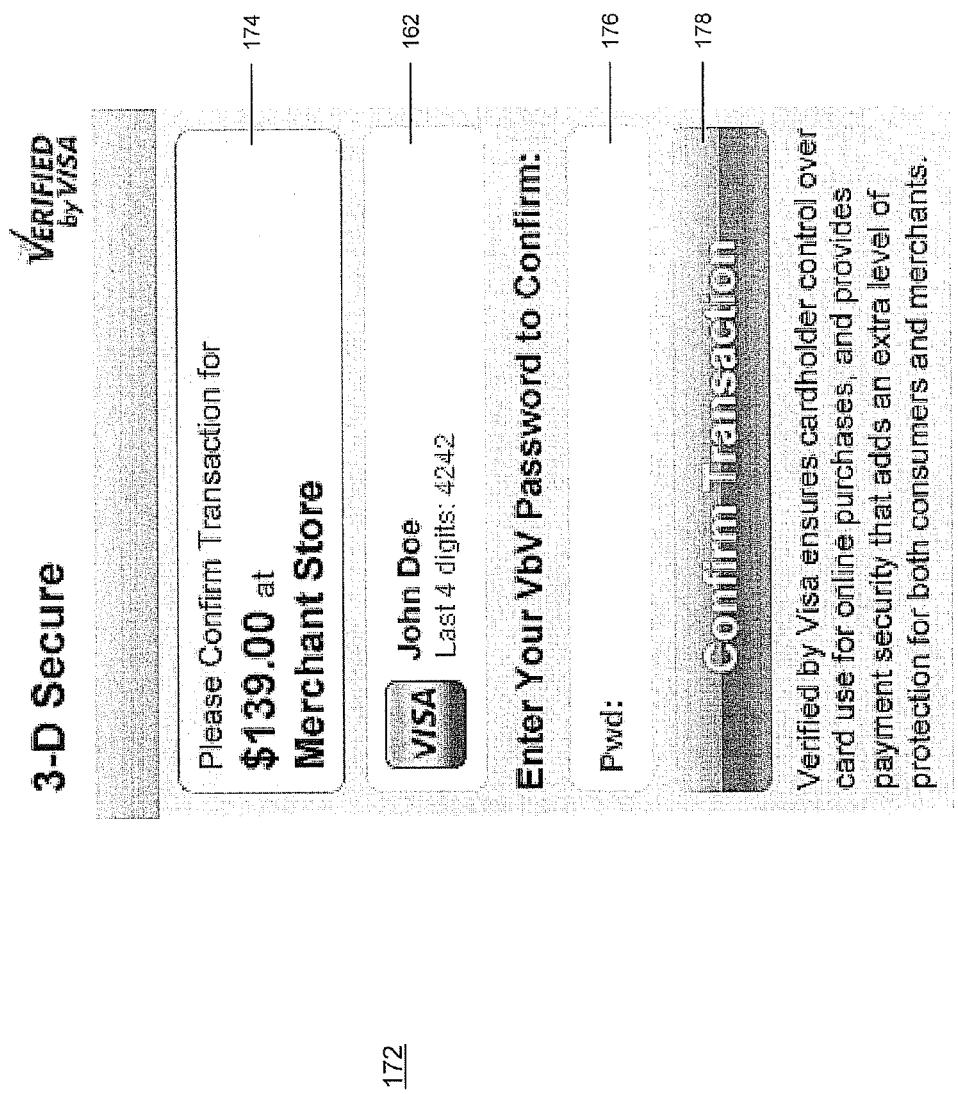
FIG. 13 is a screenshot of an example GUI for a mobile device to receive a supplemental ID comprising a password for 3D Secure during a transaction process.

Turning to FIG. 11, FIG. 12 and FIG. 13, example screenshots are provided of graphical user interfaces (GUIs) used in the registration process and the transaction process. The GUIs are to be displayed on a display of the mobile device 10. The physical interfaces of the mobile device 10 can be a touch screen, track pad, track wheel, track ball, buttons, etc., or combinations thereof, which can be used to interact with the GUIs.

In an example embodiment, the GUIs are hosted by the payment gateway 8 and are configured to appear as part of the e-commerce or m-commerce retailer's website. In other words, the e-commerce or m-commerce retailer does not need to facilitate the transaction authentication process. This reduces liability for to the e-commerce or m-commerce retailer for managing the payment ID and supplemental ID.

FIG. 11 shows a screenshot 156 for a registration GUI. Such a GUI is displayed, for example, when attempting to complete a payment using a mobile device 10 that has not been registered on the payment gateway 8. The screen shot 156 includes tabs 132, 134, and 136 for selecting the display of payment information, details, and address, respectively. Selecting the detail tab 134 will show, for example, what is being purchased, while selecting the address tab 136 will show, for example, the address the service or item is being shipped. It can be appreciated that tabs 134 and 136 are optional. The payment tab 132 is active and thus shows the payment information. Transaction details 138 are displayed and include the amount of money 140 to be transferred from the user 142 who initiated the transaction to the merchant or retailer. Additional details 144 can be displayed, such as the order or transaction number. It is appreciated that the user does not need to enter the transaction details 138, as this can be automatically retrieved during the m-commerce or e-commerce shopping process, from the merchant's website.

Continuing with FIG. 11, entry fields 146, 148 and 150 are displayed to allow the user to enter in their credit card number, credit card expiry date, and CVV number, respectively. It can be appreciated that entry fields 146 and 148 can generally be for any payment ID, and entry field 150 can generally be for any supplemental ID, as applicable to the principles described herein.

After the user inputs the payment ID and supplemental ID, the user can select or click on the button 152 in order to submit the information for registration, and, in this example, to also make a purchase if the registration is approved. Button 152 reads "Pay Now With One Touch", as the proposed systems and methods can be made available under the trade-mark "One Touch". Optionally, if the user does not want to register their payment ID and establish an association with a mobile device ID, as per the proposed systems and methods described herein, the user can select or click on the button 154 to simply attempt to complete the transaction using the provided information (e.g. entry fields 146, 148, 150) and forego registration.

FIG. 12 shows a screenshot 158 of an example transaction GUI using the CVV number as the supplemental ID. After registration has successfully been conducted, so that mobile device 10 has mobile device ID, and the payment gateway 8 has the mobile device ID and associated payment ID, the GUI in screenshot 158 appears when a user initiates a transaction and is "checking out". The transaction details 138 are automatically displayed. Furthermore, a payment ID indication 162, which indicates the payment ID either in part or in full, is displayed in the transaction GUI. The payment ID indication 162 in this example shows that, based on the association between the payment ID and mobile device ID, the user is attempting to make a payment using a Visa credit card that ends in the digits '4242' (164). Preferably, only a part of the payment ID is shown, as is in this example, to prevent an adversary for retrieving the complete payment information. The payment ID indication 162 is retrieved from the payment gateway 8 and sent to the mobile device 10 for display. However, in another example embodiment, there may be no display of the payment ID indication 162 for further security measure. Entry field 166 allows the user to input their CVV number (e.g. supplemental ID). The user then selects or clicks on the button 168 to invoke the mobile device 10 to send the CVV number to the payment gateway 8, in order to complete the transaction.

In another example transaction GUI, button 168 is not displayed. Instead, the GUI is able to detect the length of how many characters where entered into the entry field 166. Upon the GUI detecting that the required number of characters have been entered (e.g. three characters for a CVV) in entry field 166, the supplemental ID is automatically submitted. For example, upon the mobile device 10 detecting that three digits have been entered into entry field 166, the three digits are automatically transmitted to the payment gateway 8, which forwards the same digits to the verification module 23.

Returning back to FIG. 12, upon the mobile device 10 detecting that the button 170 has been selected or clicked, the mobile device 10 will display another GUI (not shown) that allows the user to switch payment accounts. It can be appreciated that, in an example embodiment, more than one payment ID can be associated with a mobile device ID.

FIG. 13 shows another example embodiment of a screenshot 172 for a transaction GUI, whereby the supplemental ID is a password under the Verified by Visa supplemental verification system. The transaction details 174 are shown, and include the payment amount and the name of the merchant. The payment ID indication 162 is also shown on the GUI. An entry field 176 allows a mobile device 10 to receive the user's password for the Verified by Visa system. The mobile device 10, upon detecting a selection input or clicking on the button 178, sends the password to the payment gateway 8, in order for the payment gateway 8 to send the corresponding payment ID and supplemental ID to the Verified by Visa supplemental server for verification. Optionally, upon detecting the length of the password, if the password length is standard, then mobile device 10 automatically sends the same to the payment gateway 8; the button 178 is not required.

Advantageously, as shown by the GUIs and the above proposed methods and systems, a user only needs to provide their supplemental ID to execute a transaction. This increases the security since less sensitive information is required. Less information also means that the time spent to execute a payment is reduced. The reduction in time also increases security. In particular, the time period for which the required sensitive information is being exposed, is reduced. From the user's perspective, the proposed methods and systems reduce the number of steps to complete transactions, making it fast and easy.

Other benefits include reducing the risk of accidentally completing a transaction, while still significantly reducing the number of inputs. By prompting a user for supplemental ID in the authentication process, which is fast, simple, and convenient to provide, such accidental transactions are avoided.

Risks of storing sensitive information, such as payment ID, or supplemental ID, or both, on the mobile device 10 are greatly reduced by shifting the storage of such sensitive data to an external, secured server system (e.g. payment gateway 8, supplemental server 22). Such external servers do not allow external read access and enforces strict access control. The association and retrieval of the data is made possible by the use of the mobile device ID.

It is also recognized that for the supplemental ID to be considered reliable, there is a requirement of at least reasonable access control. A shared token, such as a credit card number, which is provided to any number of parties, does not have reasonably controlled access; hence, a credit card number is not a reasonable supplemental ID for authentication. By assigning a mobile device ID, which has an assumption of reasonable access control, that uniquely identifies a mobile device 10, an existing single-factor authentication system may become a two-factor authentication system. Furthermore, by introducing a supplemental ID, such as a PIN or password, that is only known to the user and is not persistently stored on the mobile device 10 or the payment gateway 8, an attacker cannot complete a transaction without knowledge of the supplemental ID.

When systems or protocols are attacked, a characteristic of good design is the indication of such an attack to all parties involved. Unfortunately, the traditional design and implementation of m-commerce and e-commerce systems rarely exhibit this characteristic, potentially putting all parties at risk. Introducing an unpredictable transaction sequence number, which is generated and shared between the mobile device 10 and the payment gateway 8 after each successful transaction, when used in conjunction with the mobile device's mobile device ID, allows the payment gateway 8 to assert that a transaction is being made by a mobile device 10 with knowledge of the current sequence. Accordingly, if the payment gateway 8 identifies a transaction out of sequence, the payment gateway 8 may inform all parties (e.g. payment server 20, supplemental server 22) of potential tampering or compromise. In such a scenario, the payment gateway 8 may deny further transactions from the specific mobile device 10 until the issue is resolved.

Additionally, by reducing the number of times the IDs are requested from a user, as per some embodiments described herein, the risk of interception attacks may be significantly reduced or eliminated completely.

In another aspect, the proposed systems and methods allow for a merchant to outsource their credit card processing to a third party provider that already has PCI-DSS certification (e.g. the third party provider operating the payment gateway 8), so that the merchant may not have to undergo such certification for themselves.

In another aspect, a transaction, as described herein, is dependent on the physical mobile device 10 from which the transaction is being initiated. As described herein, by limiting or specifying a particular mobile device 10 using the mobile device ID, only one physical mobile device 10 is able to log-in to, or perform authorized commands in relation to the payment gateway 8 with a user's account. Thus, an attacker cannot use another mobile device 10 to commit fraudulent activities.

It is further recognized that issuers are not required to follow strict implementation rules, resulting in inconsistent authentication webpages that are difficult to verify (unlike, for example, if the authentication page would be hosted on an expected domain, such as "vbv.visa.com" or "securecode.mastercard.com"). By introducing a single uniform, consistent, recognisable, and well-known authentication webpage, credit card holders may be more attentive to minor (and major) subtleties, which may be present in phishing websites. Indeed, by creating a single dedicated domain responsible for issuer authentication, such as a domain hosted on by the payment gateway 8, credit card holders may be more willing and able to verify the SSL certificate and URL to ensure he or she has arrived at the official issue authentication webpage. Moreover, by presenting the credit card holder with familiar, verifiable personal information (e.g. supplemental ID), the credit card holder may have even more certainty he or she is communicating with the legitimate 3D Secure authority.

In general, a system is provided for authenticating a transaction on a mobile device. The system comprises a mobile device in communication with a payment gateway, the payment gateway in communication with a verification module. In a registration process: the mobile device is configured to receive at least a payment ID of a payment account and a supplemental ID for verifying the payment ID, and transmit the payment ID and supplemental ID to the payment gateway; the payment gateway is configured to send the payment ID and the supplemental ID to the verification module, the verification module configured to verify the supplemental ID and the payment ID; and, at least one of the mobile device and the payment gateway configured to, upon the payment gateway receiving a verification result from the verification module that the payment ID and the supplemental ID are successfully verified, generate a mobile device ID, the mobile device ID stored on the mobile device and stored on the payment gateway in association with the payment ID.

In a transaction process: the mobile device is configured to receive the supplemental ID and send the supplemental ID and the mobile device ID to the payment gateway; the payment gateway is configured to retrieve the payment ID associated with the received mobile device ID and send the payment ID and the supplemental ID to the verification module for verification; and, upon the payment gateway receiving another verification result from the verification module that the supplemental ID and the payment ID are successfully verified, the payment gateway configured to execute the transaction.

In another aspect, the mobile device is configured to send at least one of the supplemental ID and the payment ID without storing the supplemental ID and the payment ID on the mobile device. In another aspect, the operations of the payment gateway and the verification module are combined into a unified server. In another aspect, the payment gateway executes the transaction via a payment server, the payment server in communication with at least one of the payment gateway and the verification module.

In general, there is also provided a system for authenticating a transaction. The system comprises a payment gateway, a verification module and a payment server. The payment gateway is in communication with at least one of the payment server and the verification module, the payment gateway having stored thereon a mobile device ID in association with a payment ID. The payment server is in communication with at least one of the payment gateway and the verification module. In a transaction: the payment gateway is configured to receive the mobile device ID and a supplemental ID, the supplemental ID for verifying the payment ID; the payment gateway is configured to retrieve the payment ID associated with the mobile device ID, and configured to send the payment ID and the supplemental ID to the verification module; and, upon the verification module successfully verifying the payment ID and supplemental ID, the payment server configured to execute the transaction.

In another aspect, a mobile device is in communication with the payment gateway, wherein the mobile device is configured to send the mobile device ID and the supplemental ID to the payment gateway. In another aspect, the payment server is in communication with both the payment gateway and the verification module, and the payment gateway is configured to send the supplemental ID and payment ID to the verification module via the payment server.

In another aspect, the verification module is configured to send a successful verification result to at least one of the payment server and the payment gateway. In another aspect, the payment gateway is configured to send the supplemental ID without storing the supplemental ID on the payment gateway. In another aspect, the payment ID is comprised of at least one of: a credit card number, an expiry date, a bank card number, a banking number, and a points account number. In another aspect, the supplemental ID is comprised of at least one of: a Card Security Value (CSV), a Card Security Code (CSC), a Card Verification Value (CVV or CVV2), a Card Verification Value Code (CVVC), a Card Verification Code (CVC or CVC2), a Verification Code (V-Code or V Code), a Card Code Verification (CCV), a PIN, a password, biometric data, and voice data.

In another aspect, the mobile device ID includes at least one of: subscriber identity information stored on a SIM card or IMEI of the mobile device, networking information, an IP address, a phone carrier identification, a port address, a DNS name, a GPS coordinate of the mobile device, the battery temperature of the mobile device, a geographical location of the mobile device, an accelerometer reading of the mobile device, a cookie, a user agent, and a header, wherein the cookie, the user agent and the header are provided by a browser on the mobile device or a DOM storage on the mobile device.

In another aspect, the mobile device ID is randomly generated. In another aspect, the mobile device ID is replaced by a new mobile device ID and is associated with the payment ID for each subsequent execution of the transaction process. In another aspect, during the transaction process, the payment gateway compares the received mobile device ID to the mobile device ID previously stored thereon to determine if they are similar, and if so, enabling the transaction to be executed. In another aspect, the received mobile device ID in the transaction process must be equal to the mobile device ID previously stored on the payment gateway for the transaction to be executed.

In general, a method is also provided for authenticating a transaction on a mobile device, the mobile device having stored thereon a mobile device ID, the method being performed on the mobile device. The method comprises: the mobile device receiving through a transaction GUI a supplemental ID for verifying a payment ID; the mobile device sending the supplemental ID and the mobile device ID to a payment gateway, the payment gateway having stored thereon the payment ID and the mobile device ID in association with each other; and the mobile device, upon the payment gateway executing the transaction based on the payment ID associated with the mobile device ID and receiving verification that the supplemental ID and the payment ID are authentic, receiving from the payment gateway a confirmation that the transaction is complete.

In another aspect, the mobile device sends at least one of the supplemental ID and the payment ID without storing the supplemental ID and the payment ID on the mobile device.

In another aspect, the method includes a registration process for storing the mobile device ID on the mobile device, the method further comprising: the mobile device receiving from a registration GUI at least the payment ID of a payment account and the supplemental ID, and transmitting the payment ID and the supplemental ID to the payment gateway without storing the payment ID and the supplemental ID on the mobile device; and, the mobile device, upon receiving from the payment gateway that the payment ID and the supplemental ID are successfully verified, obtaining a component for a mobile device ID, the mobile device ID associated with the payment ID at the payment gateway, and the mobile device ID stored on the mobile device. In another aspect, the mobile device obtains the component for the mobile device ID by at least one of generating and receiving the component.

In general, a method is also provided for authenticating a transaction on a payment gateway, the payment gateway having stored thereon a mobile device ID in association with a payment ID, the method performed on the payment gateway comprising: the payment gateway receiving from a mobile device a supplemental ID and the mobile device ID, the supplemental ID for verifying the payment ID, and the mobile device having stored thereon the mobile device ID; the payment gateway retrieving the payment ID associated with the mobile device ID and sending the payment ID and the supplemental ID to a verification module for verification; and, upon the payment gateway receiving a verification result from the verification module that the supplemental ID and the payment ID are successfully verified, the payment gateway executing the transaction.

In another aspect, the method includes a registration process for storing the mobile device ID and the payment ID on the payment gateway, the method further comprising: the payment gateway receiving from the mobile device at least the payment ID of a payment account and the supplemental ID, and transmitting the payment ID and supplemental ID to the verification module; and, upon the payment gateway receiving an initial verification result from the verification module that the payment ID and the supplemental ID are successfully verified, the payment gateway obtains a component for a mobile device ID, the mobile device ID associated with the payment ID and stored at the payment gateway, and the mobile device ID stored on the mobile device.

In another aspect, the payment gateway obtains the component for the mobile device ID by at least one of generating and receiving the component.

In another aspect, the payment gateway executes the transaction via a payment server, the payment server in communication with at least one of the payment gateway and the verification module.

In general, a method is also provided for authenticating a transaction, the method comprising: a payment gateway receiving a mobile device ID and a supplemental ID, the supplemental ID for verifying a payment ID; the payment gateway retrieving the payment ID associated with the mobile device ID, the payment ID and the mobile device ID being stored on the payment gateway in association with each other, and sending the payment ID and the supplemental ID to a verification module; upon the verification module successfully verifying the payment ID and supplemental ID, a payment server executing the transaction, the payment server in communication with at least one of the payment gateway and the verification module.

Figure 14:
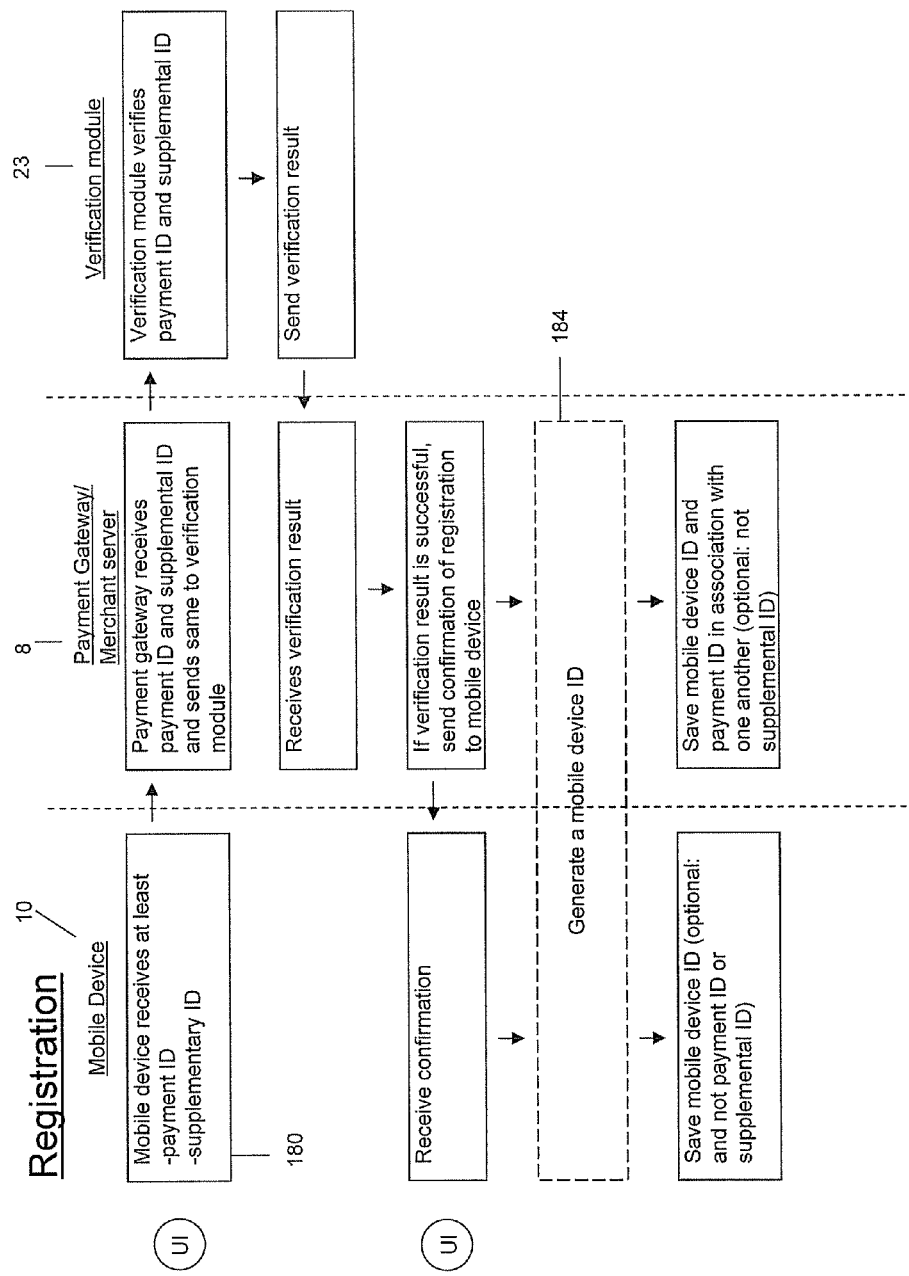
FIG. 14 is a flow diagram illustrating example computer executable instructions for registering a mobile device in association with a payment ID.
Figure 15:
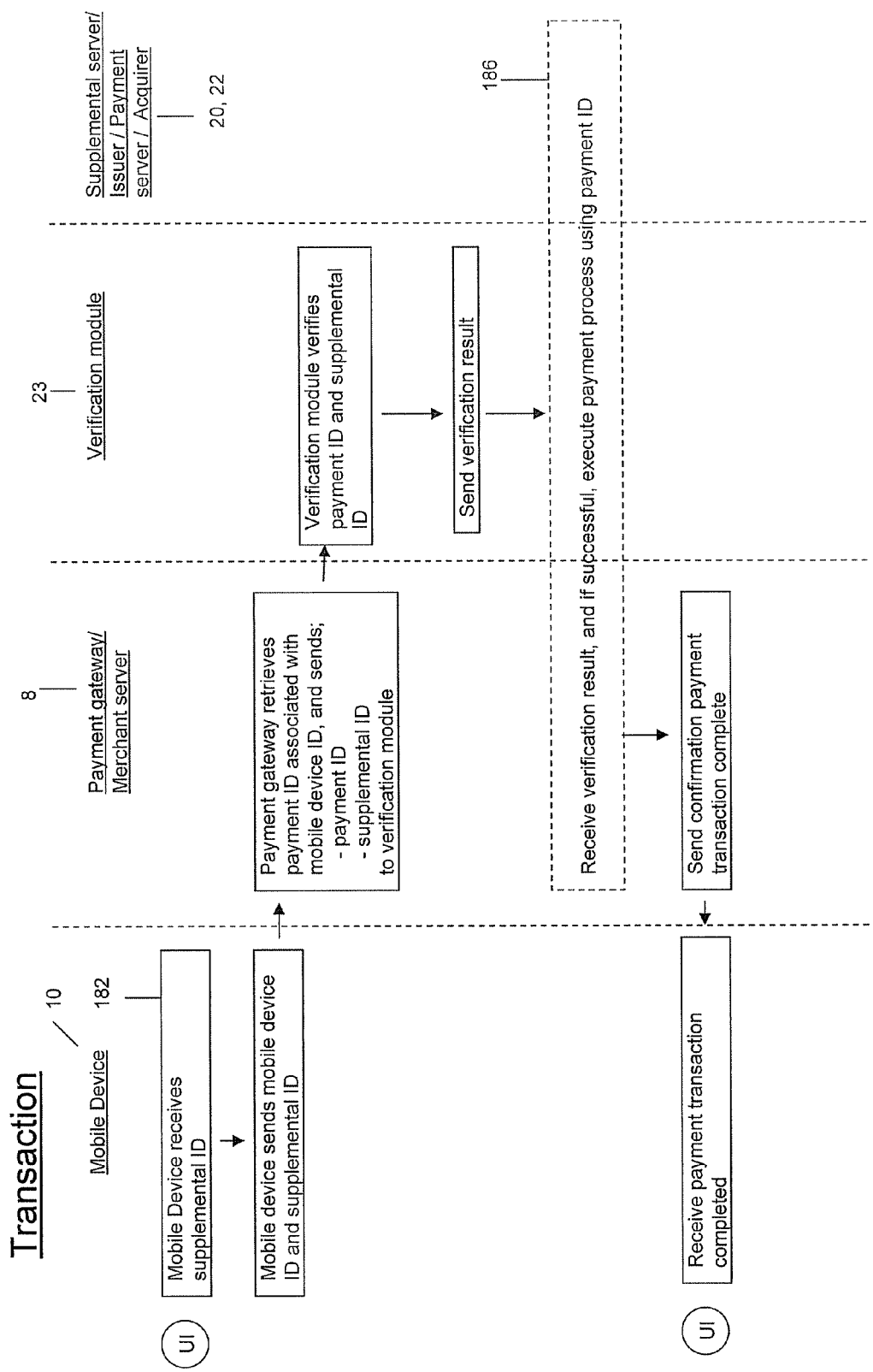
FIG. 15 is a flow diagram illustrating example computer executable instructions for authenticating a transaction after the registration shown in FIG. 14.

Turning briefly to FIG. 14 and FIG. 15, the above operations are shown more generally in the flow chart form divided according to the mobile device 10, the payment gateway 8, and the verification module 23. In particular, in FIG. 14, which shows the registration process, at block 180, the example GUI 156 can be used by the mobile device 10 to receive the payment ID and supplemental ID. Notably, the mobile device ID can be generated on either the mobile device 10 or the payment gateway 8, as per block 184. The mobile device ID can alternatively be generated earlier in the registration process. In FIG. 15, which shows the transaction process, at block 182, the example GUIs 158 or 172 can be used by the mobile device 10 to receive the supplemental ID. Furthermore, as described above, for example with respect to FIGS. 3, 4, 5 and 6, upon successfully verifying the supplemental ID and payment ID, any one or more of the payment gateway 8, supplemental server 22 (e.g. issuer), and the payment server 20 (e.g. acquirer) can execute the payment or settlement process.

In another aspect of the proposed systems and methods, it is recognized that after a transaction has been made, a user may dispute the transaction. In other words, the user may claim to have not made or allowed the transaction, and that the transaction was made in error. For example, the retailer incorrectly charged the user for the transaction using the payment ID, or an adversary has falsely assumed the identity of the user and has made a payment using the user's payment ID.

It is further recognized that it is difficult for a payment server 20 or an issuing bank (e.g. the entity making the payment to the retailer) to confirm whether or not the transaction was actually authorized by the user. In situations where it appears the user has not authorized the transaction, the funds of the transaction are returned to the user. In other words, there is a chargeback process in which funds from the payment server 20 (or issuing bank) and the payment gateway 8, or both, are returned to the user.

The proposed systems and methods provide a way to confirm whether or not a transaction was actually authorized by the user, thereby settling chargeback disputes. The mobile device 10 generates a digital signature using transaction data and, during a chargeback dispute, the digital signature is used confirm whether or not the user actually authorized the transaction.

Figure 16:
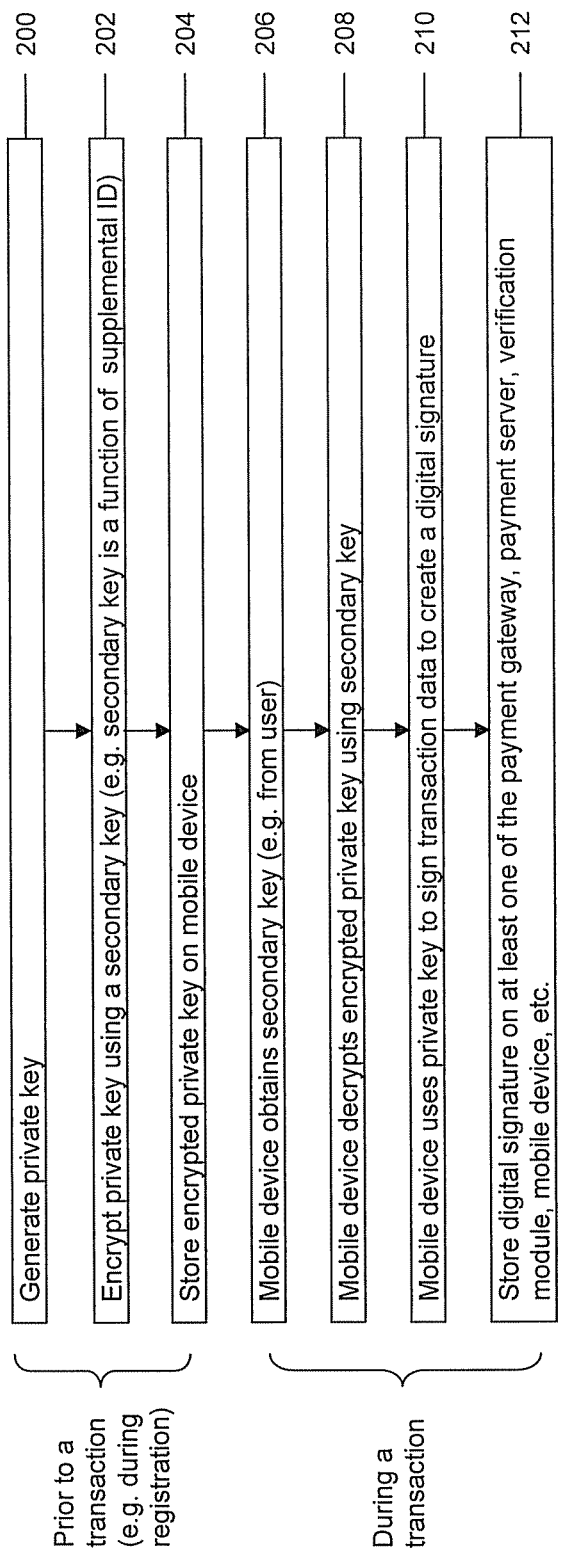
FIG. 16 is a flow diagram illustrating example computer executable instructions for generating a digital signature.

Turning to FIG. 16, example computer executable instructions are provided for generating a digital signature. At block 200, a private key is obtained (e.g. from an encryption key database) or generated. The private key can be obtained or generated by the payment gateway 8. In another example embodiment, the private key can be obtained or generated by the mobile device 10, the payment server 20, the supplemental server 22, or the verification module 23. The private key can be generated using, for example, a random number generator or pseudorandom number generator.

The private key is encrypted using a key, herein referred to as a secondary key, (block 202) and then stored on the mobile device 10 (block 204). The secondary key, for example, is a supplemental ID. It will be appreciated that the secondary key used to encrypt the private key may or may not be the supplemental ID. In another example embodiment, the secondary key is derived from or is a function of the supplemental ID. For example a key derivation function, such as PBKDF2, can be used.

It will be appreciated that using the supplemental ID in deriving or forming the secondary key can be advantageous if the user is required to provide the secondary key. The user remembers one less credential, as the supplemental ID is used for verification and for deriving or forming the secondary key.

The payment gateway 8 can encrypt the private key. Alternatively, the mobile device 10, the payment server 20, the supplemental server 22, or the verification module 23 can encrypt the private key. The private key can be encrypted using various known encryption methods. Non-limiting examples of encryption methods include strong symmetric ciphers, such as Advanced Encryption Standard (AES) and Twofish. In another example embodiment, an encryption cipher is used with a mode of operation that helps prevent plaintext attacks and hides patterns, for example cipher-block chaining (CBC).

Blocks 200, 202, 204 may take place during the registration process, or any time prior to a transaction. For example, a private key can be obtained or generated prior to or during a registration process. In an example embodiment, during the registration process, when the supplemental ID is passed from the mobile device 10 to the payment gateway 8, the private key is encrypted using the key (e.g. the supplemental ID) and stored on the mobile device 10. In another example embodiment, the process of obtaining and storing the private key on the mobile device 10 can occur separately from the registration process.

Continuing with FIG. 16, at block 206, the mobile device receives the supplemental ID (e.g. from the user). The mobile device 10 then decrypts the encrypted private key using the secondary key (block 208). The mobile device 10 uses the private key to sign transaction data, and optionally the mobile device ID, to create a digital signature (block 210). Examples of digital signatures include those of the following types: RSA, DSA, and ECC. The digital signature is then stored so that it can be retrieved at a later time (block 212). For example, the digital signature is stored on at least one of the payment gateway 8, the payment server 20, the verification module 23, the supplemental server 22, and the mobile device 10.

The term "transaction data" can include at least one of the following: the transaction's invoice number, amount of payment, the date of the transaction, the time of the transaction, the shipping address, the billing address, the purchaser's email, and the purchaser's phone number. In addition to signing the transaction data, the mobile device may, for example, also sign the mobile device ID and the supplemental ID.

In an example embodiment, the original transaction data is made available to at least one of the payment gateway 8, the payment server 20, the verification module 23, and the supplemental server 22. During the verification process, the provided transaction data may be verified against the digital signature using a signature verification scheme.

Figure 17:
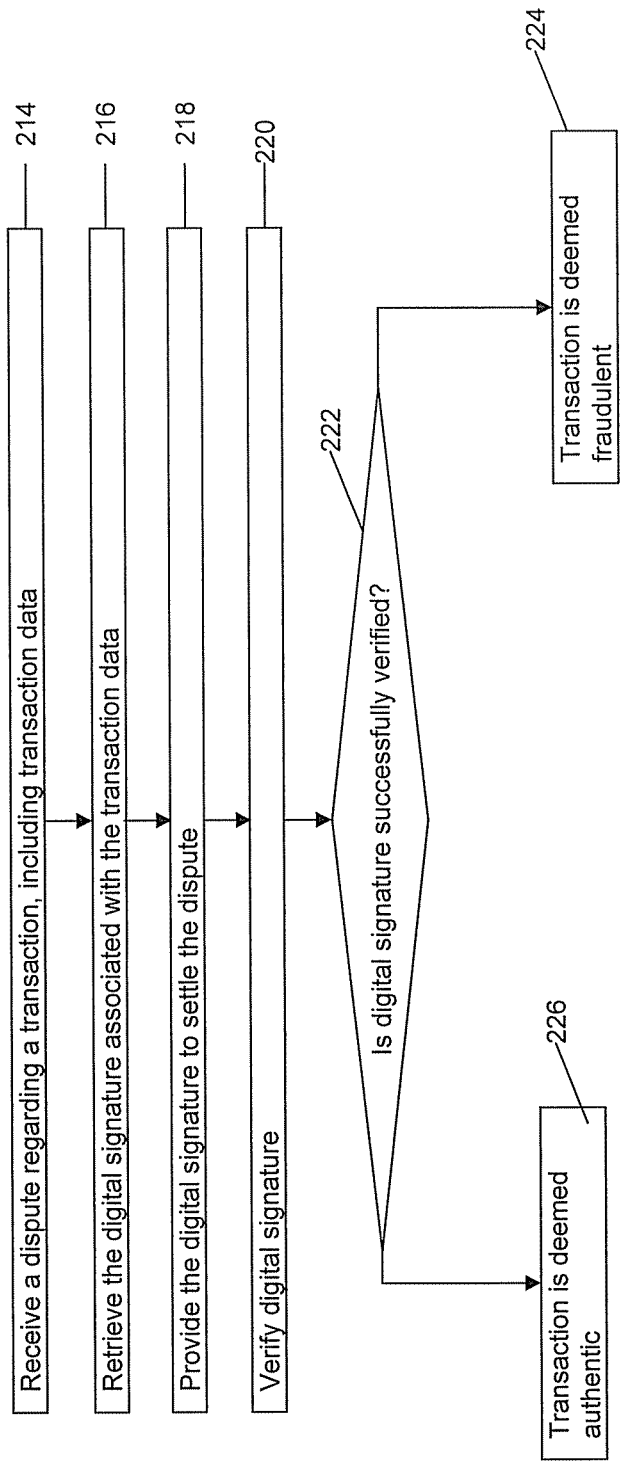
FIG. 17 is a flow diagram illustrating example computer executable instructions for using the digital signature of FIG. 16 to settle a chargeback dispute regarding a transaction.

Turning to FIG. 17, example computer executable instructions are provided for settling a chargeback dispute using the digital signature. At block 214, a dispute is received regarding a transaction, and the dispute includes the transaction data. At block 216, the digital signature associated with the transaction data is retrieved. For example, the transaction data is used to search for and identify the corresponding digital signature. The digital signature is then provided to settle the dispute (block 218). The digital signature is verified using a digital signature verification scheme (block 220) and it is determined if the verification is successful or not (block 222). It will be appreciated that the type of verification scheme may depend on the signing algorithm that was used.

In an example embodiment, if the private key is encrypted with a secondary key that is considered to have low entropy, then the corresponding public key is kept secret and is not easily attainable.

It is assumed that only the user's mobile device 10 has the private key, which is unique to the mobile device 10 or user (for example, if the user has multiple mobile devices). Therefore, for example, if the digital signature is verified, then it is confirmed that the transaction was performed by the mobile device having access to the private key, and thus was actually authorized by the user (block 226). Otherwise, if the digital signature is not successfully verified, then it is confirmed that the transaction was not performed by a mobile device having access to the private key, and thus was not authorized by the user (block 224).

The private key may be stored on an Internet application (e.g. an Web browser) on the mobile device 10. In another example embodiment, the private key may be stored on a trusted platform module on the mobile device. In another example embodiment, the private key may be stored on a near field communications (NFC) chip on the mobile device. In another example embodiment, the private key may be stored on a subscriber identity module (SIM) card on the mobile device. In another example embodiment, the private key may be stored on a secure digital (SD) card, or other removable storage device, on the mobile device. The private key may also be stored on an application's storage or memory on the mobile device. The application may not be related to the Internet application.

In an example embodiment, the issuing bank is a separate entity from the payment server 20. In such an example, the issuing bank issues a chargeback dispute which includes the transaction data. The payment server 20 receives the chargeback dispute and transaction data and retrieves the digital signature to settle the chargeback dispute.

Figure 18:
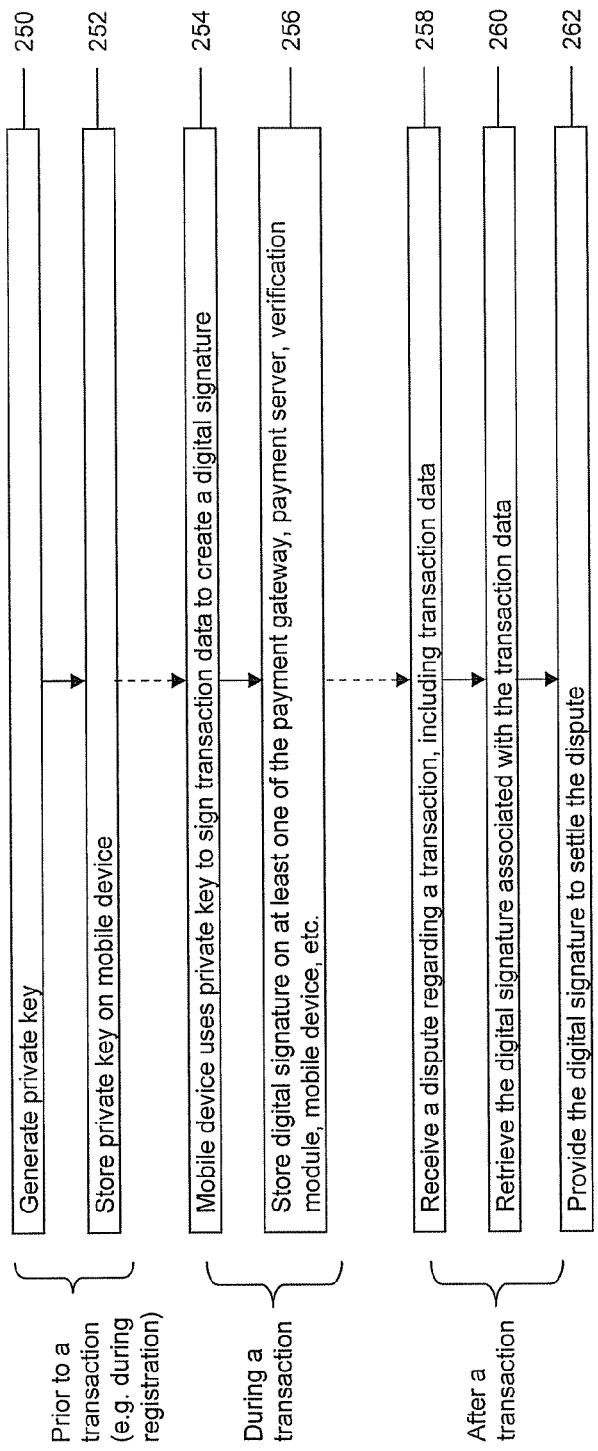
FIG. 18 is a flow diagram illustrating example computer executable instructions of another example embodiment for generating a digital signature and using it to settle a chargeback dispute.

In another example embodiment of generating a digital signature, the private key is not encrypted. Turning to FIG. 18, at block 250, a private key is generated and the stored on the mobile device (block 252). Operations 250 and 252 can take place during registration or any time prior to a transaction. During a transaction, the mobile device 10 uses a private key to sign the transaction data to create a digital signature (block 254). The digital signature is then stored so that it can be retrieved later (block 256).

When a dispute regarding a transaction is received by any one of the payment server 20, payment gateway 8, or the mobile device 10, including the transaction data (block 258), the respective entity retrieves the digital signature associated with the transaction data (block 260). The digital signature is then provided to settle the dispute (block 262). The dispute is settled by determining whether or not the digital signature is successfully verified.

In an example embodiment, the higher number of digital signatures that have been verified for a given mobile device or a given private key, the higher the confidence that the successful verification of the digital signature evidences that the transaction is not fraudulent. In other words, with each subsequent successful verification of a digital signature associated with a given mobile device or a given private key, the confidence that the successful verification proves that the transaction is authentic increases.

It is assumed that the private key is securely stored on the mobile device 10, and that the private key is used to sign the transaction data only during a transaction. Furthermore, the action of the user entering the supplemental ID into the mobile device 10 during a transaction is recognized to be an indication that the user authorizes the transaction. Therefore, the private key is not required to be stored on the mobile device 10 in an encrypted form. By not encrypting the private key, the number of steps is reduced and the speed of the process is increased.

It will therefore be appreciated that the private key used in generating digital signatures can be encrypted or, in other example embodiments, not encrypted.

In another aspect, a MAC is used to settle chargeback disputes. Both the mobile device 10 and a computing device (e.g. payment gateway 8 or verification module 23) have a secret key (e.g. a shared secret key) that are used to generate MACs from the transaction data. For example, the mobile device 10 generates a first MAC using the transaction data at the time of transaction, and a computing device generates a second MAC using the transaction data. If the first and second MACs are identical, then it is determined that the transaction was authorized by the user. Otherwise, the transaction is deemed to be fraudulent.

The secret key, for example is unique to each mobile device or can be unique to a user.

Figure 19:
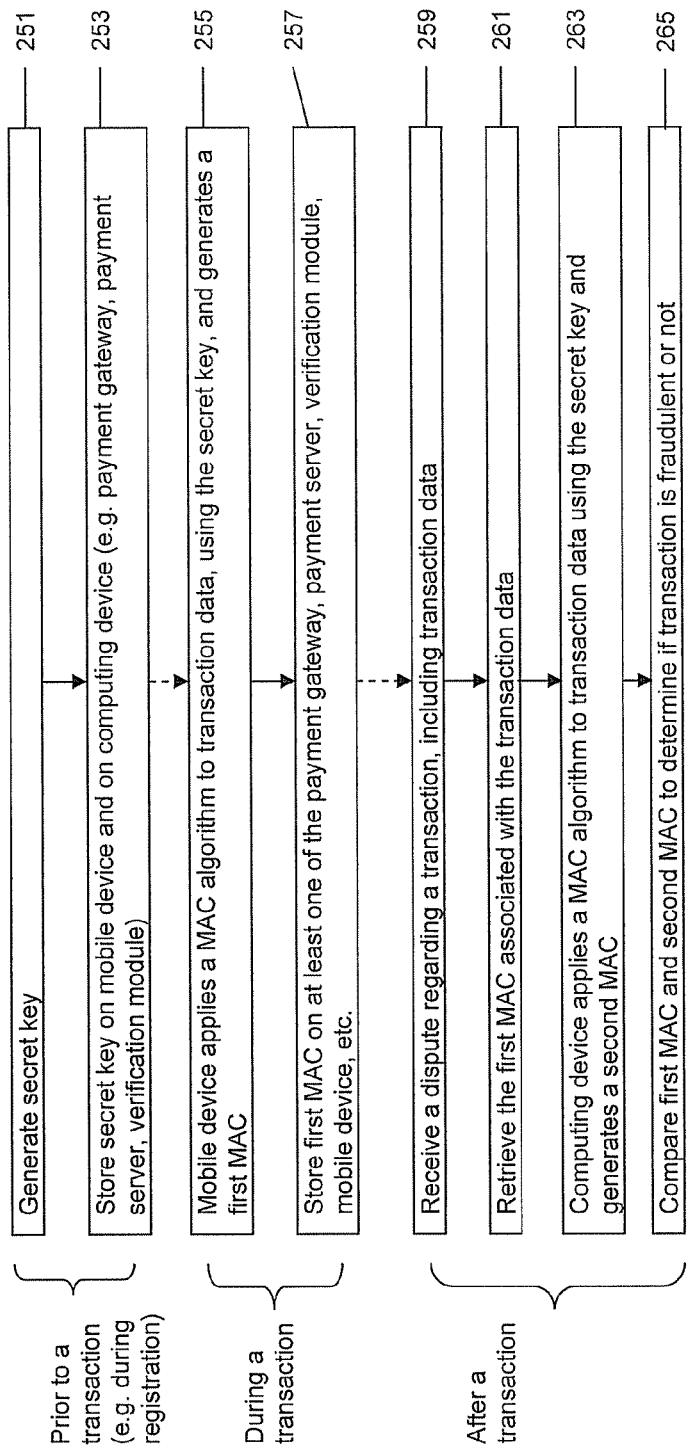
FIG. 19 is a flow diagram illustrating example computer executable instructions of an example embodiment for generating message authentication codes (MACs) and using the MACs to settle a chargeback dispute.

FIG. 19 provides example computer executable instructions for settling a chargeback dispute using MACs. At block 251 a secret key is generated, for example either by the mobile device or the computing device, or both. The secret key is stored on both the mobile device 10 and the computing device (e.g. payment gateway, payment server, verification module) (block 253). Blocks 251 and 253 can occur prior to a transaction, such as during a registration process. It will be appreciated that the secret key is stored on at least one of an Internet application on the mobile device, on a trusted platform module on the mobile device, on a NFC chip in the mobile device, on a subscriber identity module (SIM) card in the mobile device, on a removable storage device in the mobile device, and on an application's storage on the mobile device.

The secret key may also be encrypted, for example, using a secondary key. The secondary key may be a function of a supplemental ID.

During a transaction, the mobile device 10 applies a MAC algorithm to the transaction data using the secret key to generate a first MAC (block 255). At block 257, the mobile device 10 stores the first MAC on the computing device (e.g. payment gateway, payment server, verification module) or on the mobile device 10.

If the secret key is encrypted, then it is first decrypted so that it can be used to generate the first MAC. For example, if the secondary key is used to decrypt the encrypted secret key, the user may enter into the mobile device 10 the information (e.g. supplemental ID) needed to derive the secondary key. The derived secondary key is then used to decrypt the secret key.

In another example embodiment, the first MAC is computed by applying a MAC algorithm to the transaction data and a mobile device ID. In this way, the first MAC can be used to better identify that it was generated from the mobile device 10.

Continuing with FIG. 19, after the transaction is complete, a computing device (e.g. payment gateway, payment server, verification module) receives a dispute regarding a transaction including transaction data (block 259). For example, the computing device receives the first MAC from the mobile device 10. The computing device then retrieves the first MAC associated with the transaction data (block 261). The computing device then computes a second MAC using the secret key and the transaction data (block 263). In an example embodiment, the same MAC algorithm used to compute the first MAC may be used to compute the second MAC. At block 265, the computing device determines whether or not the transaction is fraudulent based on a comparison of the first MAC and the second MAC.

In particular, the transaction is determined to be fraudulent if the first MAC and the second MAC are different. Otherwise, the transaction is determined to be not fraudulent if the first MAC and the second MAC are equal.

The computing device may also determine whether or not a subsequent transaction is fraudulent by verifying subsequent MACs using the secret key. If the subsequent MACs provide a verification result that is successful, then the computing device increases a confidence value or confidence level that the verification result associated with the mobile device or the secret key proves the subsequent transaction is not fraudulent.

In an example embodiment, the secret key may be stored on the computing device in encrypted form. In a further example, the computing device receives from the mobile device 10 a secondary key used to decrypt the encrypted secret key stored on the computing device. As described above, the secondary key is function of the supplemental ID. In other words, the mobile device generates the secondary key using the supplemental ID and sends the secondary key to the computing device.

It can also be appreciated that the MAC may be a cipher-based MAC (CMAC), such as CMAC-AES and CMAC-TDES. The MAC may also be a hash-based MAC (HMAC), such as HMAC-MD5, HMAC-SHA-1, HMAC-SHA-256, and HMAC-RIPEMD. It will be appreciated that various types of MACs can be applied to the principles described herein.

In another aspect of the proposed systems and methods, a digital signature is used to authenticate a transaction. Prior to a transaction, for example, during registration, a private key is stored on the mobile device 10. During a transaction, the mobile device 10 signs transaction data to create a digital signature. The verification module 23 or other server entity obtains the payment ID and digital signature and verifies the digital signature. If the digital signature is successfully verified, uses the payment ID to execute a transaction. Details are described with respect to FIGS. 20, 21 and 22.

Figure 20:
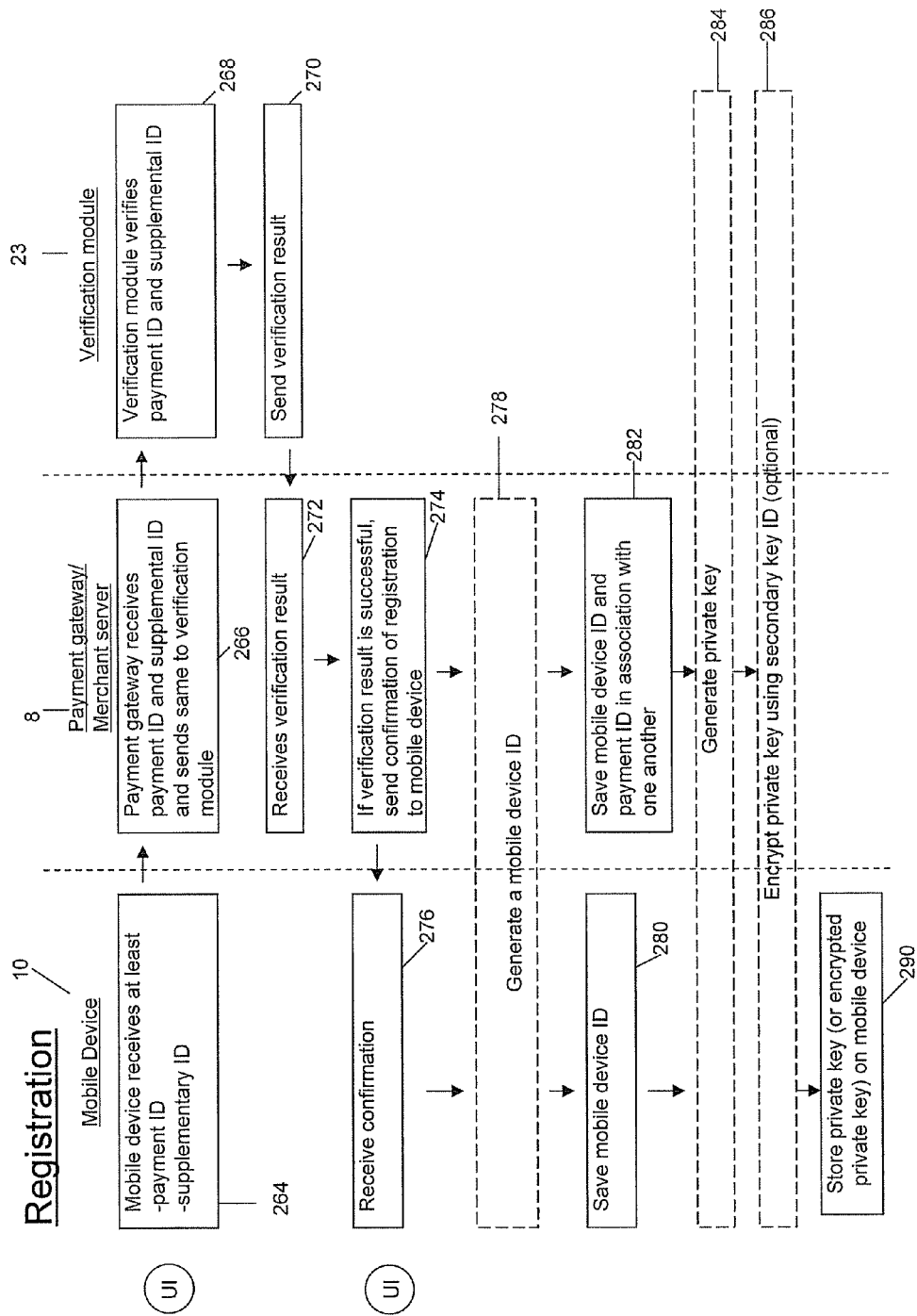
FIG. 20 is a flow diagram illustrating example computer executable instructions for registering a mobile device ID and generating a private key.

Turning to FIG. 20, example computer executable instructions are provided for registering a mobile device ID and payment ID. During the registration process, or any time prior to the transaction process, a private key is generated. The private key is stored on the mobile device 10. Optionally, the private key is encrypted, and the encrypted private key is stored on the mobile device 10.

In particular, at block 264, the mobile device 10 receives the payment ID and supplemental ID and sends the same to the payment gateway 8. The payment gateway 8 sends the IDs to the verification module 23 (block 266) for verification (block 268). The verification module 23 sends the verification result (block 270), and upon receipt (block 272), the payment gateway 8 sends confirmation of registration to the mobile device 10 (blocks 274 and 276). During the registration process, before or after the verification, a mobile device ID is generated (block 278) and saved on the mobile device (block 280) and on the payment gateway 8 in association with the payment ID (block 282). Also taking place sometime during the registration process is the generation of the private key (block 284), which can be encrypted using a secondary key (block 286). The private key, which may or may not be encrypted, is stored on the mobile device 10 (block 290).

Figure 21:
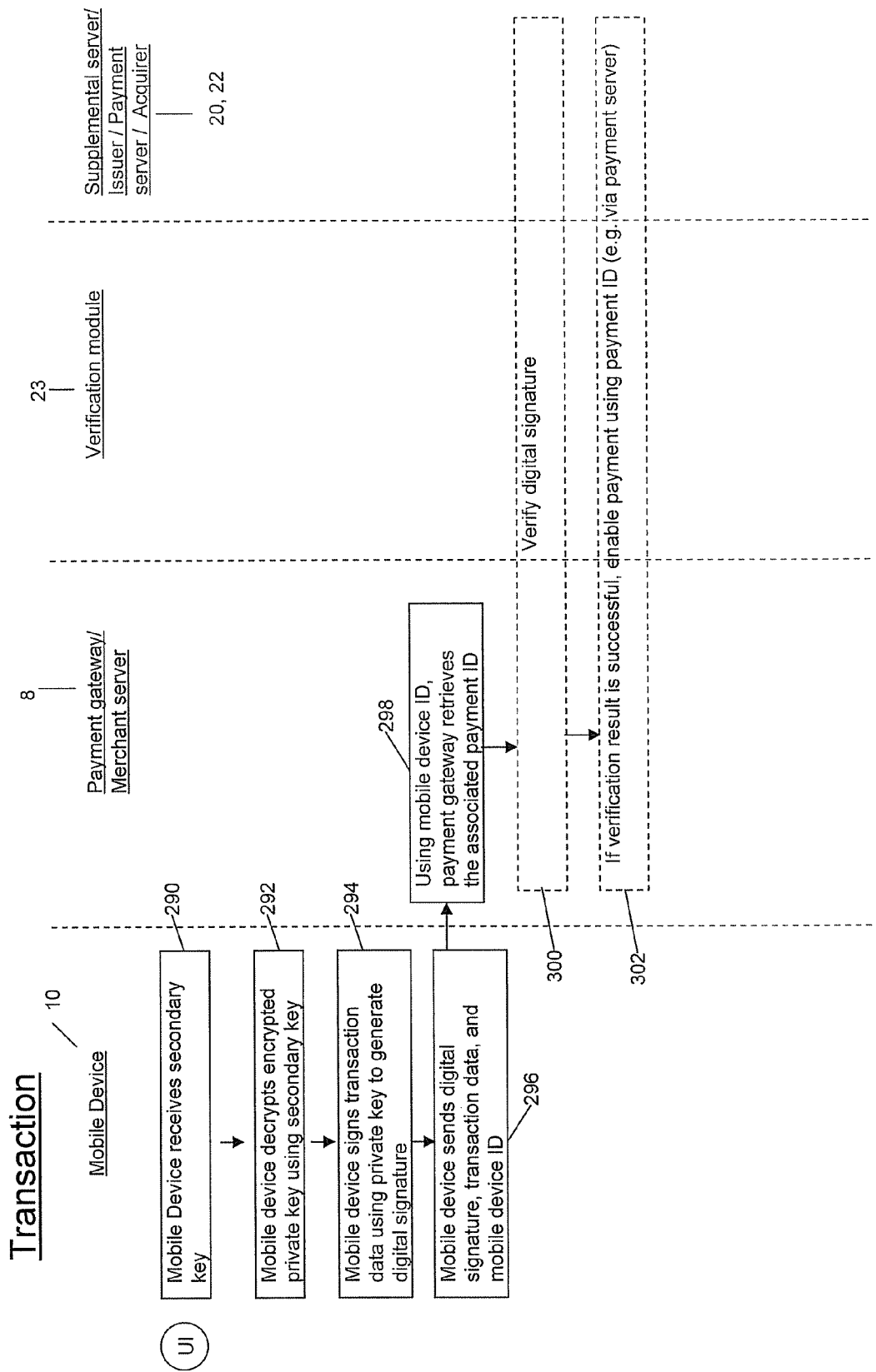
FIG. 21 is a flow diagram illustrating example computer executable instructions for authenticating a transaction using a digital signature signed by the private key, after the registration shown in FIG. 20.

Turing to FIG. 21, during a transaction, the mobile device 10 receives an input to execute a transaction. If the private key is encrypted using a secondary key, then the input may include the secondary key (block 290). The mobile device 10 decrypts the encrypted private key using the secondary key (block 292). However, if the private key is not encrypted on the mobile device 10, then the operations of providing a secondary key and decrypting the private key are not executed.

The mobile device 10 signs the transaction data using the private key to generate a digital signature (block 294). At block 296, the mobile device sends the digital signature and mobile device ID to the payment gateway 8. The mobile device 10 may also send the transaction data, which can be used to verify the digital signature. At block 298, using the mobile device ID, the payment gateway 8 retrieves the associated payment ID. At block 300, at least one of the payment gateway 8, the verification module 23 and the payment server 20 verify the digital signature. It will be appreciated that, if the verification scheme being employed uses the original transaction data, then the original transaction data is made available to the entity that verifies the digital signature. If the verification result is successful, then the payment or transaction is enabled using the payment ID, for example through the payment server 20 (block 302). For example, the payment server 20 is given a computer executable instruction to process the payment for the transaction.

A confirmation that the transaction has been completed may then be sent to the mobile device 10 and displayed on the mobile device's GUI.

In another example embodiment, the operation of block 298 may only be performed after first successfully verifying the digital signature (block 300).

Figure 22:
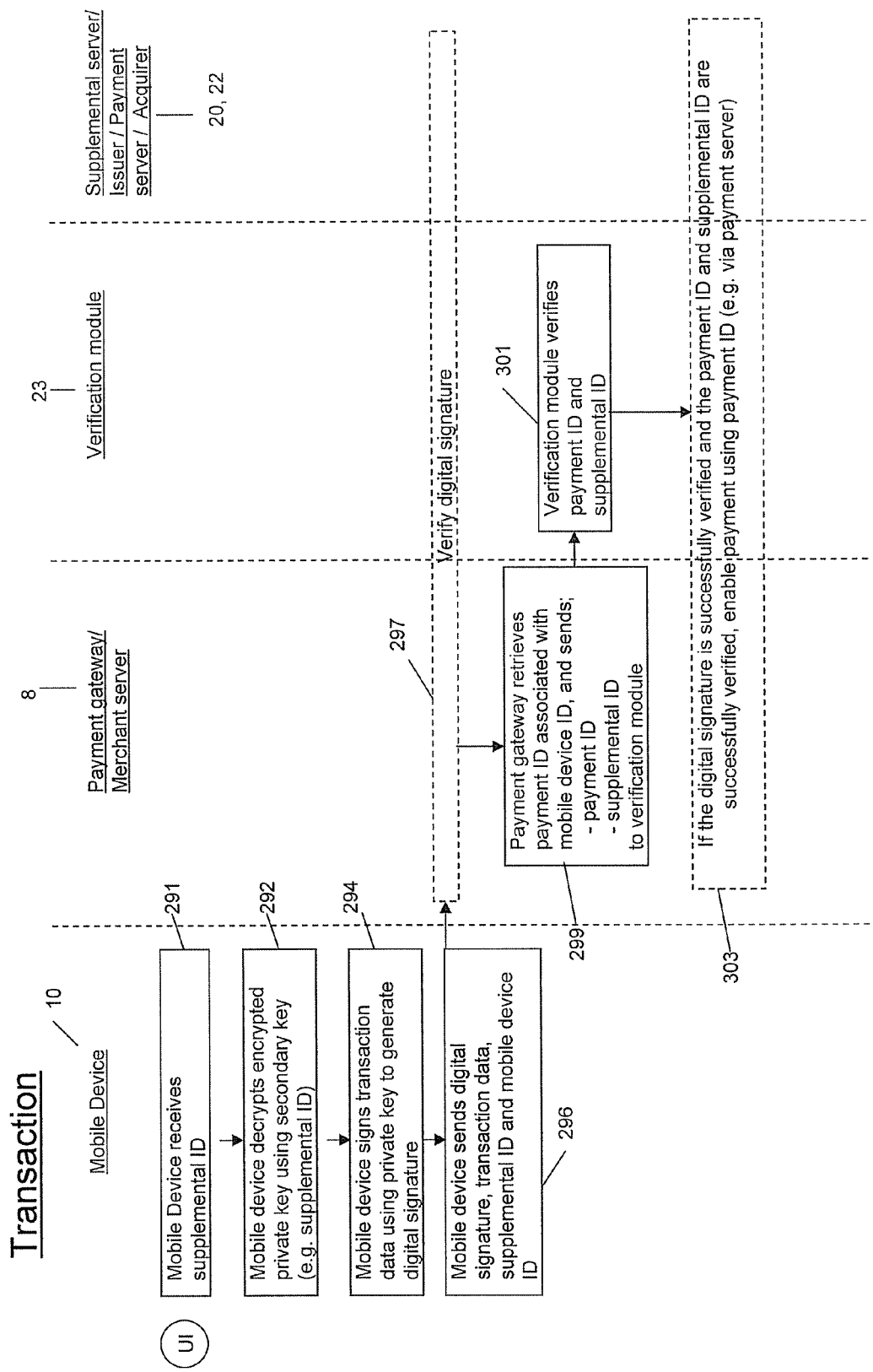
FIG. 22 is a flow diagram illustrating another set of example computer executable instructions for authenticating a transaction using a digital signature signed by the private key, after the registration shown in FIG. 20.

Turning to FIG. 22, another example embodiment of authenticating a transaction using a digital signature is provided. Similar to FIG. 21, at block 291, the mobile device 10 receives a supplemental ID. If the private key is encrypted, the mobile device 10 decrypts the private key using a secondary key (block 292). As described, the secondary key may be a function of the supplemental ID, and thus the supplemental ID is used to decrypt the private key. Blocks 294 and 296, as described above are performed.

The payment gateway 8 verifies the digital signature (block 297). The payment gateway 8 retrieves the payment ID associated with mobile device ID, and sends the payment ID and the supplemental ID to the verification module 23 for verification (block 299). At block 301 the verification module verifies the payment ID and the supplemental ID, for example by comparing the IDs with previously stored IDs. At block 303, if the digital signature is successfully verified and the payment ID and the supplemental ID are successfully verified, then payment of the transaction is enabled, for example through the payment server 20.

It can be appreciated that using a digital signature as described in FIGS. 20, 21 and 22 allows for both a transaction to be authenticated, as well as provides a digital signature that can be used to settle chargeback disputes should they arise. Using a digital signature also allows a payment gateway and a merchant to save money in transaction fees where transactions are not sent with a valid signature. For example, the payment gateway 8 would not process a transaction that has an invalid signature, since such a transaction may be voided or charged-back.

Additionally, a digital signature allows the transaction to be validated when transmitted over an unreliable protocol. A digital signature also prevents a man-in-the-middle attack from successfully changing any critical values (e.g. total amount of funds for the transaction, invoice number, shipping address, etc.).

The above principles regarding the use of a digital signature to authenticate a transaction also apply to MACs. Instead of signing transaction data to create a digital signature, a MAC algorithm is applied to the transaction data to generate a first MAC on the mobile device and a second MAC on the computing device (e.g. payment gateway, payment server, verification module). If the first and second MACs are equal, then the transaction is authenticated and the payment is enabled. The operations are very similar to the operations described in FIGS. 20, 21 and 22, however, instead of generating and verifying digital signatures, MACs are generated and verified using a secret key available to both the mobile device the computing device.

In particular, a mobile device 10 receives an input to execute the transaction. The mobile device 10 computes a first MAC using a secret key and transaction data. The secret key is stored on both the mobile device 10 and a computing device. The mobile device 10 then sends the first MAC and a mobile device ID to the computing device for verifying the first MAC for authenticating the transaction. Transaction data is also sent to the computing device. The computing device has stored thereon the mobile device ID in association with a payment ID of a payment account.

The computing device, upon receiving from the mobile device the first MAC and the mobile device ID, retrieves the payment ID associated with the mobile device ID. The computing device then computes a second MAC using the secret key and the transaction data. Upon determining the first MAC and the second MAC are equal, the computing device enables payment of the transaction using the payment ID. The computing device then sends a confirmation to the mobile device 10 that the transaction is complete.

The mobile device 10 receives the confirmation, and for example can display the confirmation to the user.

In another aspect of the proposed systems and methods, the supplemental ID is used to verify the payment ID, although the supplemental ID is not required to be passed through the payment gateway 8. Therefore, the payment gateway 8 does not need to handle or manage the supplemental ID. This reduces liability and risk for the payment gateway 8. Details are described with respect to FIGS. 23 and 24.

Figure 23:
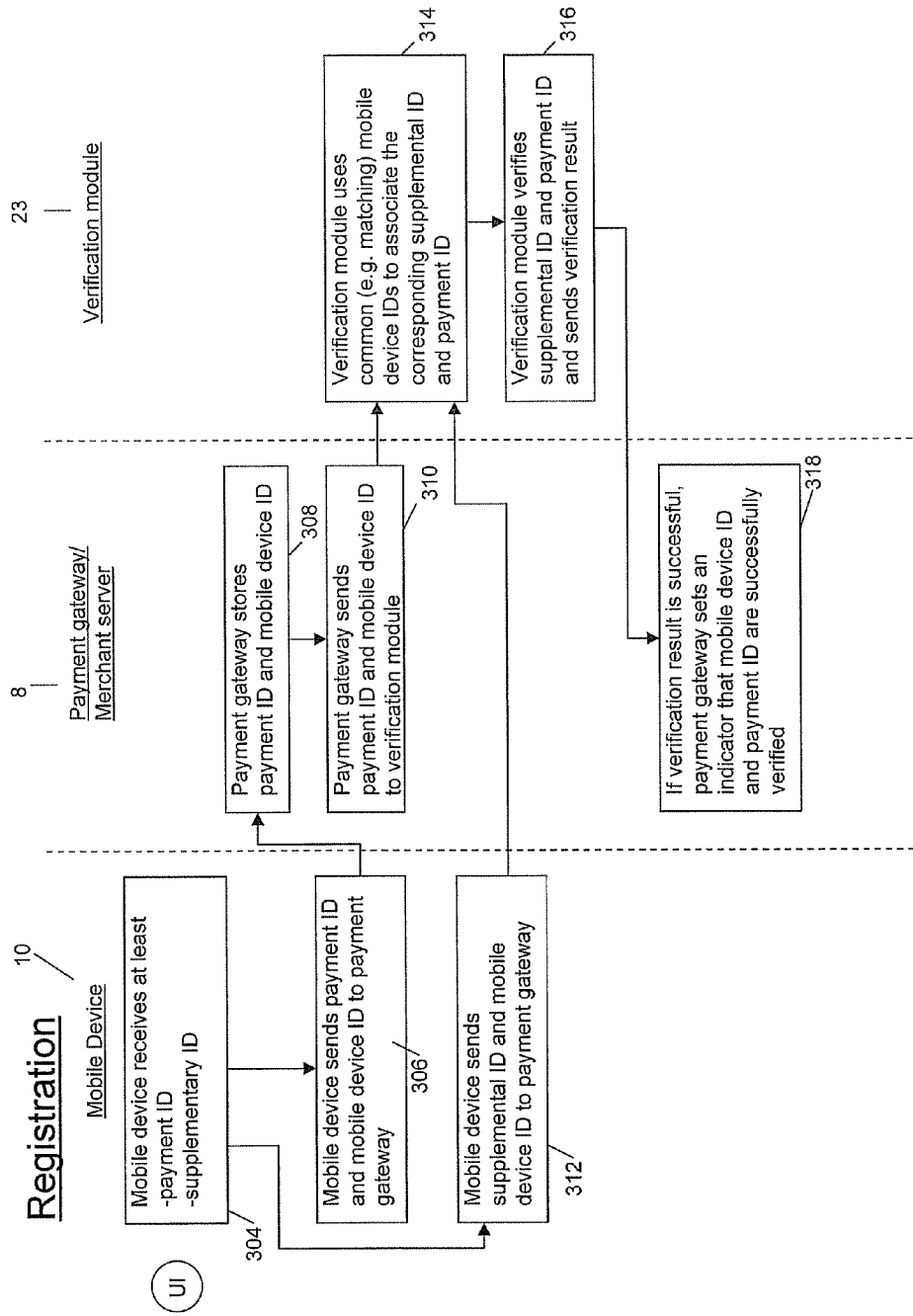
FIG. 23 is a flow diagram illustrating example computer executable instructions for verifying a payment ID and a supplemental ID during a registration process, with a mobile device sending the supplemental ID directly to a verification nodule.

In particular, turning to FIG. 23, during a registration process, the mobile device 10 receives at least the payment ID and the supplemental ID (block 304). It can be appreciated that the mobile device ID is already generated or obtained, and stored on the mobile device 10. The mobile device 10 then sends the payment ID and the mobile device ID to the payment gateway 8 (block 306). The payment gateway 8 stores the payment ID and mobile device ID (block 308). The payment gateway 8 sends the payment ID and mobile device ID to the verification module 23 (block 310).

The mobile device 10, upon receiving the supplemental ID, sends the supplemental ID and mobile device ID to the verification module 23 (block 312). The transmission of the supplemental ID and mobile device ID does not pass through the payment gateway 8 and can, for example, be sent directly to the verification module 23. It can be appreciated that the operations of block 312 and 310 can occur at different times or at approximately the same time.

The verification module 23 thus receives the mobile ID and payment ID from one source, and receives the mobile ID and supplemental ID from another source. At block 314, the verification module 23 uses the common or matching mobile device IDs to associate the corresponding supplemental ID and payment ID. That is, a supplemental ID and payment ID correspond to each other, if it is determined that the mobile ID associated with the payment ID (from one source) is the same as the mobile ID associated with the supplemental ID (from the other source). At block 316, the verification module verifies the supplemental ID and payment ID and sends the verification result. At block 318, if the verification result is successful, then the payment gateway 8 sets an indicator that the mobile device ID and payment ID (as stored on the payment gateway 8) are successfully verified. The indicator, for example, can be a Boolean value indicating that the mobile device ID and payment ID are successfully verified.

Figure 24:
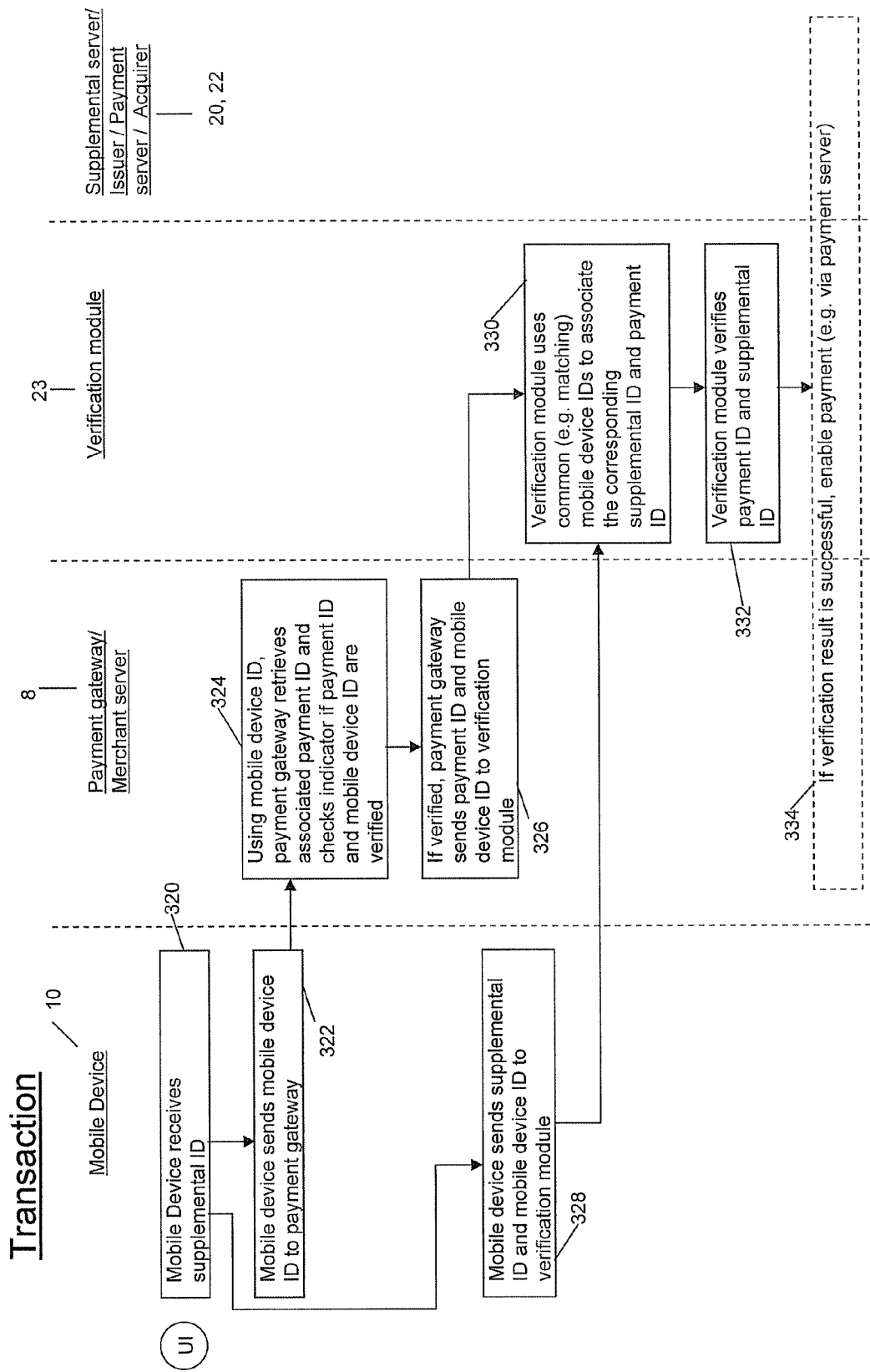
FIG. 24 is a flow diagram illustrating example computer executable instructions for authenticating a transaction with the mobile device sending the supplemental ID directly to the verification module, after the registration shown in FIG. 23.

Continuing from FIG. 23, FIG. 24 provides example computer executable instructions for authenticating a transaction without passing the supplemental ID through the payment gateway 8. At block 320, the mobile device 10 receives the supplemental ID. At block 322, the mobile device 10 sends the mobile device ID to the payment gateway 8. The payment gateway 8 retrieves the associated payment ID and checks the indicator if the payment ID and mobile ID are successfully verified (block 324). If verified, the payment gateway 8 sends the payment ID and mobile device ID to the verification module 23 (block 326).

The mobile device 10 also sends the supplemental ID and mobile device ID to the verification module 23 (block 328). The operation of block 328 can occur at a different time or approximately at the same time as the operation of block 326.

At block 330, the verification module 23 uses the common mobile device IDs to match or associate the supplemental ID with the corresponding payment ID. At block 332, the verification module 23 verifies the payment ID and the supplemental ID. If the verification result is successful, then any one of the payment gateway 8, verification module 23 and the payment server 20 enable executing of the payment process, for example through the payment server 20 (block 334).

The example embodiment of FIGS. 23 and 24 provide an alternate routing of data that does not require the supplemental ID to be forwarded or passed through the payment gateway 8.

Figure 25:
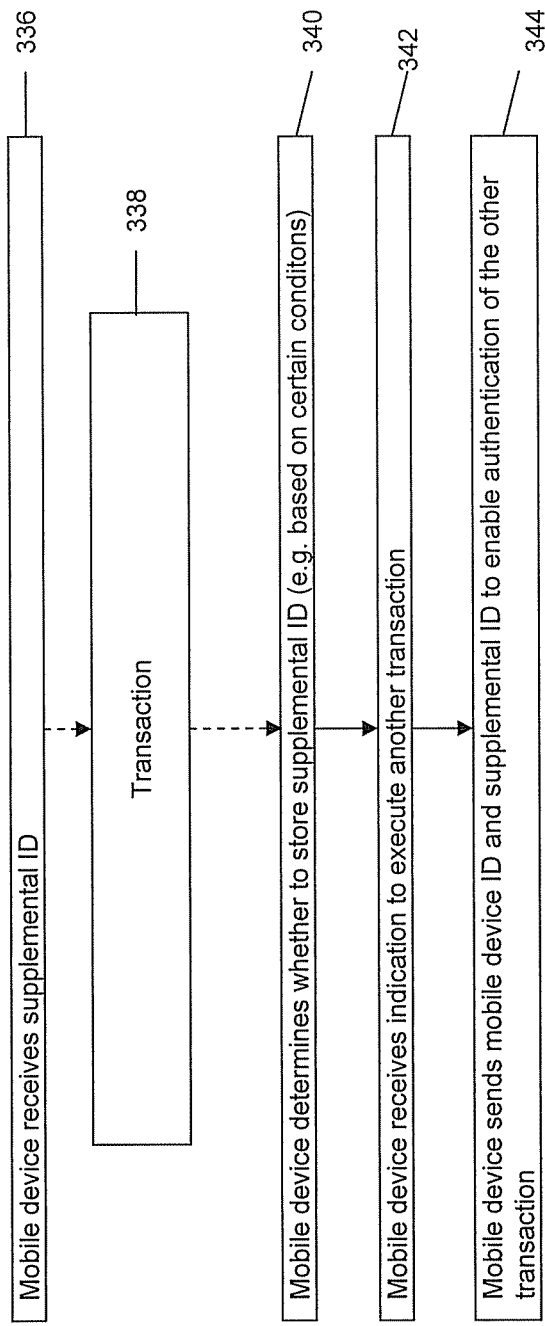
FIG. 25 is a flow diagram illustrating example computer executable instructions for authenticating a transaction and storing a supplemental ID for a subsequent transaction.

In another aspect, the proposed systems and methods include storing the supplemental ID on the mobile device 10 so that the user is not required to enter the supplemental ID into the mobile device 10 every time a transaction is made. Turning to FIG. 25, example computer executable instructions are provided for a transaction. The mobile device 10 receives the supplemental ID (block 336) and a transaction (block 338) takes place. The transaction can take place in a number of ways according to the various example embodiments described herein. At block 340, the mobile device 10 then determines whether to store the supplemental ID or delete it from the mobile device's memory. It will be appreciated that in certain situations, it is desirable to not to store the supplemental ID in non-volatile storage or memory. The determination can be based on various conditions, including, for example, the user's preset preferences, the length of time between the previous two transactions, location of the mobile device 10, the time of day, or combinations of the above. Other conditions may apply.

In this example embodiment, it is determined that the supplemental ID is stored on the mobile device 10. At block 342, the mobile device 10 receives an indication (e.g. from the user) to execute another transaction. The mobile device 10 then sends the mobile device ID and the supplemental ID that was stored on the mobile device to enable authentication of the transaction (block 344). In this way, the user does not need to re-enter the supplemental ID into the mobile device 10 when attempting to authenticate the other transaction.

In another example embodiment, the operation of block 340 is executed periodically to determine whether any recently entered or previously saved supplemental IDs should be stored on the mobile device 10 or deleted.

In general, the systems and methods described herein include a method for settling a dispute for a previously executed transaction, the method performed by a computing device, the method comprising: receiving the dispute regarding the transaction including associated transaction data; retrieving a digital signature associated with the transaction data, the digital signature computed by signing the transaction data; verifying the digital signature using a public key, the public key corresponding to a private key stored on a mobile device; and determining whether or not the transaction is fraudulent based on a verification result of the digital signature. In another aspect, the transaction is determined to be fraudulent if the verification result is unsuccessful. In another aspect, the transaction is determined to be not fraudulent if the verification result is successful. In another aspect, the computing device receives from the mobile device the digital signature, the digital signature signed using the private key. In another aspect, the method further comprises determining whether or not a subsequent transaction is fraudulent by verifying a subsequent digital signature using the public key, and if the subsequent digital signature provides a subsequent verification result that is successful, then the computing device increasing a confidence value that the subsequent verification result proves the subsequent transaction is not fraudulent. In another aspect, the transaction data comprises at least one of the transaction's invoice number, an amount of payment, a date of the transaction, a time of the transaction, a shipping address, a billing address, a purchaser's email, and a purchaser's phone number. In another aspect, the digital signature is computed by signing the transaction data and a mobile device ID, the mobile device ID identifying the mobile device. In another aspect, the digital signature is verified using any one of an RSA scheme, a DSA scheme, an ECDSA scheme, and an ElGamal signature scheme. In another aspect, the private key and the public key are generated on the computing device. In another aspect, the private key and the public key are generated on the mobile device and the public key is sent to the computing device.

In general the systems and methods described herein also include a method for settling a dispute for a transaction, the method performed by a mobile device, the method comprising: storing a private key on the mobile device prior to the transaction; the mobile device using the private key to cryptographically sign transaction data to generate a digital signature during the transaction; the mobile device sending the digital signature to a computing device, the computing device having access to a public key corresponding to the private key and configured to verify the digital signature to determine whether or not the transaction is fraudulent. In another aspect, the private key is stored on the mobile in an encrypted form. In another aspect, the private key is encrypted using a secondary key. In another aspect, the secondary key is a function of a supplemental ID, the supplemental ID for verifying a payment ID of a payment account used in the transaction, and the private key is encrypted using the secondary key. In another aspect, during the transaction, the method further comprises the mobile device receiving the secondary key and decrypting the encrypted private key using the secondary key for use in generating the digital signature. In another aspect, the transaction data comprises at least one of the transaction's invoice number, an amount of payment, a date of the transaction, a time of the transaction, a shipping address, a billing address, a purchaser's email, and a purchaser's phone number. In another aspect, the digital signature is computed by signing the transaction data and a mobile device ID, the mobile device ID identifying the mobile device. In another aspect, the digital signature is generated using any one of an RSA scheme, a DSA scheme, an ECDSA scheme, and an ElGamal signature scheme. In another aspect, the private key is stored on an Internet application on the mobile device. In another aspect, the private key is stored on a trusted platform module on the mobile device. In another aspect, the private key is stored on a near field communications (NEC) chip in the mobile device. In another aspect, the private key is stored on a subscriber identity module (SIM) card in the mobile device. In another aspect, the private key is stored on a removable storage device in the mobile device. In another aspect, the private key is stored on an application's storage on the mobile device. In another aspect, the private key and the public key are generated on the computing device. In another aspect, the private key and the public key are generated on the mobile device and the public key is sent to the computing device.

In general the systems and methods described herein include a method for authenticating a transaction using a digital signature, the method performed by a computing device, the method comprising: storing a mobile device ID identifying a mobile device in association with a payment ID of a payment account; receiving from the mobile device a digital signature and the mobile device ID, the digital signature computed by signing transaction data associated with the transaction; retrieving the payment ID associated with the mobile device ID; verifying the digital signature using a public key, the public key corresponding to a private key stored on the mobile device; and upon successfully verifying the digital signature, enabling payment of the transaction using the payment ID. In another aspect, the digital signature is signed by the private key. In another aspect, the method further comprises receiving a supplemental ID from the mobile device, the supplemental ID for verifying the payment ID. In another aspect, the method further comprises successfully verifying the supplemental ID and the payment ID before enabling payment of the transaction. In another aspect, the transaction data comprises at least one of the transaction's invoice number, an amount of payment, a date of the transaction, a time of the transaction, a shipping address, a billing address, a purchaser's email, and a purchaser's phone number. In another aspect, the digital signature is computed by signing the transaction data and the mobile device ID. In another aspect, the digital signature is verified using any one of an RSA scheme, a DSA scheme, an ECDSA scheme, and an ElGamal signature scheme. In another aspect, the private key and the public key are generated on the computing device. In another aspect, the private key and the public key are generated on the mobile device and the public key is sent to the computing device.

In general, the systems and methods as described herein also include a method a method for authenticating a transaction using a digital signature, the method performed by a mobile device, the method comprising: receiving an input to execute the transaction; computing the digital signature by cryptographically signing, with a private key, transaction data associated with the transaction; sending the digital signature and a mobile device ID of the mobile device to a computing device for verifying the digital signature for authenticating the transaction, the computing device having stored thereon the mobile device ID in association with a payment ID of a payment account; and receiving from the computing device a confirmation that the transaction is complete. In another aspect, the private key corresponds to a public key, the public key stored on the computing device. In another aspect, the private key is encrypted using a secondary key and stored on the mobile device in encrypted form. In another aspect, the method further comprises decrypting the encrypted private key using the secondary key. In another aspect, the input includes data for deriving the secondary key and the method further comprises deriving the secondary key using the input. In another aspect, the secondary key is a function of a supplemental ID, the supplemental ID for verifying the payment ID, and the input includes the supplemental ID for deriving the secondary key. In another aspect, the input includes a supplemental ID, the supplemental ID for verifying the payment ID, and the method further comprising the mobile device sending the supplemental ID to the computing device; and the mobile device, upon the computing device executing the transaction based on the payment ID and receiving verification that the supplemental ID and the payment ID are authentic, receiving from the computing device the confirmation that the transaction is complete. In another aspect, the method further comprises a registration process occurring for storing the mobile device ID on the mobile device before the transaction, the method further comprising: the mobile device receiving from a registration GUI at least the payment ID and the supplemental ID, and transmitting the payment ID and the supplemental ID to the computing device; and, the mobile device, upon receiving from the computing device that the payment ID and the supplemental ID are successfully verified, obtaining a component for the mobile device ID. In another aspect, the transaction data comprises at least one of the transaction's invoice number, an amount of payment, a date of the transaction, a time of the transaction, a shipping address, a billing address, a purchaser's email, and a purchaser's phone number. In another aspect, the digital signature is computed by signing the transaction data and the mobile device ID. In another aspect, the digital signature is verified using any one of an RSA scheme, a DSA scheme, an ECDSA scheme, and an ElGamal signature scheme. In another aspect, the private key is stored on an Internet application on the mobile device. In another aspect, the private key is stored on a trusted platform module on the mobile device. In another aspect, the private key is stored on a near field communications (NFC) chip on the mobile device. In another aspect, the private key is stored on a subscriber identity module (SIM) card on the mobile device. In another aspect, the private key is stored on a removable storage device in the mobile device. In another aspect, the private key is stored on an application's storage on the mobile device. In another aspect, the private key and the public key are generated on the computing device. In another aspect, the private key and the public key are generated on the mobile device and the public key is sent to the computing device.

In general the systems and methods described herein also include a method for authenticating a transaction, the method comprising: a mobile device receiving a supplemental ID, the supplemental ID for verifying a payment ID of a payment account, the mobile device having stored thereon a payment ID; the mobile device sending the mobile device ID to a payment gateway, the payment gateway having stored thereon the payment ID in association with the mobile device ID; the payment gateway retrieving the payment ID associated with the mobile device ID and sending the payment ID and mobile device ID to a verification module; the mobile device sending the supplemental ID and the mobile device ID to the verification module; the verification module using the matching mobile device IDs to associate the supplemental ID and the payment ID and verifying the associated supplemental ID and payment ID; and if successfully verified, the verification module enabling execution of the transaction.

In general the systems and methods described herein also include a method for authenticating a transaction, the method performed on a mobile device, the mobile device having stored thereon a mobile device ID, the method comprising: the mobile device receiving through a transaction GUI a supplemental ID for verifying a payment ID; the mobile device sending the mobile device ID to a payment gateway, the payment gateway having stored thereon the payment ID and the mobile device ID in association with each other; the mobile device sending the supplemental ID and mobile device ID to a verification module, the verification module in communication with the payment gateway; the mobile device, upon the payment gateway executing the transaction based on the payment ID associated with the mobile device ID and receiving verification that the supplemental ID and the payment ID are authentic, receiving from the payment gateway a confirmation that the transaction is complete. In another aspect, the method further comprises a registration process for storing the mobile device ID on the mobile device, the method further comprising: the mobile device receiving from a registration GUI at least the payment ID of a payment account and the supplemental ID, and transmitting the payment ID and the mobile device ID to the payment gateway; the mobile device transmitting the supplemental ID and the mobile device ID to the verification module; and, the mobile device, upon receiving from the payment gateway that the payment ID and the supplemental ID are successfully verified, obtaining a component for the mobile device ID, the mobile device ID stored on the mobile device. In another aspect, the method further comprises the mobile device obtaining the component for the mobile device ID by at least one of generating and receiving the component. In another aspect, the merchant server sends the supplemental ID without storing the supplemental ID on the merchant server. In another aspect, the payment ID is comprised of at least one of: a credit card number, an expiry date, a bank card number, a banking number, a value card number, and a points account number. In another aspect, the supplemental ID is comprised of at least one of: a Card Security Value (CSV), a Card Security Code (CSC), a Card Verification Value (CVV or CVV2), a Card Verification Value Code (CVVC), a Card Verification Code (CVC or CVC2), a Verification Code (V-Code or V Code), a Card Code Verification (CCV), a PIN, a password, biometric data, and voice data. In another aspect, the mobile device ID includes at least one of: subscriber identity information stored on a SIM card or IMEI of the mobile device, networking information, an IP address, a phone carrier identification, a port address, a DNS name, a GPS coordinate of the mobile device, the battery temperature of the mobile device, a geographical location of the mobile device, an accelerometer reading of the mobile device, a cookie, a user agent, and a header, wherein the cookie, the user agent, and the header are provided by the browser on the mobile device, or information stored in a document object model (DOM) storage on the mobile device.

In general, the systems and methods described herein include a method for authenticating a transaction on a verification module, the method comprising: the verification module receiving from a payment gateway a payment ID and a mobile device ID of a mobile device, the payment gateway in communication with the mobile device; the verification module receiving from the mobile device the mobile device ID and a supplemental ID, the supplemental ID for verifying the payment ID; the verification module matching the mobile device ID received from the payment ID and the mobile device ID received from mobile device to determine if the supplemental ID and the payment ID are associated with one another; upon determining the supplemental ID and the payment ID are associated with each other, the verification module verifying the supplemental ID and the payment ID. In another aspect, the verification module verifies by comparing the supplemental ID and the payment ID with a previously stored supplemental ID and a previously stored payment ID, and if identical, determining the supplemental ID and the payment ID are successfully verified. In another aspect, the payment ID is comprised of at least one of: a credit card number, an expiry date, a bank card number, a banking number, a value card number, and a points account number. In another aspect, the supplemental ID is comprised of at least one of: a Card Security Value (CSV), a Card Security Code (CSC), a Card Verification Value (CVV or CVV2), a Card Verification Value Code (CVVC), a Card Verification Code (CVC or CVC2), a Verification Code (V-Code or V Code), a Card Code Verification (CCV), a PIN, a password, biometric data, and voice data. In another aspect, the mobile device ID includes at least one of: subscriber identity information stored on a SIM card or IMEI of the mobile device, networking information, an IP address, a phone carrier identification, a port address, a DNS name, a GPS coordinate of the mobile device, the battery temperature of the mobile device, a geographical location of the mobile device, an accelerometer reading of the mobile device, a cookie, a user agent, and a header, wherein the cookie, the user agent, and the header are provided by the browser on the mobile device, or information stored in a document object model (DOM) storage on the mobile device.

In general, the systems and methods described herein include a method for settling a dispute for a previously executed transaction, the method performed by a computing device, the method comprising: receiving the dispute regarding the transaction including associated transaction data; retrieving a first message authentication code (MAC) associated with the transaction data, the first MAC computed by a mobile device; computing a second MAC using a secret key, the secret key stored on both the computing device and the mobile device; and determining whether or not the transaction is fraudulent based on a comparison of the first MAC and the second MAC. In another aspect, the transaction is determined to be fraudulent if the first MAC and the second MAC are different. In another aspect, the transaction is determined to be not fraudulent if the first MAC and the second MAC are equal. In another aspect, the computing device receives from the mobile device the first MAC, the first MAC computed using the secret key. In another aspect, it further comprises determining whether or not a subsequent transaction is fraudulent by verifying subsequent MACs using the secret key, and if the subsequent MACs provide a verification result that is successful, then the computing device increasing a confidence value that the verification result proves the subsequent transaction is not fraudulent. In another aspect, the transaction data comprises at least one of the transaction's invoice number, an amount of payment, a date of the transaction, a time of the transaction, a shipping address, a billing address, a purchaser's email, and a purchaser's phone number. In another aspect, the computing device stores the secret key in association with a mobile device ID, the mobile device ID for identifying the mobile device. In another aspect, the first MAC and the second MAC are computed by applying a MAC algorithm to the transaction data and a mobile device ID, the mobile device ID identifying the mobile device. In another aspect, the computing device receives the first MAC and the mobile device ID from the mobile device. In another aspect, the secret key is stored on the computing device in encrypted form. In another aspect, the MAC is a cipher-based MAC (CMAC) or a hash-based MAC (HMAC).

In general, the systems and methods described herein include a method for settling a dispute for a transaction, the method performed by a mobile device, the method comprising: storing a secret key on the mobile device prior to the transaction; the mobile device using the secret key and transaction data to compute a first MAC during the transaction; and the mobile device sending the first MAC to a computing device, the computing device having access to the secret key and configured to verify the first MAC to determine whether or not the transaction is fraudulent. In another aspect, the secret key is stored on the mobile device in an encrypted form.

In another aspect, the secret key is encrypted using a secondary key. In another aspect, the secondary key is a function of a supplemental ID, the supplemental ID for verifying a payment ID of a payment account used in the transaction, and the secret key is encrypted using the secondary key. In another aspect, during the transaction, the method further comprises the mobile device receiving the secondary key and decrypting the encrypted secret key using the secondary key. In another aspect, the transaction data comprises at least one of the transaction's invoice number, an amount of payment, a date of the transaction, a time of the transaction, a shipping address, a billing address, a purchaser's email, and a purchaser's phone number. In another aspect, the first MAC is computed by applying a MAC algorithm to the transaction data and a mobile device ID, the mobile device ID identifying the mobile device. In another aspect, the secret key is stored on an Internet application on the mobile device. In another aspect, the secret key is stored on a trusted platform module on the mobile device. In another aspect, the secret key is stored on a near field communications (NFC) chip in the mobile device. In another aspect, the secret key is stored on a subscriber identity module (SIM) card in the mobile device. In another aspect, the secret key is stored on a removable storage device in the mobile device. In another aspect, the secret key is stored on an application's storage on the mobile device. In another aspect, the secret key is generated on the computing device or the mobile device. In another aspect, the MAC is a cipher-based MAC (CMAC) or a hash-based MAC (HMAC).

In general, the systems and methods described herein include a method for authenticating a transaction using MACs, the method performed by a computing device, the method comprising: storing a mobile device ID identifying a mobile device in association with a payment ID of a payment account; receiving from the mobile device a first MAC and the mobile device ID, the first MAC computed by using a secret key and transaction data associated with the transaction, the secret key stored on the mobile device and on the computing device; retrieving the payment ID associated with the mobile device ID; computing a second MAC using the secret key and the transaction data; and upon determining the first MAC and the second MAC are equal, enabling payment of the transaction using the payment ID. In another aspect, it further comprises receiving a supplemental ID from the mobile device, the supplemental ID for verifying the payment ID. In another aspect, it further comprises successfully verifying the supplemental ID and the payment ID before enabling payment of the transaction. In another aspect, the transaction data comprises at least one of the transaction's invoice number, an amount of payment, a data of the transaction, a time of the transaction, a shipping address, a billing address, a purchaser's email, and a purchaser's phone number. In another aspect, the first MAC and the second MAC are computed by applying a MAC algorithm to the transaction data and the mobile device ID. In another aspect, the secret key is generated on the computing device or the mobile device. In another aspect, the MAC is a cipher-based MAC (CMAC) or a hash-based MAC (HMAC).

In general, the systems and methods described herein include a method for authenticating a transaction using MACs, the method performed by a mobile device, the method comprising: receiving an input to execute the transaction; computing a first MAC using a secret key and transaction data, the secret key stored on both the mobile device and a computing device; sending the first MAC and a mobile device ID of the mobile device to the computing device for verifying the first MAC for authenticating the transaction, the computing device having stored thereon the mobile device ID in association with a payment ID of a payment account; and receiving from the computing device a confirmation that the transaction is complete. In another aspect, the secret key is encrypted using a secondary key and stored on the mobile device in encrypted form. In another aspect, the method further comprises decrypting the encrypted secret key using the secondary key. In another aspect, the input includes data for deriving the secondary key and the method further comprises deriving the secondary key using the input. In another aspect, the secondary key is a function of a supplemental ID, the supplemental ID for verifying the payment ID, and the input includes the supplemental ID for deriving the secondary key. In another aspect, the input includes a supplemental ID, the supplemental ID for verifying the payment ID, and the method further comprising the mobile device sending the supplemental ID to the computing device; and the mobile device, upon the computing device executing the transaction based on the payment ID and receiving verification that the supplemental ID and the payment ID are authentic, receiving from the computing device the confirmation that the transaction is complete. In another aspect, it further comprises a registration process occurring for storing the mobile device ID on the mobile device before the transaction, the method further comprising: the mobile device receiving from a registration GUI at least the payment ID and the supplemental ID, and transmitting the payment ID and the supplemental ID to the computing device; and, the mobile device, upon receiving from the computing device that the payment ID and the supplemental ID are successfully verified, obtaining a component for the mobile device ID. In another aspect, the transaction data comprises at least one of the transaction's invoice number, an amount of payment, a date of the transaction, a time of the transaction, a shipping address, a billing address, a purchaser's email, and a purchaser's phone number. In another aspect, the first MAC is computed by applying a MAC algorithm to the transaction data and the mobile device ID. In another aspect, the secret key is stored on an Internet application on the mobile device. In another aspect, the secret key is stored on a trusted platform module on the mobile device. In another aspect, the secret key is stored on a near field communications (NFC) chip on the mobile device. In another aspect, the secret key is stored on a subscriber identity module (SIM) card on the mobile device. In another aspect, the secret key is stored on a removable storage device in the mobile device. In another aspect, the secret key is stored on an application's storage on the mobile device. In another aspect, the secret key is generated on the mobile device and is sent to the computing device.

The steps or operations in the flow charts described herein are just for example. There may be many variations to these steps or operations without departing from the spirit of the invention or inventions. For instance, the steps may be performed in a differing order, or steps may be added, deleted, or modified.

The GUIs described herein are just for example. There may be many variations and configurations to the graphical components and their interface operations without departing from the spirit of the invention or inventions. For instance, the GUI components may be configured in a differing order, or GUI components may be added, deleted, or modified.

While the basic principles of this invention or these inventions have been herein illustrated along with the embodiments shown, it will be appreciated by those skilled in the art that variations in the disclosed arrangement, both as to its details and the organization of such details, may be made without departing from the spirit and scope thereof. Accordingly, it is intended that the foregoing disclosure and the showings made in the drawings will be considered only as illustrative of the principles of the invention or inventions, and not construed in a limiting sense.

The invention claimed is:

1. A method for authenticating a transaction on a payment gateway, the payment gateway having stored thereon a mobile device ID in association with a payment ID, the payment ID identifying a payment account, the method performed on the payment gateway comprising:
the payment gateway receiving from a mobile device a supplemental ID and the mobile device ID, the supplemental ID for verifying the payment ID, and the mobile device having stored thereon the mobile device ID;
the payment gateway retrieving the payment ID associated with the mobile device ID and sending the payment ID and the supplemental ID to a verification module for verification; and,
upon the payment gateway receiving a verification result from the verification module that the supplemental ID and the payment ID are successfully verified, the payment gateway executing the transaction.

2. The method of claim 1 further comprising a registration process for storing the mobile device ID and the payment ID on the payment gateway, the method further comprising:
the payment gateway receiving from the mobile device at least the payment ID and the supplemental ID, and transmitting the payment ID and supplemental ID to the verification module; and,
upon the payment gateway receiving an initial verification result from the verification module that the payment ID and the supplemental ID are successfully verified, the payment gateway obtains a component for a mobile device ID, the mobile device ID associated with the payment ID and stored at the payment gateway, and the mobile device ID stored on the mobile device.

3. The method of claim 2 wherein the payment gateway obtains the component for the mobile device ID by at least one of generating and receiving the component.

4. The method of claim 1 wherein the payment gateway executes the transaction via a payment server, the payment server in communication with at least one of the payment gateway and the verification module.

5. A method for authentication a transaction, the method comprising:
a payment gateway receiving a mobile device ID and a supplemental ID, the supplemental ID for verifying a payment ID, the payment ID identifying a payment account;
the payment gateway retrieving the payment ID associated with the mobile device ID, the payment ID and the mobile device ID being stored on the payment gateway in association with each other, and sending the payment ID and the supplemental ID to a verification module;
upon the verification module successfully verifying the payment ID and supplemental ID, a payment server executing the transaction, the payment server in communication with at least one of the payment gateway and the verification module.

6. The method of claim 5 wherein a mobile device sends the mobile device ID and the supplemental ID to the payment gateway.

7. The method of claim 5 wherein the payment server is in communication with both the payment gateway and the verification module, and the payment gateway sends the supplemental ID and payment ID to the verification module via the payment server.

8. The method of claim 5 wherein a successful verification result is sent from the verification module to at least one of the payment server and the payment gateway.

9. The method of claim 5 wherein operations of at least two of the payment gateway, the payment server and verification module are combined into a unified server.

10. The method of claim 5 wherein the payment gateway sends the supplemental ID without storing the supplemental ID on the payment gateway.

11. The method of claim 5 wherein the payment ID is comprised of at least one of: a credit card number an expire date, a bank card number, a banking number, and a points account number.

12. The method of claim 5 wherein the supplemental ID is comprised of at least one of: a Card Security Value (CSV), a Card Security Code (CSC), a Card Verification Value (CVV or CVV2), a Card Verification Value Code (CVVC), a Card Verification Code (CVC or CVC2), a Verification Code (V-Code or V Code), a Card Code Verification (CCV), a PIN, a password, biometric data, and voice data.

13. The method of claim 5 wherein the mobile device ID includes at least one of subscriber identity information stored on a SIM card or IMEI of the mobile device, networking information, an IP address, a phone carrier identification, a port address, a DNS name, a GPS coordinate of the mobile device, the battery temperature of the mobile device, a geographical location of the mobile device, an accelerometer reading of the mobile device, a cookie, a user agent, and a header; wherein the cookie, the user agent and the header are provided by a browser on the mobile device or a DOM storage on the mobile device.

14. The method of claim 5 wherein the mobile device ID is randomly generated.

15. The method of claim 5 wherein the mobile device ID is replaced by a new mobile device ID and is associated with the payment ID for each subsequent execution of the transaction process.

16. The method of claim 5 further comprising, during the transaction process, the payment gateway comparing the received mobile device ID to the mobile device ID previously stored thereon to determine if they are similar, and if so, enabling the transaction to be executed.

17. The method of claim 16 wherein the received mobile device ID in the transaction process must be equal to the mobile device ID previously stored on the payment gateway for the transaction to be executed.

18. A non-transitory computer readable medium for authenticating a transaction on a payment gateway, the computer readable medium comprising computer executable instructions for execution on the payment gateway, wherein the payment gateway having stored thereon a mobile device ID in association with a payment ID, the payment ID identifying a payment account, the computer executable instructions comprising:
the payment gateway receiving from a mobile device a supplemental ID and the mobile device ID, the supplemental ID for verifying the payment ID, and the mobile device having stored thereon the mobile device ID;
the payment gateway retrieving the payment ID associated with the mobile device ID and sending the payment ID and the supplemental ID to a verification module for verification; and,
after the payment gateway receiving a verification result from the verification module that the supplemental ID and the payment ID are successfully verified, the payment gateway executing the transaction.

19. The non-transitory computer readable medium of claim 18 further a registration process for storing the mobile device ID and the payment ID on the payment gateway, the non-transitory computer readable medium further comprising:
- the payment gateway receiving from the mobile device at least the payment ID and the supplemental ID, and transmitting the payment ID and supplemental ID to the verification module; and,
- upon the payment gateway receiving an initial verification result from the verification module that the payment ID and the supplemental ID are successfully verified, the payment gateway obtains a component for a mobile device ID, the mobile device ID associated with the payment ID and stored at the payment gateway, and the mobile device ID stored on the mobile device.

20. The non-transitory computer readable medium of claim 19 wherein the payment gateway obtains the component for the mobile device ID by at least one of generating and receiving the component.

21. The non-transitory computer readable medium of claim 18 wherein the payment gateway executes the transaction via a payment server, the payment server in communication with at least one of the payment gateway and the verification module.

\* \* \* \* \*